US010320763B2

(12) United States Patent
Erickson et al.

(10) Patent No.: US 10,320,763 B2
(45) Date of Patent: Jun. 11, 2019

(54) EFFICIENT COMMUNICATION FOR DEVICES OF A HOME NETWORK

(71) Applicant: Google Inc., Mountain View, CA (US)

(72) Inventors: Grant M. Erickson, Sunnyvale, CA (US); Jay D. Logue, San Jose, CA (US); Christopher A. Boross, San Francisco, CA (US); Zachary B. Smith, San Francisco, CA (US); Osborne B. Hardison, Palo Alto, CA (US); Richard J. Schultz, Mountain View, CA (US); Sunny P. Gujjaru, Sunnyvale, CA (US); Matthew G. Neeley, San Mateo, CA (US)

( * ) Notice: Subject to any disclaimer, the term of this patent is extended or adjusted under 35 U.S.C. 154(b) by 0 days.

(21) Appl. No.: 15/612,823

(22) Filed: Jun. 2, 2017

(65) Prior Publication Data
US 2017/0272416 A1    Sep. 21, 2017

Related U.S. Application Data

(63) Continuation of application No. 14/885,739, filed on Oct. 16, 2015, now Pat. No. 9,674,885, which is a
(Continued)

(51) Int. Cl.
*H04W 4/00* (2018.01)
*H04L 29/06* (2006.01)
(Continued)

(52) U.S. Cl.
CPC ............ *H04L 63/061* (2013.01); *G06F 8/65* (2013.01); *H04L 9/0861* (2013.01); *H04L 9/14* (2013.01);
(Continued)

(58) Field of Classification Search
None
See application file for complete search history.

(56) References Cited

U.S. PATENT DOCUMENTS 5,699,603 A   12/1997   Backes
6,101,188 A    8/2000   Sekine et al.
(Continued)

FOREIGN PATENT DOCUMENTS

CN      1711742     12/2005
CN    101064723     10/2007
(Continued)

OTHER PUBLICATIONS

"6LoWPAN, Wikipedia", http://en.wikipedia.org/w/index.php?title=6LoWPAN&oldid=622043786—Retrieved on Apr. 2, 2013, 4 pages.
(Continued)

*Primary Examiner* — Farah Faroul
(74) *Attorney, Agent, or Firm* — Colby Nipper

(57) ABSTRACT

Systems and methods are provided for efficient communication through a fabric network of devices in a home environment or similar environment. For example, an electronic device may efficiently control communication to balance power and reliability concerns, may efficiently communicate messages to certain preferred networks by analyzing Internet Protocol version 6 (IPv6) packet headers that use an Extended Unique Local Address (EULA), may efficiently communicate software updates and status reports throughout a fabric network, and/or may easily and efficiently join a fabric network.

20 Claims, 38 Drawing Sheets

Related U.S. Application Data continuation of application No. 13/926,335, filed on Jun. 25, 2013, now Pat. No. 9,191,209.

(51) Int. Cl.

| | | |
|---|---|---|
| *H04W 52/02* | (2009.01) | |
| *H04W 24/04* | (2009.01) | |
| *H04W 76/14* | (2018.01) | |
| *H04W 76/10* | (2018.01) | |
| *H04L 29/08* | (2006.01) | |
| *H04L 12/701* | (2013.01) | |
| *H04W 88/02* | (2009.01) | |
| *H04L 29/12* | (2006.01) | |
| *H04W 72/04* | (2009.01) | |
| *H04W 24/10* | (2009.01) | |
| *H04W 84/12* | (2009.01) | |
| *H04L 9/08* | (2006.01) | |
| *H04L 9/32* | (2006.01) | |
| *H04L 12/741* | (2013.01) | |
| *G06F 8/65* | (2018.01) | |
| *H04W 52/38* | (2009.01) | |
| *H04W 60/00* | (2009.01) | |
| *H04L 9/14* | (2006.01) | |
| *H04L 9/30* | (2006.01) | |
| *H04W 12/04* | (2009.01) | |
| *H04W 12/06* | (2009.01) | |
| *H04W 84/18* | (2009.01) | |
| *H04W 88/04* | (2009.01) | |
| *H04W 88/06* | (2009.01) | |
| *H04W 80/04* | (2009.01) | |
| *H04L 12/58* | (2006.01) | |

(52) U.S. Cl.
CPC ............... *H04L 9/30* (2013.01); *H04L 9/32* (2013.01); *H04L 9/3247* (2013.01); *H04L 9/3263* (2013.01); *H04L 9/3265* (2013.01); *H04L 45/00* (2013.01); *H04L 45/74* (2013.01); *H04L 61/6059* (2013.01); *H04L 63/083* (2013.01); *H04L 67/10* (2013.01); *H04L 67/12* (2013.01); *H04L 67/34* (2013.01); *H04L 69/165* (2013.01); *H04L 69/22* (2013.01); *H04W 12/04* (2013.01); *H04W 12/06* (2013.01); *H04W 24/04* (2013.01); *H04W 24/10* (2013.01); *H04W 52/0212* (2013.01); *H04W 52/383* (2013.01); *H04W 60/00* (2013.01); *H04W 72/0493* (2013.01); *H04W 76/10* (2018.02); *H04W 76/14* (2018.02); *H04W 84/12* (2013.01); *H04W 88/02* (2013.01); *H04L 51/00* (2013.01); *H04L 61/2038* (2013.01); *H04L 61/6004* (2013.01); *H04L 63/0823* (2013.01); *H04W 80/045* (2013.01); *H04W 84/18* (2013.01); *H04W 88/04* (2013.01); *H04W 88/06* (2013.01); *Y02D 70/00* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/22* (2018.01); *Y02D 70/26* (2018.01); *Y04S 40/18* (2018.05)

(56) References Cited

U.S. PATENT DOCUMENTS

| | | | |
|---|---|---|---|
| 6,101,545 A | 8/2000 | Balcerowski et al. | |
| 6,484,200 B1 | 11/2002 | Angal et al. | |
| 7,035,634 B2 | 4/2006 | Mead et al. | |
| 7,424,532 B1 | 9/2008 | Subbiah | |
| 7,778,654 B2 | 8/2010 | Ahn et al. | |
| 8,090,807 B2 * | 1/2012 | Chung | H04L 67/14 709/203 |
| 8,111,414 B2 | 2/2012 | Sato et al. | |
| 8,301,432 B1 | 10/2012 | Gauvin | |
| RE44,412 E * | 8/2013 | Naqvi | H04M 7/123 370/410 |
| 8,504,017 B1 | 8/2013 | Hietalahti et al. | |
| 8,514,777 B1 | 8/2013 | Zhao | |
| 8,539,567 B1 | 9/2013 | Logue et al. | |
| 8,635,373 B1 | 1/2014 | Supramaniam et al. | |
| 8,681,807 B1 | 3/2014 | Zimerman | |
| 9,036,529 B2 | 5/2015 | Erickson et al. | |
| 9,036,632 B2 | 5/2015 | Erickson | |
| 9,124,521 B2 | 9/2015 | Erickson et al. | |
| 9,130,910 B1 | 9/2015 | Logue | |
| 9,191,209 B2 | 11/2015 | Erickson et al. | |
| 9,326,307 B2 | 4/2016 | Erickson et al. | |
| 9,338,810 B2 | 5/2016 | Erickson et al. | |
| 9,345,058 B2 | 5/2016 | Erickson et al. | |
| 9,451,573 B2 | 9/2016 | Erickson et al. | |
| 9,531,704 B2 | 12/2016 | Erickson et al. | |
| 9,590,975 B2 | 3/2017 | Erickson et al. | |
| 9,629,193 B2 | 4/2017 | Erickson et al. | |
| 9,648,009 B2 | 5/2017 | Erickson et al. | |
| 9,674,885 B2 | 6/2017 | Erickson et al. | |
| 2002/0069417 A1 * | 6/2002 | Kliger | H04L 12/2803 725/78 |
| 2002/0150103 A1 | 10/2002 | Hamamoto et al. | |
| 2002/0184208 A1 | 12/2002 | Kato | |
| 2003/0041119 A1 | 2/2003 | Bisdikian et al. | |
| 2003/0135556 A1 | 7/2003 | Holdsworth | |
| 2004/0008691 A1 | 1/2004 | Winter et al. | |
| 2004/0031030 A1 | 2/2004 | Kidder et al. | |
| 2004/0225885 A1 | 11/2004 | Grohoski et al. | |
| 2005/0018632 A1 | 1/2005 | Lee et al. | |
| 2005/0049000 A1 | 3/2005 | Sheynman et al. | |
| 2005/0050004 A1 | 3/2005 | Sheu et al. | |
| 2005/0135570 A1 | 6/2005 | Binning | |
| 2005/0138359 A1 | 6/2005 | Simon et al. | |
| 2005/0176418 A1 | 8/2005 | Leib et al. | |
| 2005/0220139 A1 | 10/2005 | Aholainen | |
| 2005/0228798 A1 | 10/2005 | Shepard et al. | |
| 2005/0249122 A1 | 11/2005 | Wheeler et al. | |
| 2006/0010217 A1 | 1/2006 | Sood | |
| 2006/0067360 A1 | 3/2006 | Ohara | |
| 2006/0259969 A1 | 11/2006 | Suh et al. | |
| 2007/0030848 A1 | 2/2007 | Miyata et al. | |
| 2007/0054674 A1 | 3/2007 | Cohen et al. | |
| 2007/0076684 A1 | 4/2007 | Lee et al. | |
| 2007/0078986 A1 | 4/2007 | Ethier et al. | |
| 2007/0081512 A1 | 4/2007 | Takeda et al. | |
| 2007/0083788 A1 | 4/2007 | Johnson et al. | |
| 2007/0110053 A1 | 5/2007 | Soni et al. | |
| 2007/0115822 A1 * | 5/2007 | Odijk | H04L 12/2801 370/235 |
| 2007/0147255 A1 | 6/2007 | Oyman | |
| 2007/0165592 A1 | 7/2007 | Gossain et al. | |
| 2007/0253431 A1 | 11/2007 | Park et al. | |
| 2008/0002677 A1 | 1/2008 | Bugenhagen et al. | |
| 2008/0069137 A1 | 3/2008 | Jimmel | |
| 2008/0086727 A1 | 4/2008 | Lam et al. | |
| 2008/0141274 A1 | 6/2008 | Bhogal et al. | |
| 2008/0141427 P1 | 6/2008 | Bhogal et al. | |
| 2008/0291828 A1 | 11/2008 | Park | |
| 2008/0304457 A1 | 12/2008 | Thubert et al. | |
| 2009/0016226 A1 | 1/2009 | LaVigne et al. | |
| 2009/0024498 A1 | 1/2009 | Berezuk et al. | |
| 2009/0040103 A1 | 2/2009 | Chansarkar et al. | |
| 2009/0073983 A1 | 3/2009 | Kim | |
| 2009/0077396 A1 | 3/2009 | Tsai et al. | |
| 2009/0080013 A1 | 3/2009 | Sato et al. | |
| 2009/0092049 A1 * | 4/2009 | Hargrave | H04W 76/10 370/235 |
| 2009/0116463 A1 | 5/2009 | Hirano et al. | |
| 2009/0135716 A1 | 5/2009 | Veillette | |
| 2009/0161578 A1 | 6/2009 | Yeung | |
| 2009/0180484 A1 | 7/2009 | Igarashi | |

(56) References Cited

U.S. PATENT DOCUMENTS

| | | |
|---|---|---|
| 2009/0185538 A1 | 7/2009 | Choi et al. |
| 2009/0195072 A1 | 8/2009 | Lee |
| 2009/0195407 A1 | 8/2009 | Nakano et al. |
| 2009/0201848 A1 | 8/2009 | Kumazawa et al. |
| 2009/0207821 A1 | 8/2009 | Rune |
| 2009/0249322 A1 | 10/2009 | Sugiyama et al. |
| 2009/0257380 A1 | 10/2009 | Meier |
| 2009/0276451 A1 | 11/2009 | Shelby |
| 2009/0319848 A1 | 12/2009 | Thaper |
| 2009/0323690 A1 | 12/2009 | Lu et al. |
| 2009/0327515 A1 | 12/2009 | Price |
| 2010/0037057 A1 | 2/2010 | Shim et al. |
| 2010/0064029 A1 | 3/2010 | Lundberg et al. |
| 2010/0082784 A1* | 4/2010 | Rosenblatt ........ H04L 12/2812 709/222 |
| 2010/0118869 A1 | 5/2010 | Li et al. |
| 2010/0153652 A1 | 6/2010 | Thomas et al. |
| 2010/0180019 A1* | 7/2010 | Elston, III ........ H04L 12/2809 709/222 |
| 2010/0202656 A1 | 8/2010 | Ramakrishnan et al. |
| 2010/0232433 A1 | 9/2010 | Morris |
| 2010/0238811 A1 | 9/2010 | Rune |
| 2010/0246480 A1 | 9/2010 | Aggarwal et al. |
| 2010/0262519 A1 | 10/2010 | Salomon et al. |
| 2010/0262650 A1 | 10/2010 | Chauhan et al. |
| 2010/0281424 A1 | 11/2010 | Vaysburg et al. |
| 2011/0021234 A1 | 1/2011 | Tibbitts et al. |
| 2011/0066051 A1 | 3/2011 | Moon et al. |
| 2011/0099545 A1 | 4/2011 | Lee et al. |
| 2011/0107098 A1 | 5/2011 | Hong et al. |
| 2011/0107165 A1 | 5/2011 | Resch et al. |
| 2011/0145381 A1 | 6/2011 | Saint-Hilaire |
| 2011/0149858 A1 | 6/2011 | Hwang et al. |
| 2011/0167133 A1 | 7/2011 | Jain |
| 2011/0169659 A1 | 7/2011 | Dalla et al. |
| 2011/0196925 A1 | 8/2011 | Hans et al. |
| 2011/0202656 A1 | 8/2011 | Gentile et al. |
| 2011/0202910 A1 | 8/2011 | Venkatakrishnan et al. |
| 2011/0221590 A1 | 9/2011 | Baker |
| 2011/0225640 A1 | 9/2011 | Ganapathy et al. |
| 2011/0246646 A1 | 10/2011 | Nakhjiri et al. |
| 2011/0275384 A1 | 11/2011 | Barbeau et al. |
| 2011/0299426 A1* | 12/2011 | Kumar ............. H04W 52/0235 370/256 |
| 2011/0314163 A1* | 12/2011 | Borins ................ H04W 4/08 709/227 |
| 2012/0063334 A1 | 3/2012 | Drake |
| 2012/0093508 A1 | 4/2012 | Baykal et al. |
| 2012/0106533 A1 | 5/2012 | Chen et al. |
| 2012/0179906 A1 | 7/2012 | Choi et al. |
| 2012/0197791 A1 | 8/2012 | Karner et al. |
| 2012/0207163 A1 | 8/2012 | Schrum |
| 2012/0226768 A1 | 9/2012 | Gaines et al. |
| 2012/0233674 A1 | 9/2012 | Gladstone et al. |
| 2012/0236824 A1 | 9/2012 | McCann et al. |
| 2012/0243685 A1 | 9/2012 | Tanaka et al. |
| 2012/0264443 A1 | 10/2012 | Ng et al. |
| 2012/0300778 A1 | 11/2012 | Tamura |
| 2012/0320924 A1 | 12/2012 | Baliga et al. |
| 2012/0329478 A1 | 12/2012 | Lee |
| 2013/0006400 A1 | 1/2013 | Caceres et al. |
| 2013/0036181 A1 | 2/2013 | Choi et al. |
| 2013/0036305 A1 | 2/2013 | Yadav et al. |
| 2013/0046864 A1 | 2/2013 | Behringer et al. |
| 2013/0046872 A1 | 2/2013 | Seelman |
| 2013/0046893 A1 | 2/2013 | Hauser et al. |
| 2013/0078985 A1 | 3/2013 | Savolainen et al. |
| 2013/0082848 A1* | 4/2013 | Marjanen ............ G08B 25/009 340/870.02 |
| 2013/0083726 A1 | 4/2013 | Jain et al. |
| 2013/0117449 A1 | 5/2013 | Hares et al. |
| 2013/0136145 A1 | 5/2013 | Bi et al. |
| 2013/0142059 A1 | 6/2013 | Di Giroiamo et al. |
| 2013/0171939 A1 | 7/2013 | Tian et al. |
| 2013/0172037 A1* | 7/2013 | Govind ................ H04W 8/186 455/518 |
| 2013/0193203 A1* | 8/2013 | Larson ................ H04W 76/10 235/375 |
| 2013/0201316 A1 | 8/2013 | Binder et al. |
| 2013/0242847 A1 | 9/2013 | Oh et al. |
| 2013/0276062 A1 | 10/2013 | Sarawat et al. |
| 2013/0322281 A1* | 12/2013 | Ludlow ................ H04W 48/18 370/252 |
| 2013/0326502 A1 | 12/2013 | Brunsman et al. |
| 2013/0329557 A1 | 12/2013 | Petry et al. |
| 2013/0329605 A1 | 12/2013 | Nakil et al. |
| 2014/0003357 A1 | 1/2014 | Ejzak et al. |
| 2014/0004825 A1 | 1/2014 | Prakash et al. |
| 2014/0059531 A1 | 2/2014 | Lee et al. |
| 2014/0068727 A1* | 3/2014 | Shamis ................ H04W 12/04 726/5 |
| 2014/0089671 A1 | 3/2014 | Logue et al. |
| 2014/0098762 A1 | 4/2014 | Ghai et al. |
| 2014/0108624 A1 | 4/2014 | Grundemann et al. |
| 2014/0120861 A1 | 5/2014 | Kwak et al. |
| 2014/0143855 A1 | 5/2014 | Keoh et al. |
| 2014/0181893 A1 | 6/2014 | Von Bokern et al. |
| 2014/0189790 A1 | 7/2014 | Mindler et al. |
| 2014/0233460 A1 | 8/2014 | Pettus et al. |
| 2014/0240105 A1 | 8/2014 | Brenner |
| 2014/0241146 A1 | 8/2014 | Mahadevan et al. |
| 2014/0247396 A1 | 9/2014 | Ohmae et al. |
| 2014/0250509 A1 | 9/2014 | Ansley |
| 2014/0256249 A1 | 9/2014 | Tse et al. |
| 2014/0269755 A1 | 9/2014 | Veiga |
| 2014/0270714 A1 | 9/2014 | Osminer et al. |
| 2014/0281804 A1 | 9/2014 | Resch |
| 2014/0282923 A1 | 9/2014 | Narayan et al. |
| 2014/0283004 A1 | 9/2014 | Moore |
| 2014/0289745 A1 | 9/2014 | Nirantar |
| 2014/0328343 A1 | 11/2014 | Kapadia et al. |
| 2014/0369267 A1 | 12/2014 | Ni et al. |
| 2014/0376405 A1 | 12/2014 | Erickson et al. |
| 2014/0376530 A1 | 12/2014 | Erickson et al. |
| 2014/0379817 A1 | 12/2014 | Logue et al. |
| 2015/0016407 A1 | 1/2015 | Erickson et al. |
| 2015/0016443 A1 | 1/2015 | Erickson et al. |
| 2015/0019223 A1 | 1/2015 | Chen et al. |
| 2015/0023293 A1 | 1/2015 | Erickson et al. |
| 2015/0023294 A1 | 1/2015 | Erickson et al. |
| 2015/0023339 A1 | 1/2015 | Erickson et al. |
| 2015/0026791 A1 | 1/2015 | Erickson et al. |
| 2015/0032898 A1 | 1/2015 | Tan |
| 2015/0109902 A1 | 4/2015 | Kumar |
| 2015/0249605 A1 | 9/2015 | Erickson et al. |
| 2015/0257190 A1 | 9/2015 | Erickson et al. |
| 2015/0326488 A1 | 11/2015 | Yousefi et al. |
| 2015/0365377 A1 | 12/2015 | Dvir et al. |
| 2016/0041821 A1 | 2/2016 | Erickson et al. |
| 2016/0113048 A1 | 4/2016 | Barathalwar |
| 2016/0227506 A1 | 8/2016 | Erickson et al. |
| 2017/0127468 A1* | 5/2017 | Saikusa ................ H04W 76/19 |

FOREIGN PATENT DOCUMENTS

| | | |
|---|---|---|
| CN | 101247308 | 8/2008 |
| JP | 2000278301 | 10/2000 |
| JP | 2005184834 | 7/2005 |
| JP | 2006246202 | 9/2006 |
| JP | 2007310780 | 11/2007 |
| JP | 2010050905 | 3/2010 |
| JP | 2010288101 | 12/2010 |
| JP | 2011501891 | 1/2011 |
| JP | 2012204897 | 10/2012 |
| JP | 2013042243 | 2/2013 |
| KR | 20120014887 | 2/2012 |
| RU | 2366107 | 8/2009 |
| RU | 2406249 | 11/2009 |
| RU | 2473185 | 6/2012 |
| RU | 2482622 | 6/2012 |
| WO | 9427382 | 11/1994 |
| WO | 2005022305 | 3/2005 |

(56) References Cited

FOREIGN PATENT DOCUMENTS

| WO | 2005091666 | 9/2005 |
|---|---|---|
| WO | WO 2006043503 | 4/2006 |
| WO | 2009042104 | 4/2009 |
| WO | 2010127365 | 11/2010 |
| WO | 2013014609 | 1/2013 |

OTHER PUBLICATIONS

"Advisory Action", U.S. Appl. No. 13/926,312, dated Jan. 11, 2016, 4 pages.
"Advisory Action", U.S. Appl. No. 14/506,199, dated Feb. 9, 2016, 2 pages.
"Corrected Notice of Allowance", U.S. Appl. No. 13/926,312, dated Nov. 30, 2016, 2 pages.
"Corrected Notice of Allowance", U.S. Appl. No. 14/504,233, dated Jan. 20, 2017, 2 pages.
"Corrected Notice of Allowance", U.S. Appl. No. 14/504,233, dated Feb. 8, 2017, 2 pages.
"Corrected Notice of Allowance", U.S. Appl. No. 14/506,199, dated Jan. 11, 2017, 2 pages.
"Corrected Notice of Allowance", U.S. Appl. No. 14/506,199, dated Mar. 14, 2017, 2 pages.
"Corrected Notice of Allowance", U.S. Appl. No. 14/712,377, dated Apr. 13, 2016, 2 pages.
"Corrected Notice of Allowance", U.S. Appl. No. 14/712,436, dated Mar. 31, 2016, 2 pages.
"Corrected Notice of Allowance", U.S. Appl. No. 14/712,467, dated Mar. 31, 2016, 2 pages.
"Corrected Notice of Allowance", U.S. Appl. No. 14/712,467, dated Apr. 22, 2016, 2 pages.
"Corrected Notice of Allowance", U.S. Appl. No. 14/885,739, dated Feb. 13, 2017, 2 pages.
"Corrected Notice of Allowance", U.S. Appl. No. 14/885,739, dated Apr. 18, 2017, 2 pages.
"Corrected Notice of Allowance", U.S. Appl. No. 14/885,739, dated May 9, 2017, 2 pages.
"Corrected Notice of Allowance", U.S. Appl. No. 15/096,673, dated Aug. 23, 2016, 2 pages.
"Final Office Action", U.S. Appl. No. 13/926,312, dated Oct. 13, 2015, 19 pages.
"Final Office Action", U.S. Appl. No. 14/504,233, dated Jun. 17, 2015, 25 pages.
"Final Office Action", U.S. Appl. No. 14/506,199, dated Sep. 16, 2016, 11 pages.
"Final Office Action", U.S. Appl. No. 14/506,199, dated Nov. 5, 2015, 8 pages.
"Final Office Action", U.S. Appl. No. 14/506,302, dated Jul. 1, 2015, 23 pages.
"First Action Interview Office Action", U.S. Appl. No. 14/506,302, dated Jan. 14, 2015, 6 pages.
"Foreign Notice of Allowance", KR Application No. 10-2016-7020015, dated Jan. 18, 2017, 4 pages.
"Foreign Office Action", AU Application No. 2014302724, dated Sep. 30, 2016, 3 pages.
"Foreign Office Action", EP Application No. 14741729.9, dated Mar. 16, 2017, 7 pages.
"Foreign Office Action", JP Application No. 2016-242302, dated Feb. 21, 2017, 6 pages.
"H3C, RIPng Technology White Paper", Hangzhou H3C Technologies Co., Ltd., www.h3c.com/portal/ download.do?id=685058, 2008, 8 pages.
"International Search Report and Written Opinion", Application No. PCT/US2014/043691, dated Nov. 12, 2014, 11 pages.
"International Search Report", Application No. PCT/US2014/043699, dated Jan. 20, 2015, 5 pages.
"Invitation to Pay Additional Fees/Partial International Search Report", Application No. PCT/US2014/043699, dated Sep. 30, 2014, 7 pages.

"Non-Final Office Action", U.S. Appl. No. 13/926,312, dated Mar. 13, 2015, 22 pages.
"Non-Final Office Action", U.S. Appl. No. 13/926,312, dated Jun. 17, 2016, 19 pages.
"Non-Final Office Action", U.S. Appl. No. 13/926,335, dated Jan. 27, 2015, 9 pages.
"Non-Final Office Action", U.S. Appl. No. 14/504,233, dated May 12, 2016, 16 pages.
"Non-Final Office Action", U.S. Appl. No. 14/506,199, dated Apr. 4, 2016, 11 pages.
"Non-Final Office Action", U.S. Appl. No. 14/506,199, dated Apr. 24, 2015, 9 pages.
"Non-Final Office Action", U.S. Appl. No. 14/506,302, dated Aug. 10, 2016, 19 pages.
"Non-Final Office Action", U.S. Appl. No. 14/885,739, dated Sep. 2, 2016, 10 pages.
"Notice of Allowance", U.S. Appl. No. 13/926,312, dated Nov. 2, 2016, 10 pages.
"Notice of Allowance", U.S. Appl. No. 13/926,335, dated Jun. 26, 2015, 8 pages.
"Notice of Allowance", U.S. Appl. No. 14/504,233, dated Nov. 23, 2016, 13 pages.
"Notice of Allowance", U.S. Appl. No. 14/506,199, dated Jan. 22, 2015, 8 pages.
"Notice of Allowance", U.S. Appl. No. 14/506,199, dated Dec. 16, 2016, 8 pages.
"Notice of Allowance", U.S. Appl. No. 14/506,274, dated Jan. 21, 2015, 15 pages.
"Notice of Allowance", U.S. Appl. No. 14/506,302, dated Oct. 19, 2016, 15 pages.
"Notice of Allowance", U.S. Appl. No. 14/506,302, dated Dec. 19, 2016, 8 pages.
"Notice of Allowance", U.S. Appl. No. 14/712,377, dated Sep. 9, 2015, 8 pages.
"Notice of Allowance", U.S. Appl. No. 14/712,377, dated Dec. 23, 2015, 10 pages.
"Notice of Allowance", U.S. Appl. No. 14/712,436, dated Dec. 22, 2015, 12 pages.
"Notice of Allowance", U.S. Appl. No. 14/712,467, dated Jan. 12, 2016, 27 pages.
"Notice of Allowance", U.S. Appl. No. 14/885,739, dated Jan. 31, 2017, 5 pages.
"Notice of Allowance", U.S. Appl. No. 15/096,673, dated Jul. 27, 2016, 10 pages.
"OSI Model, Wikipedia", http://en.wikipedia.org/wiki/OSI_model, Accessed Apr. 2, 2013, 9 pages.
"Pre-Interview Communication", U.S. Appl. No. 15/096,673, dated Jun. 9, 2016, 3 pages.
"Pre-interview First Office Action", U.S. Appl. No. 14/506,199, dated Dec. 2, 2014, 4 pages.
"Pre-interview First Office Action", U.S. Appl. No. 14/506,274, dated Dec. 3, 2014, 5 pages.
"Pre-interview First Office Action", U.S. Appl. No. 14/506,302, dated Dec. 10, 2014, 4 pages.
"Pre-interview First Office Action", U.S. Appl. No. 14/712,377, dated Jun. 16, 2015, 4 pages.
"Pre-interview First Office Action", U.S. Appl. No. 14/712,436, dated Oct. 22, 2015, 4 pages.
"Pre-interview First Office Action", U.S. Appl. No. 14/712,467, dated Oct. 2, 2015, 4 pages.
"Routing Information Protocol", Wikipedia, http://en.wikipedia.org/wiki/Routing_Information_Protocol, Apr. 2, 2013, 4 pages.
Baker,"Internet Protocols for the Smart Grid", Internet Protocols for the Smart Grid; Internet Engineering Task Force, IETF: Standard, Internet Society (I SOC),, Jun. 2011, 66 pages.
Forsberg,"Protocol for Carrying Authentication for Network Access (PANA)", Network Working Group, RFC 5191, Standards Track, May 2008, pp. 1-4 7, https://tools.ietf.org/html/rfc5191., May 2008, 46 pages.
Goyal,"A Mechanism to Measure the Routing Metrics along a Point-to-point Route in a Low Power and Lossy Network", draft-ietf-roll-p2p-measurement-10, Apr. 1, 2013, 28 pages.

(56) References Cited

OTHER PUBLICATIONS

Hinden, "Unique Local IPv6 Unicast Addresses", Network Working Group RFC 1717, Internet Society (ISOC) 4, Oct. 2005, 16 pages.
Hossen, "Interconnection between 802.15.4 Devices and IPv6: Implications and Existing Approaches", International Journal of Computer Science Issues (IJCSI), Jan. 1, 2010, 13 pages.
Keoh, "Securing the IP-based Internet of Things with DTLS;", drafl-keo-lwig-dtls-iot-1.1xt—Internet Engineering Task Force, StandardWorkingDrafl, Internet Society; Geneva, Switzerland, Feb. 25, 2013, 20 pages.
Kothmayr, "A DTLS based end-to-end security architecture for the Internet of Things with two-way authentication", 2012 IEEE 37th Conference on Local Computer Networks Workshops, Oct. 22, 2012, 8 pages.
Malkin, "RIPng for 1Pv6, Network Working Group", RFC 2080, Standards Track, https://www.ietf.org/rfc/rfc2080.txt., Jan. 1997, 19 pages.
Rescorla, "Datagram Transport Layer Security", The Internet Society, retrieved from <http://www.rfc-editor.org/rfc/rfc4347.txt> on Jun. 24, 2009, Apr. 2006, 25 pages.
Seggelmann, "Datagram Transport Layer Security", Version 1.0, License:UVM, CC-BY-ND, robin-seggelmann.de/papers/dtls. pdf., May 13, 2011, 14 pages.
Tariq, "Smart Grid Standards for Home and Building Automation", IEEE International Conference on Power System Technology (Powercon), Oct. 2012, 7 pages.
Watteyne, "RPL", https://openwsn.atlassian.net/wiki/display/OW/RPL., Nov. 19, 2012, 3 pages.
"Foreign Notice of Allowance", RU Application No. 2017113098, dated Oct. 25, 2017, 6 pages.
"Foreign Office Action", KR Application No. 10-2017-7021946, dated Oct. 13, 2017, 2 pages.
"Foreign Office Action", JP Application No. 2017-180135, dated Nov. 14, 2017, 4 pages.
"Foreign Notice of Allowance", KR Application No. 10-2016-7001528, dated Apr. 24, 2017, 3 pages.
"Foreign Notice of Allowance", AU Application No. 2017203264, dated May 31, 2017, 3 pages.
"Foreign Notice of Allowance", KR Application No. 10-2017-7009439, dated May 4, 2017, 4 pages.
"Foreign Office Action", JP Application No. 2016-523834, dated Mar. 7, 2017, 3 pages.
"Foreign Office Action", EP Application No. 14741727.3, dated Jun. 2, 2017, 6 pages.
Phelan, T , "Datagram Transport Layer Security (DTLS) over the Datagram Congestion Control Protocol (DCCP)", https://tools.ietf.org/html/rfc5238, 10 pages.
"Foreign Office Action", RU Application No. 2017113098, dated Jul. 19, 2017, 4 pages.
"Foreign Office Action", Japanese Application No. 2017-180135, dated Jun. 12, 2018, 3 pages.
"Foreign Office Action", Australian Application No. 2017272191, dated Oct. 20, 2018, 2 pages.
"Foreign Office Action", Mexican Application No. MX/a/2015/018000, dated Apr. 12, 2018, 1 page.
"Foreign Office Action", Chinese Application No. 201480045666.7, Apr. 28, 2018, 5 pages.
"Foreign Office Action", Russian Application No. 2017143553, dated Jun. 15, 2018, 2 pages.
"Foreign Office Action", Mexican Application No. MX/a/2015/018000, dated Aug. 23, 2018, 1 page.
"Foreign Office Action", Australian Application No. 2017239506, dated Sep. 14, 2018, 6 pages.
"Search Report", Russian Application No. 2017143553, dated May 30, 2018, 2 pages.
"Foreign Office Action", European Application No. 14741729.p, dated Nov. 21, 2018, 4 pages.
"Foreign Office Action", Canadian Application No. 2,916,595, dated Feb. 4, 2019, 5 pages.

\* cited by examiner

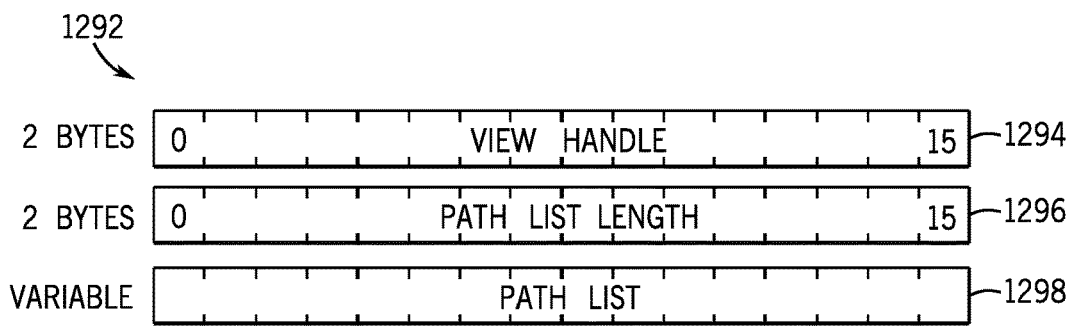
FIG. 37
```
FOO PROFILE
ANIMAL:
    FISH:
        MEDIUM:
        SIZE:
    FOWL:
        MEDIUM:
        SIZE:
BICYCLE:
    ROAD:
        # OF GEARS:
        SIZE:
        WEIGHT:
    MOUNTAIN:
        # OF GEARS:
        SIZE:
        WEIGHT:
    TRACK:
        # OF GEARS:
        SIZE:
        WEIGHT:
```
FIG. 38
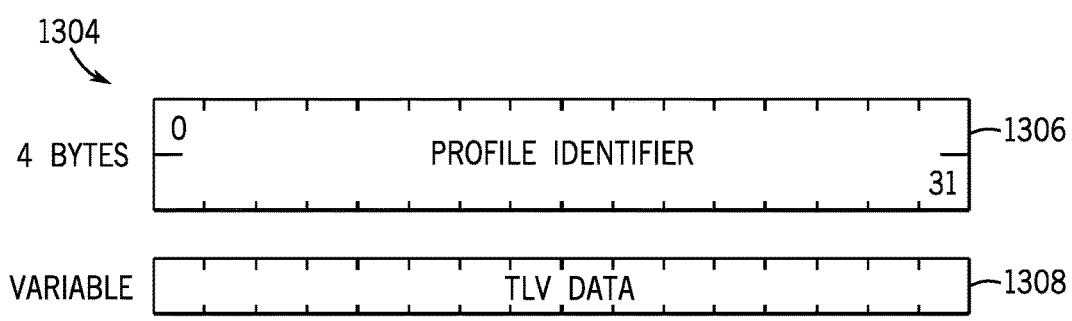
FIG. 39

EFFICIENT COMMUNICATION FOR DEVICES OF A HOME NETWORK

CROSS REFERENCE TO RELATED APPLICATIONS

This application is a Continuation Application of, and claims priority to, U.S. patent application Ser. No. 14/885,739, entitled "Efficient Communication for Devices of a Home Network", filed Oct. 16, 2015 which in turn is a Continuation Application of, and claims priority to, U.S. patent application Ser. No. 13/926,335, entitled "Efficient Communication for Devices of a Home Network", filed Jun. 25, 2013, the entirety of which is incorporated by reference herein for all purposes.

BACKGROUND

This disclosure relates to efficient communication to enable various devices, including low-power or sleepy devices, to communicate in a home network or similar environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes. Some of these devices are often capable of communicating with each other through a single network type (e.g., WiFi connection) using a transfer protocol. It may be desired to use less power intensive connection protocols for some devices that are battery powered or receive a reduced charge. However, in some scenarios, devices connected to a lower power protocol may not be able to communicate with devices connected to a higher power protocol (e.g., WiFi).

Moreover, numerous electronic devices are now capable of connecting to wireless networks. For example, smart meter technology employs a wireless network to communicate electrical energy consumption data associated with residential properties back to a utility for monitoring, billing, and the like. As such, a number of wireless networking standards are currently available to enable electronic devices to communicate with each other. Some smart meter implementations, for instance, employ Internet Protocol version 6 (IPv6) over Low power Wireless Personal Area Networks (6LoWPAN) to enable electronic devices to communicate with a smart meter. However, the currently available wireless networking standards such as 6LoWPAN may not be generally well equipped to support electronic devices dispersed throughout a residence or home for one or more practical scenarios. That is, the currently available wireless networking standards may not efficiently connect all electronic devices of a network in a secure yet simple, consumer-friendly manner in view of one or more known practical constraints. Moreover, for one or more practical scenarios, the currently available wireless networking standards may not provide an efficient way to add new electronic devices to an existing wireless network in an ad hoc manner.

Additionally, when providing a wireless network standard for electronic devices for use in and around a home, it would be beneficial to use a wireless network standard that provides an open protocol for different devices to learn how to gain access to the network. Also, given the number of electronic devices that may be associated with a home, it would be beneficial that the wireless network standard be capable of supporting Internet Protocol version 6 (IPv6) communication such that each device may have a unique IP address and may be capable of being accessed via the Internet, via a local network in a home environment, and the like. Further, it would be beneficial for the wireless network standard to allow the electronic devices to communicate within the wireless network using a minimum amount of power. With these features in mind, it is believed that one or more shortcomings is presented by each known currently available wireless networking standard in the context of providing a low power, IPv6-based, wireless mesh network standard that has an open protocol and can be used for electronic devices in and around a home. For example, wireless network standards such as Bluetooth®, Dust Networks®, Z-Wave®, WiFi, and ZigBee® fail to provide one or more of the desired features discussed above.

Bluetooth®, for instance, generally provides a wireless network standard for communicating over short distances via short-wavelength radio transmissions. As such, Bluetooth's® wireless network standard may not support a communication network of a number of electronic devices disposed throughout a home. Moreover, Bluetooth's® wireless network standard may not support wireless mesh communication or IPv6 addresses.

As mentioned above, the wireless network standard provide by Dust Networks® may also bring about one or more shortcomings with respect to one or more features that would enable electronic devices disposed in a home to efficiently communicate with each other. In particular, Dust Networks'® wireless network standard may not provide an open protocol that may be used by others to interface with the devices operating on Dust Networks' network. Instead, Dust Networks® may be designed to facilitate communication between devices located in industrial environments such as assembly lines, chemical plants, and the like. As such, Dust Networks'® wireless network standard may be directed to providing a reliable communication network that has pre-defined time windows in which each device may communicate to other devices and listen for instructions from other devices. In this manner, Dust Networks'® wireless network standard may require sophisticated and relatively expensive radio transmitters that may not be economical to implement with consumer electronic devices for use in the home.

Like Dust Networks'® wireless network standard, the wireless network standard associated with Z-Wave® may not be an open protocol. Instead, Z-wave's® wireless network standard may be available only to authorized clients that embed a specific transceiver chip into their device. Moreover, Z-wave's® wireless network standard may not support IPv6-based communication. That is, Z-wave's® wireless network standard may require a bridge device to translate data generated on a Z-Wave® device into IP-based data that may be transmitted via the Internet.

Referring now to ZigBee's® wireless network standards, ZigBee® has two standards commonly known as ZigBee® Pro and ZigBee® IP. Moreover, ZigBee® Pro may have one or more shortcomings in the context of support for wireless mesh networking. Instead, ZigBee® Pro may depend at least in part on a central device that facilitates communication between each device in the ZigBee® Pro network. In addition to the increased power requirements for that central device, devices that remain on to process or reject certain wireless traffic can generate additional heat within their housings that may alter some sensor readings, such as temperature readings, acquired by the device. Since such sensor readings may be useful in determining how each device within the home may operate, it may be beneficial to avoid unnecessary generation of heat within the device that may alter sensor readings. Additionally, ZigBee® Pro may not support IPv6 communication.

Referring now to ZigBee® IP, ZigBee® IP may bring about one or more shortcomings in the context of direct device-to-device communication. ZigBee® IP is directed toward the facilitation of communication by relay of device data to a central router or device. As such, the central router or device may require constant powering and therefore may not represent a low power means for communications among devices. Moreover, ZigBee® IP may have a practical limit in the number of nodes (i.e., ~20 nodes per network) that may be employed in a single network. Further, ZigBee® IP uses a "Ripple" routing protocol (RPL) that may exhibit high bandwidth, processing, and memory requirements, which may implicate additional power for each ZigBee® IP connected device.

Like the ZigBee® wireless network standards discussed above, WiFi's wireless network may exhibit one or more shortcomings in terms of enabling communications among devices having low-power requirements. For example, WiFi's wireless network standard may also require each networked device to always be powered up, and furthermore may require the presence of a central node or hub. As known in the art, WiFi is a relatively common wireless network standard that may be ideal for relatively high bandwidth data transmissions (e.g., streaming video, syncing devices). As such, WiFi devices are typically coupled to a continuous power supply or rechargeable batteries to support the constant stream of data transmissions between devices. Further, WiFi's wireless network may not support wireless mesh networking. Even so, WiFi sometimes may offer better connectivity than some lower-powered protocols.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are provided for efficient communication through a fabric network of devices in a home environment or similar environment. For example, an electronic device may efficiently control communication to balance power and reliability concerns, may efficiently communicate messages to certain preferred networks by analyzing Internet Protocol version 6 (IPv6) packet headers that use an Extended Unique Local Address (EULA), may efficiently communicate software updates and status reports throughout a fabric network, and/or may easily and efficiently join a fabric network.

For instance, an electronic device may include memory or storage storing instructions to operate a network stack, a processor to execute the instructions, and a network interface to join a network-connected fabric of devices and communicate a message to a target device of the fabric of devices using the network stack. The network stack may include an application layer to provide an application payload with data to be transmitted in the message, a platform layer to encapsulate the application payload in a general message format of the message, a transport layer to selectably transport the message using either User Datagram Protocol (UDP) or Transmission Control Protocol (TCP), and a network layer to communicate the message using Internet Protocol Version 6 (IPv6) via one or more networks. These networks may include, for example, an 802.11 wireless network, an 802.15.4 wireless network, a powerline network, a cellular network, and/or an Ethernet network. Moreover, the application layer, the platform layer, the transport layer, and/or the network layer may determine a property of the manner of communication of the message to the target node based at least in part on a type of the message, the network over which the message is to be sent, a distance over which the message may travel through the fabric, power consumption behavior of the electronic device, power consumption behavior of the target device, and/or power consumption behavior of an intervening device of the fabric of devices that is to communicate the message between the electronic device and the target device. Further, varying the property of the manner of communication may cause the electronic device, the target device, and/or the intervening device to consume different amounts of power and cause the message to more reliably or less reliably reach the target node.

In another example, a tangible, non-transitory computer-readable medium may include to be executed by a first electronic device communicably coupled to other electronic devices of a fabric of devices in a home environment. The instructions may include those to receive an Internet Protocol version 6 (IPv6) message at the first electronic device from a second electronic device over a first network of the fabric of devices. The message may be bound for a target electronic device. The instructions may further include instructions to identify an Extended Unique Local Address encoded in an IPv6 header of the message. Here, the Extended Unique Local Address may indicate that a second network is preferred to reach the target electronic device. The instructions also may include instructions to communicate the message through the fabric of devices toward the target electronic device using second network based at least in part on the Extended Unique Local Address.

A method for transferring a software update over a fabric network may include sending an image query message from a first device in the fabric network to a second device in the fabric network or a local or remote server. The image query message may include information regarding software stored on the first device and transfer capabilities of the first device. An image query response may be received by the first device from the second device or the local or remote server. The image query response may indicate whether the software update is available and includes download information having a uniform resource identifier (URI) to enable the first device to download the software update. The image query message may include sender information regarding software stored on a sender device and transfer capabilities of the sender device and an update priority. Using the URI, the software update may be downloaded at the first device from the sender device. The software may be downloaded at a time based at least in part on the update priority and network traffic in the fabric network, and may be downloaded in a manner based at least in part on common transfer capabilities indicated in the image query and the image query response.

In a further example, a tangible, non-transitory computer-readable medium may store a status reporting format. The status reporting format may include a profile field to indicate a status update type of a plurality of status update types, a status code to indicate a status being reported—the status code may be interpreted in a manner based at least in part on the status update type—and a next status field to indicate whether an additional status is included in a status report formed using the status reporting format.

Another example of an electronic device includes memory to store instructions to enable the first electronic device to pair with a fabric network comprising a second electronic device, a processor to execute the instructions, and a network interface to access 802.11 and 802.15.4 logical networks. The instructions may include instructions to establish communication with the second electronic device via a first 802.15.4 logical network. The second electronic device may be paired with the fabric network and may communicate with a service via another logical network in the fabric network. The instructions may also include instructions to receive network configuration information from the service via the second electronic device to enable the first electronic device to join a first 802.11 logical network and to establish communication over the first 802.11 logical network, connect to the service via the first 802.11 logical network, and register to pair with the fabric network via communication with the service.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 37 illustrates a snapshot request frame that may be used in the sequence of FIG. 36, in accordance with an embodiment;

FIG. 38 illustrates an example profile schema that may be accessed using the snapshot request frame of FIG. 37, in accordance with an embodiment;

FIG. 39 is a binary format of a path that may indicate a path in a profile schema, in accordance with an embodiment;

DETAILED DESCRIPTION

Figure 1:
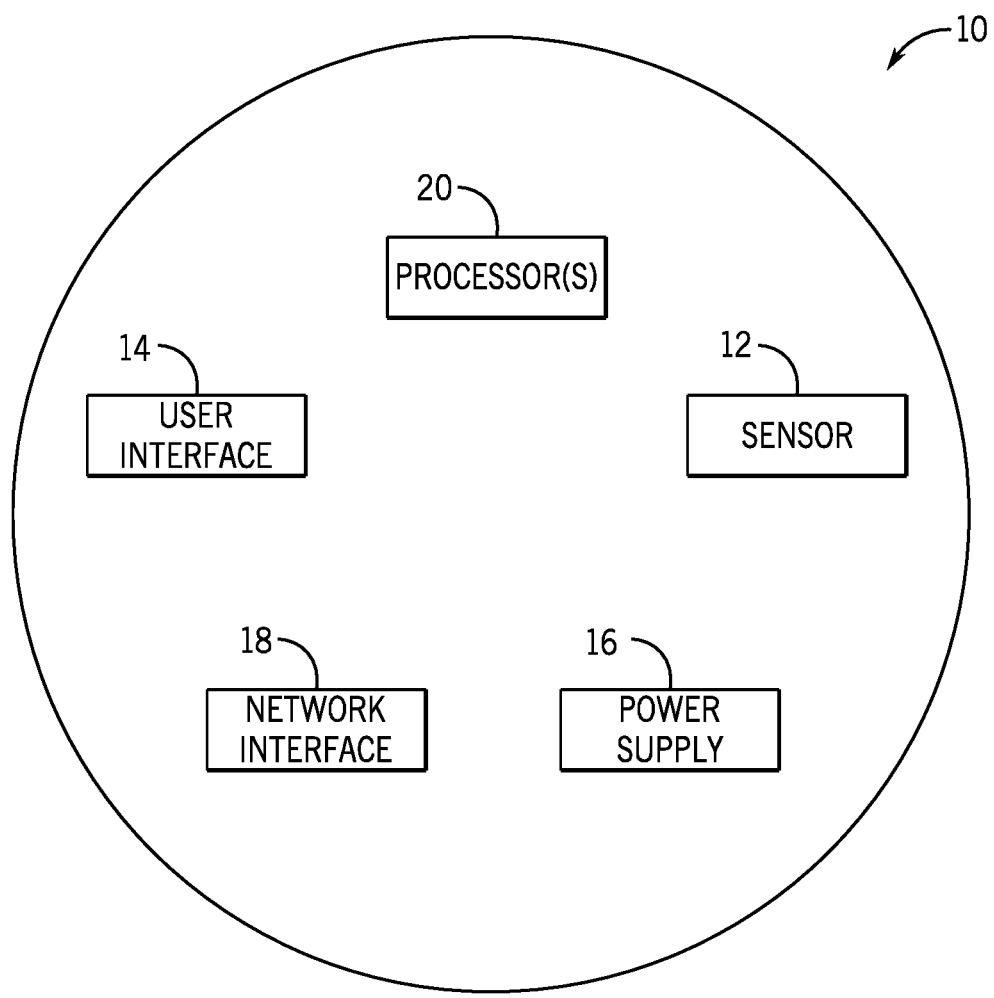
FIG. 1 illustrates a block diagram of a general device that may communicate with other devices disposed in a home environment using an efficient network layer protocol, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing," when referring to home devices, refer to deriving power from a power transformer through the equipment load without using a direct or common wire source directly from the transformer.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

As used herein, the term "hazard detector" refers to any home device that can detect evidence of fire (e.g., smoke, heat, carbon monoxide) and/or other hazardous conditions (e.g., extreme temperatures, buildup of dangerous gases).

This disclosure relates to efficient communication that may be used by devices communicating with each other in a home environment. The efficient communication of this disclosure may enable a fabric of devices and/or services to communicate in the home environment. Indeed, consumers living in homes may find it useful to coordinate the operations of various devices within their home such that all of their devices are operated efficiently. For example, a thermostat device may be used to detect a temperature of a home and coordinate the activity of other devices (e.g., lights) based on the detected temperature. The thermostat device may detect a temperature that may indicate that the temperature outside the home corresponds to daylight hours. The thermostat device may then convey to the light device that there may be daylight available to the home and that thus the light should turn off. In another example, a smart hazard detector may be able to detect environmental conditions that indicate occupancy. The thermostat device may query the hazard detector for these environmental conditions and vary its operation accordingly. In addition to efficiency, consumers may generally prefer user-friendly devices that involve a minimum amount of set up or initialization. That is, consumers may generally prefer devices that are fully operational after performing a few number initialization steps, especially those that may be performed by almost any individual regardless of age or technical expertise.

To effectively and efficiently communicate data between each other within the home environment, the devices may use a fabric network that includes one or more logical networks to manage communication between the devices. That is, the efficient fabric network may enable numerous devices within a home to communicate with each other using one or more logical networks. The fabric network may be supported by an efficient communication scheme involving, for example, an efficient network layer, an efficient platform layer, and/or an efficient application layer to manage communication. The fabric network may support Internet Protocol version 6 (IPv6) communication such that each connected device may have a unique local address (ULA). In some examples, the IPv6 communications may employ an Extended Unique Local Address (EULA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

On a relatively lower layer of the communication protocol (e.g., the network layer), the fabric efficient network layer may establish a communication network in which numerous devices within a home may communicate with each other via a wireless mesh network. The communication network may support Internet Protocol version 6 (IPv6) communication such that each connected device may have a unique Internet Protocol (IP) address. Moreover, to enable each device to integrate with a home, it may be useful for each device to communicate within the network using low amounts of power. That is, by enabling devices to communicate using low power, the devices may be placed anywhere in a home without being coupled to a continuous power source.

The efficient network layer may thus establish a procedure in which data may be transferred between two or more devices such that the establishment of the communication network involves little user input, the communication between devices involves little energy, and the communication network, itself, is secure. In one embodiment, the efficient network layer may be an IPv6-based communication network that employs Routing Information Protocol-Next Generation (RIPng) as its routing mechanism and a Datagram Transport Layer Security (DTLS) protocol as its security mechanism. As such, the efficient network layer may provide a simple means for adding or removing devices to a home while protecting the information communicated between the connected devices.

On relatively higher layers of the communication protocol (e.g., the platform and/or application layers), the fabric of devices may be created and maintained. These layers may enable parametric software updates and status reports throughout the fabric. These layers may also provide communication that may be aware of certain network power constraints, such as the power constraints of "sleepy" or battery-powered devices, and may communicate messages with these factors in mind.

As such, embodiments of this disclosure relate to systems and methods a fabric network that includes one or more logical networks that enables devices connected to the fabric to communicate with each other using a list of protocols and/or profiles known to the devices. The communications between the devices may follow a typical message format that enables the devices to understand communications between the devices regardless of which logical networks the communicating devices are connected to in the fabric. Within the message format, a payload of data may be included for the receiving device to store and/or process. The format and the contents of the payload may vary according to a header within the payload that indicates a profile (including one or more protocols) and/or a type of message that is being sent according to the profile.

According to some embodiments, two or more devices in a fabric may communicate using status reporting protocols or profiles. For example, in certain embodiments, a status reporting protocol or schema may be included in a core profile that is available to devices connected to the fabric. Using the status reporting protocol, devices may send or request status information to or from other devices in the fabric.

Similarly, in certain embodiments, two or more devices in a fabric may communicate using update software protocols or profiles. In some embodiments, the update software protocol or schema may be included in a core profile that is available to devices connected to the fabric. Using the update software protocol, devices may request, send, or notify the presence of updates within the fabric.

In certain embodiments, two or more devices in a fabric may communicate using data management protocols or profiles. In some embodiments, the data management protocol or schema may be included in a core profile that is available to devices connected to the fabric. Using the update data management protocol, devices may request, view, or track node-resident information that is stored in other devices.

Furthermore, in certain embodiments, two or more devices in a fabric may transfer data using bulk data transfer protocols or profiles. In some embodiments, the bulk data transfer protocol or schema may be included in a core profile that is available to devices connected to the fabric. Using the bulk data transfer protocol, devices may initiate, send, or receive bulk data using any logical networks in the fabric. In certain embodiments, either a sending or a receiving device using the bulk data transfer protocol may be able to "drive" a synchronous transfer between the devices. In other embodiments, the bulk transfer may be performed with an asynchronous transfer.

Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 104 or based on a displacement of a user-interface components 104 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. In one embodiment, the network interface 18 may communicate using an efficient network layer as part of its Open Systems Interconnection (OSI) model. In one embodiment, the efficient network layer, which will be described in more detail below with reference to FIG. 5, may enable the device 10 to wirelessly communicate IPv6-type data or traffic using a RIPng routing mechanism and a DTLS security scheme. As such, the network interface 18 may include a wireless card or some other transceiver connection.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In certain embodiments, the processor 20 may also include a high-power processor and a low-power processor. The high-power processor may execute computational intensive operations such as operating the user-interface component 14 and the like. The low-power processor, on the other hand, may manage less complex processes such as detecting a hazard or temperature from the sensor 12. In one embodiment, the low-power processor may wake or initialize the high-power processor for computationally intensive processes.

In some instances, the processor 20 may predict desirable settings and/or implement those settings. For example, based on the presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device via the efficient network layer, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 10 may include a thermostat such as a Nest® Learning Thermostat. Here, the thermostat may include sensors 12 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user-interface component 14. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 18 to communicate with a light switch device such that it may send a signal to the light switch device when the building is determined to be vacant. In this manner, the thermostat may efficiently manage the energy use of the building.

Figure 2:
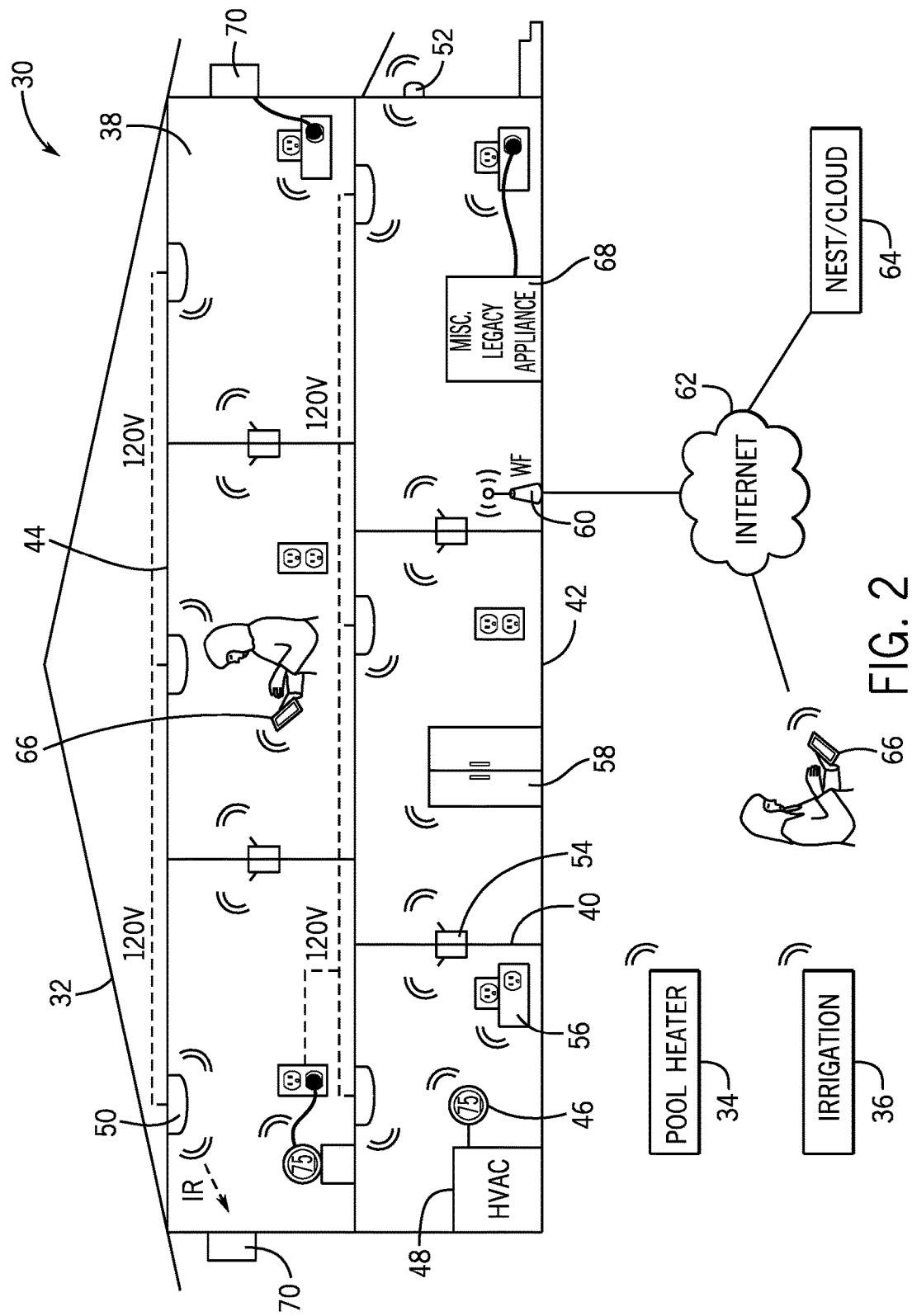
FIG. 2 illustrates a block diagram of a home environment in which the general device of FIG. 1 may communicate with other devices via the efficient network layer protocol, in accordance with an embodiment.

Keeping the foregoing in mind, FIG. 2 illustrates a block diagram of a home environment 30 in which the device 10 of FIG. 1 may communicate with other devices via the efficient network layer. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes a number of rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include a plurality of devices, including intelligent, multi-sensing, network-connected devices that may integrate seamlessly with each other and/or with cloud-based server systems to provide any of a variety of useful home objectives. One, more, or each of the devices illustrated in the home environment 30 may include one or more sensors 12, a user interface 14, a power supply 16, a network interface 18, a processor 20 and the like.

Example devices 10 may include a network-connected thermostat 46 such as Nest® Learning Thermostat—1st Generation T100577 or Nest® Learning Thermostat—2nd Generation T200577 by Nest Labs, Inc. The thermostat 46 may detect ambient climate characteristics (e.g., temperature and/or humidity) and control a heating, ventilation and air-conditioning (HVAC) system 48. Another example device 10 may include a hazard detection unit 50 such as a hazard detection unit by Nest®. The hazard detection unit 50 may detect the presence of a hazardous substance and/or a hazardous condition in the home environment 30 (e.g., smoke, fire, or carbon monoxide). Additionally, an entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via the efficient network layer that will be discussed below with reference to FIG. 5. In one embodiment, the efficient network layer may enable the devices 10 to communicate with each other via a wireless mesh network. As such, certain devices may serve as wireless repeaters and/or may function as bridges between devices in the home environment that may not be directly connected (i.e., one hop) to each other.

In one embodiment, a wireless router 60 may further communicate with the devices 10 in the home environment 30 via the wireless mesh network. The wireless router 60 may then communicate with the Internet 62 such that each device 10 may communicate with a central server or a cloud-computing system 64 through the Internet 62. The central server or cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the central server or cloud-computing system 64 to the devices (e.g., when available, when purchased, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current set point temperature for a device and adjust it using a computer that may be connected to the Internet 62. In this example, the thermostat 46 may receive the current set point temperature view request via the wireless mesh network created using the efficient network layer.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infrared (IR) controlled wall air conditioners or other IR-controlled devices, which can be controlled by IR signals provided by the hazard detection units 50 or the light switches 54.

Figure 3:
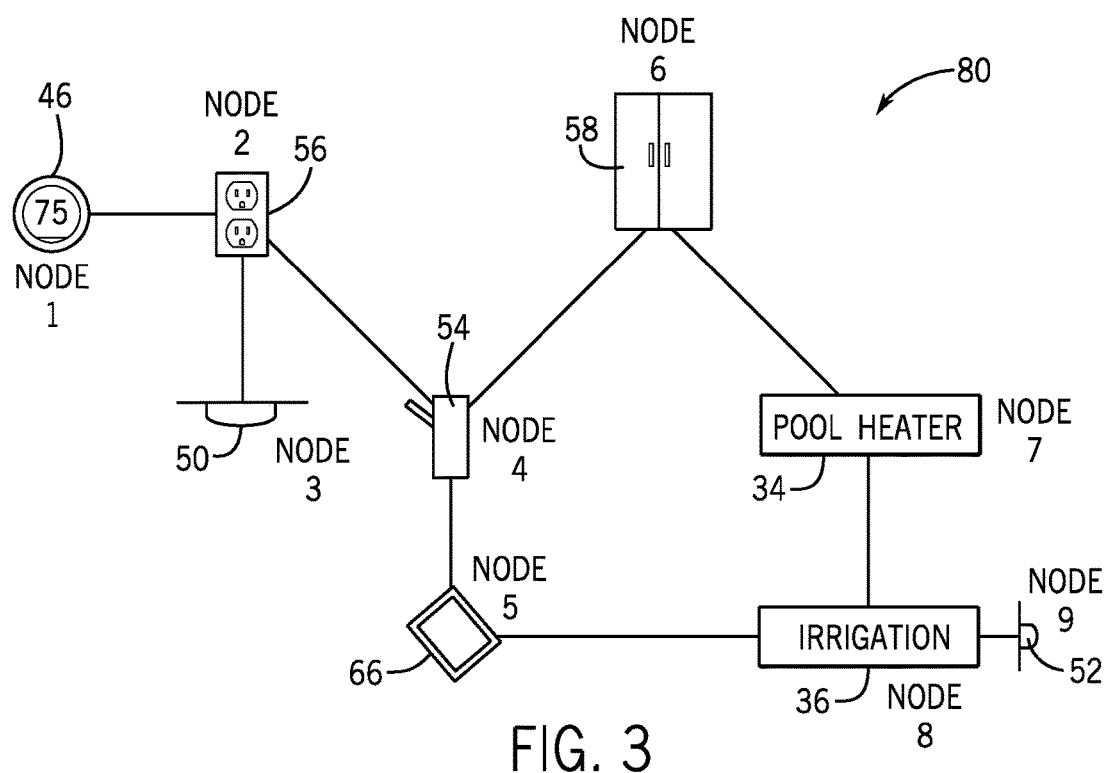
FIG. 3 illustrates an example wireless mesh network associated with the devices depicted in the home environment of FIG. 2, in accordance with an embodiment.

As mentioned above, each of the example devices 10 described above may establish a wireless mesh network such that data may be communicated to each device 10. Keeping the example devices of FIG. 2 in mind, FIG. 3 illustrates an example wireless mesh network 80 that may be employed to facilitate communication between some of the example devices described above. As shown in FIG. 3, the thermostat 46 may have a direct wireless connection to the plug interface 56, which may be wirelessly connected to the hazard detection unit 50 and to the light switch 54. In the same manner, the light switch 54 may be wirelessly coupled to the appliance 58 and the portable electronic device 66. The appliance 58 may just be coupled to the pool heater 34 and the portable electronic device 66 may just be coupled to the irrigation system 36. The irrigation system 36 may have a wireless connection to the entryway interface device 52. Each device in the wireless mesh network 80 of FIG. 3 may correspond to a node within the wireless mesh network 80. In one embodiment, the efficient network layer may specify that each node transmit data using a RIPng protocol and a DTLS protocol such that data may be securely transferred to a destination node via a minimum number of hops between nodes.

Figure 4:
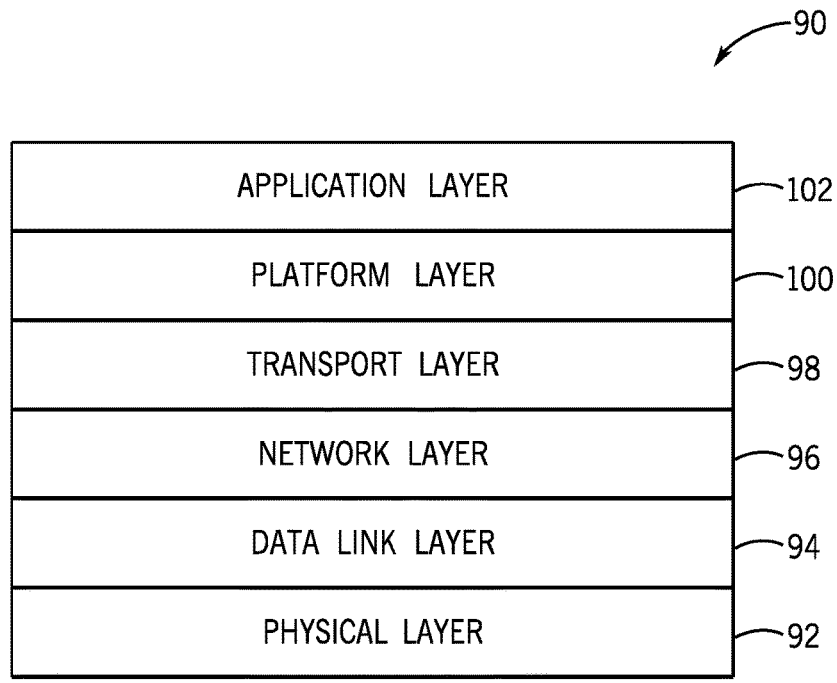
FIG. 4 illustrates a block diagram of an Open Systems Interconnection (OSI) model that characterizes a communication system for the home environment of FIG. 2, in accordance with an embodiment.

Generally, the efficient network layer may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it. In at least some embodiments, a higher layer may be agnostic to technologies used in lower layers. For example, in certain embodiments, the platform layer 100 may be agnostic to the network type used in the network layer 96.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred.

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 may establish connections between devices according to the protocol specified within the transport layer 98. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

Efficient Network Layer

Figure 5:
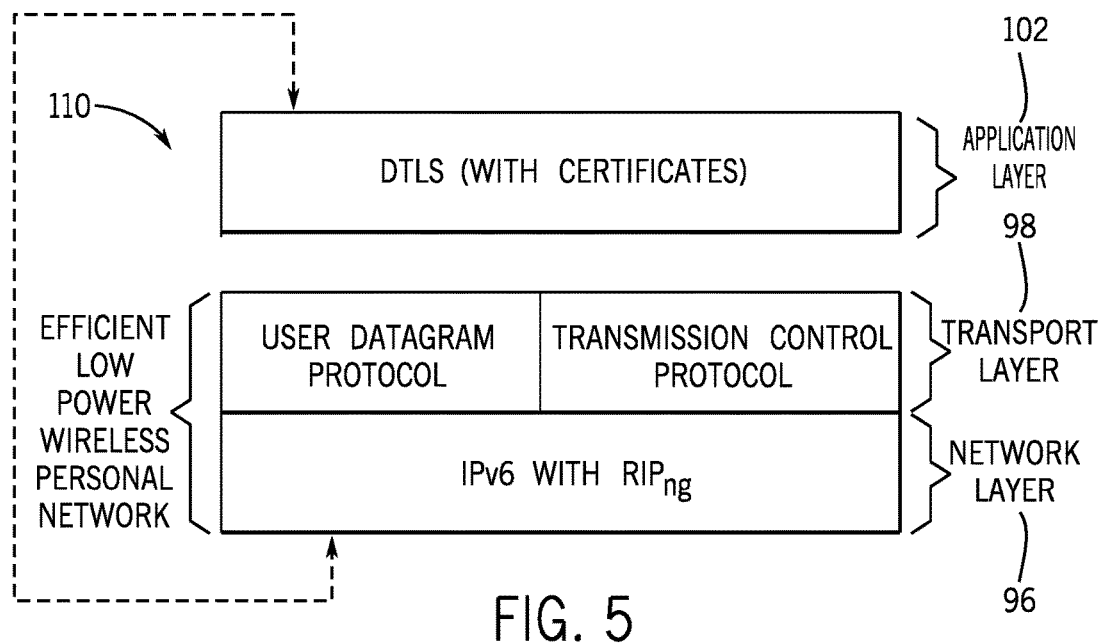
FIG. 5 illustrates a detailed view an efficient network layer in the OSI model of FIG. 4, in accordance with an embodiment.

Referring now to FIG. 5, in one embodiment, the network layer 96 and the transport layer 98 may be configured in a certain manner to form an efficient low power wireless personal network (ELoWPAN) 110. In one embodiment, the ELoWPAN 110 may be based on an IEEE 802.15.4 network, which may correspond to low-rate wireless personal area networks (LR-WPANs). The ELoWPAN 110 may specify that the network layer 96 may route data between the devices 10 in the home environment 30 using a communication protocol based on Internet Protocol version 6 (IPv6). As such, each device 10 may include a 128-bit IPv6 address that may provide each device 10 with a unique address to use to identify itself over the Internet, a local network around the home environment 30, or the like.

In one embodiment, the network layer 96 may specify that data may be routed between devices using Routing Information Protocol-Next Generation (RIPng). RIPng is a routing protocol that routes data via a wireless mesh network based on a number of hops between the source node and the destination node. That is, RIPng may determine a route to the destination node from the source node that employs the least number of hops when determining how the data will be routed. In addition to supporting data transfers via a wireless mesh network, RIPng is capable of supporting IPv6 networking traffic. As such, each device 10 may use a unique IPv6 address to identify itself and a unique IPv6 address to identify a destination node when routing data. Additional details with regard to how the RIPng may send data between nodes will be described below with reference to FIG. 6.

As mentioned above, the network layer 96 may also provide a security protocol that may manage the integrity of the data being transferred. Here, the efficient network layer may secure data transferred between devices using a Datagram Transport Layer Security (DTLS) protocol. Generally, Transport Layer Security (TLS) protocol is commonly used to protect data transfers via the Internet. However, in order for the TLS protocol to be effective, the TLS protocol may transport data using a reliable transport channel such as Transmission Control Protocol (TCP). DTLS provides a similar level of security for transferred data while supporting unreliable transport channels such as User Datagram Protocol (UDP). Additional details with regard to the DTLS protocol will be described below with reference to FIGS. 8 and 9.

The network layer 96 depicted in FIG. 5 is characterized herein as the efficient network layer mentioned above. That is, the efficient network layer routes IPv6 data using RIPng and secures the routed data using the DTLS protocol. Since the efficient network layer uses the DTLS protocol to secure data transfer between devices, the transport layer 98 may support TCP and UDP transfer schemes for the data.

Figure 6:
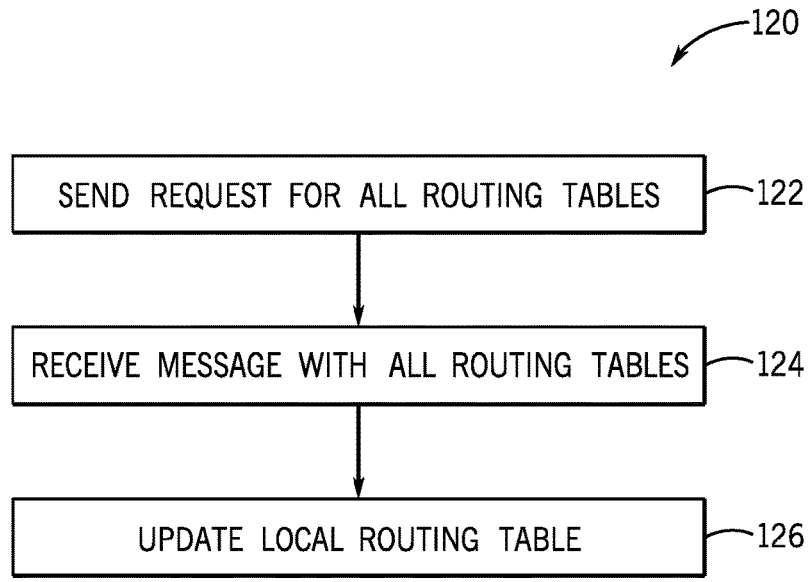
FIG. 6 illustrates a flowchart of a method for implementing a Routing Information Protocol-Next Generation (RIPng) network as a routing mechanism in the efficient network layer of FIG. 5, in accordance with an embodiment.

Referring now to FIG. 6, FIG. 6 depicts a flowchart of a method 120 that may be used for determining a routing table for each device 10 in the wireless mesh network 80 of FIG. 3 using RIPng. The method 120 may be performed by each device 10 in the home environment 30 such that each device 10 may generate a routing table that indicates how each node in the wireless mesh network 80 may be connected to each other. As such, each device 10 may independently determine how to route data to a destination node. In one embodiment, the processor 20 of the device 10 may perform the method 120 using the network interface 18. As such, the device 10 may send data associated with the sensor 12 or determined by the processor 18 to other devices 10 in the home environment 30 via network interface 18.

The following discussion of the method 120 will be described with reference to FIGS. 7A-7D to clearly illustrate various blocks of the method 120. Keeping this in mind and referring to both FIG. 6 and FIG. 7A, at block 122, the device 10 may send a request 132 to any other device 10 that may be directly (i.e., zero hops) to the requesting device 10. The request 132 may include a request for all of the routing information from the respective device 10. For example, referring to FIG. 7A, the device 10 at node 1 may send the request 132 to the device 10 at node 2 to send all of the routes (i.e., N2's routes) included in node 2's memory.

Figure 7A:
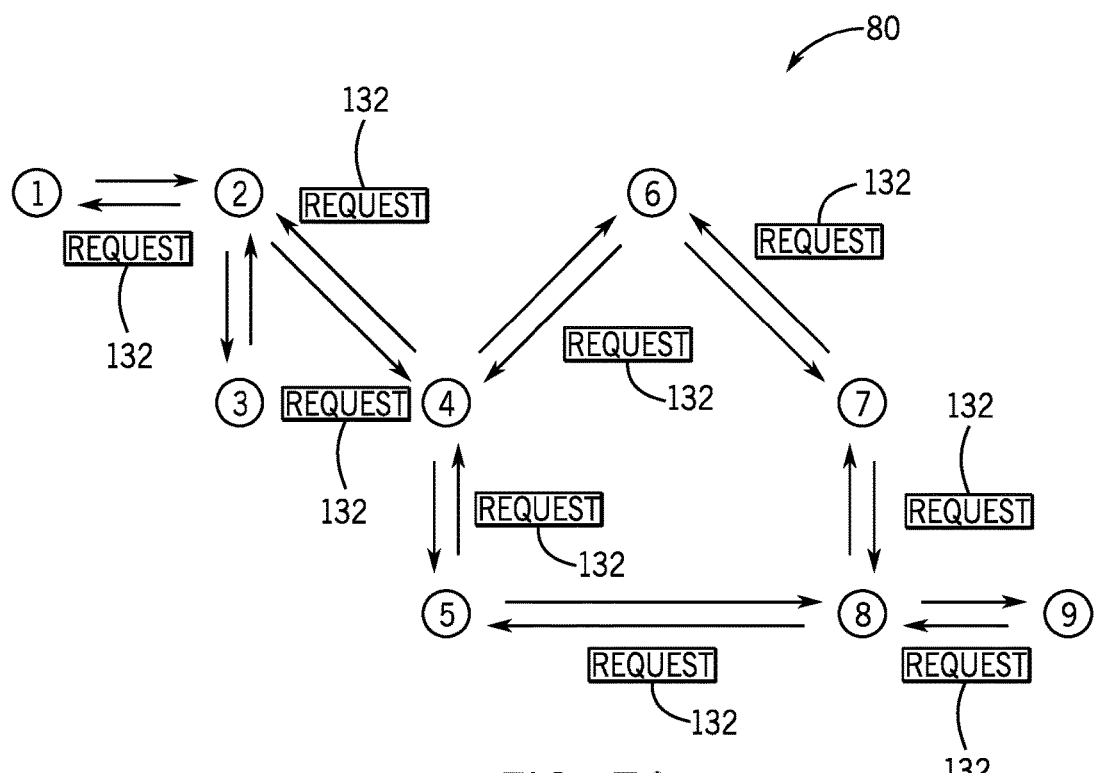
FIG. 7A-7D illustrates an example of how the RIPng network of the method of FIG. 6 can be implemented, in accordance with an embodiment.
Figure 7B:
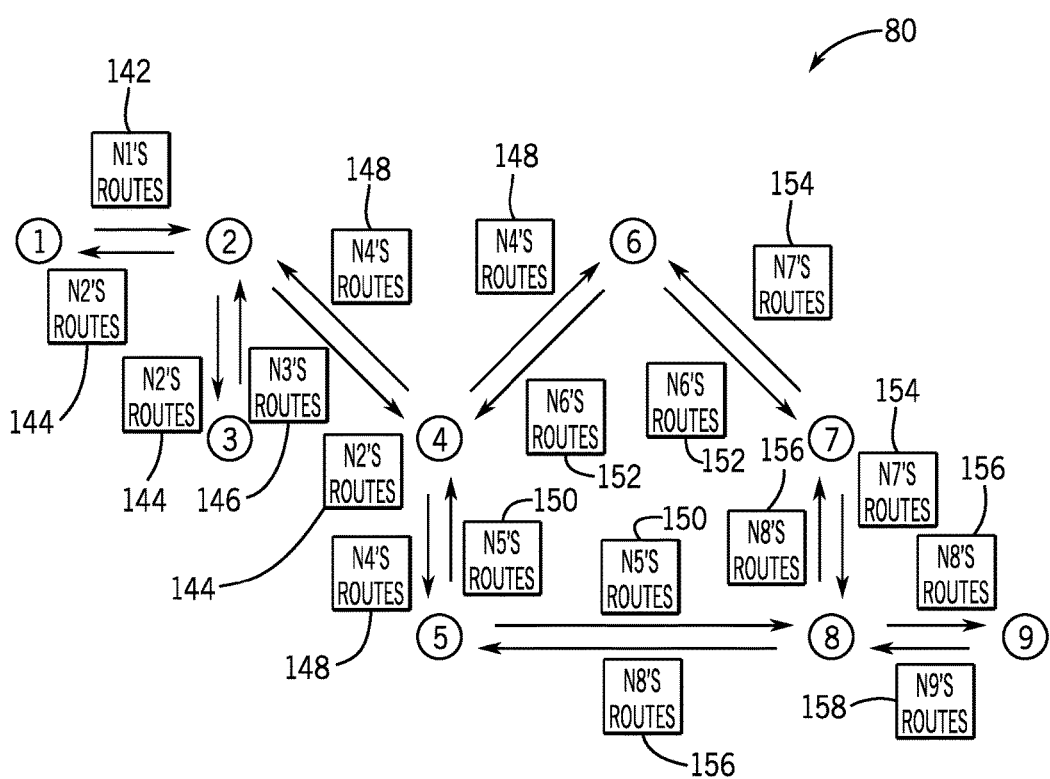

At block 124, the requesting device 10 may receive a message from the respective device 10 that may include all of the routes included in the respective memory of the respective device 10. The routes may be organized in a routing table that may specify how each node in the wireless mesh network 80 may be connected to each other. That is, the routing table may specify which intermediate nodes data may be transferred to such that data from a source node to a destination node. Referring back to the example above and to FIG. 7B, in response to node 1's request for N2's routes, at block 124, node 2 may send node 1 all of the routes (N2's routes 144) included in the memory or storage of node 2. In one embodiment, each node of the wireless mesh network 80 may send the request 132 to its adjacent node as shown in FIG. 7A. In response, each node may then send its routes to its adjacent node as shown in FIG. 7B. For instance, FIG. 7B illustrates how each node sends its route data to each adjacent node as depicted with N1's routes 142, N2's routes 144, N3's routes 146, N4's routes 148, N5's routes 150, N6's routes 152, N7's routes 154, N8's routes 156, and N9's routes 158.

Initially, each node may know the nodes in which it may have a direct connection (i.e., zero hops). For example, initially, node 2 may just know that it is directly connected to node 1, node 3, and node 4. However, after receiving N1's routes 142, N3's routes 146, and N4's routes 148, the processor 20 of node 2 may build a routing table that includes all of the information included with N1's routes 142, N3's routes 146, and N4's routes 148. As such, the next time node 2 receives a request for its routes or routing table (i.e., N2's routes 144), node 2 may send a routing table that includes N1's routes 142, N2's routes, N3's routes 146, and N4's routes 148.

Keeping this in mind and referring back to FIG. 6, at block 126, the requesting device 10 may update its local routing table to include the routing information received from the adjacent device 10. In certain embodiments, each device 10 may perform the method 120 periodically such that each device 10 includes an updated routing table that characterizes how each node in the wireless mesh network 80 may be connected to each other. As mentioned above, each time the method 120 is performed, each device 10 may receive additional information from its adjacent device 10 if the adjacent device 10 updated its routing table with the information received from its adjacent devices. As a result, each device 10 may understand how each node in the wireless mesh network 80 may be connected to each other.

Figure 7C:
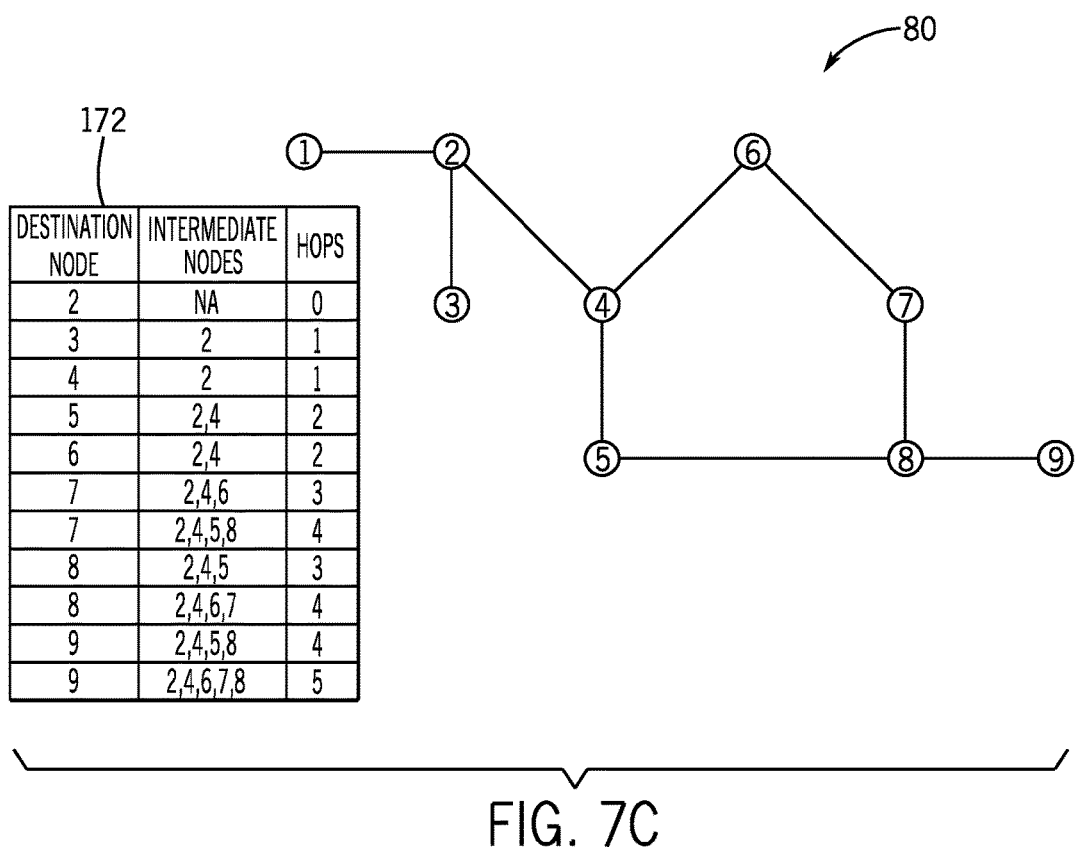

FIG. 7C, for example, illustrates a routing table 172 that may have been determined by the device 10 at node 1 using the method 120. In this example, the routing table 172 may specify each node in the wireless mesh network 80 as a destination node, the intermediate nodes between node 1 and each destination node, and a number of hops between node 1 and the destination node. The number of hops corresponds to a number of times that the data being sent to the destination node may be forwarded to an intermediate node before reaching the destination node. When sending data to a particular destination node, the RIPng routing scheme may select a route that involves the least number of hops. For instance, if node 1 intended to send data to node 9, the RIPng routing scheme would route the data via nodes 2, 4, 5, and 8, which includes four hops, as opposed to routing the data via nodes 2, 4, 6, 7, and 8, include includes five hops.

By using the RIPng routing scheme, each device 10 may independently determine how data should be routed to a destination node. Conventional routing schemes such as "Ripple" Routing Protocol (RPL) used in 6LoWPAN devices, on the other hand, may route data through a central node, which may be the only node that knows the structure of the wireless mesh network. More specifically, the RPL protocol may create a wireless mesh network according to a directed acyclic graph (DAG), which may be structured as a hierarchy. Located at the top of this hierarchy may include a border router, which may periodically multicasts requests to lower level nodes to determine a rank for each of the node's connections. In essence, when data is transferred from a source node to a destination node, the data may be transferred up the hierarchy of nodes and then back down to the destination node. In this manner, the nodes located higher up the hierarchy may route data more often than the nodes located lower in the hierarchy. Moreover, the border router of the RPL system may also be operating more frequently since it controls how data will be routed via the hierarchy. In the conventional RPL system, in contrast to the RIPng system taught here, some nodes may route data on a more frequent basis simply due to its location within the hierarchy and not due to its location with respect to the source node and the destination node. These nodes that route data more often under the RPL system may consume more energy and thus may not be a suitable to implement with the devices 10 in the home environment 30 that operate using low power. Moreover, as mentioned above, if the border router or any other higher-level node of the RPL system corresponds to the thermostat 46, the increased data routing activity may increase the heat produced within the thermostat 46. As a result, the temperature reading of the thermostat 46 may incorrectly represent the temperature of the home environment 30. Since other devices 10 may perform specific operations based on the temperature reading of the thermostat 46, and since the thermostat 46 may send commands to various devices 10 based on its temperature reading, it may be beneficial to ensure that the temperature reading of the thermostat 46 is accurate.

Figure 7D:
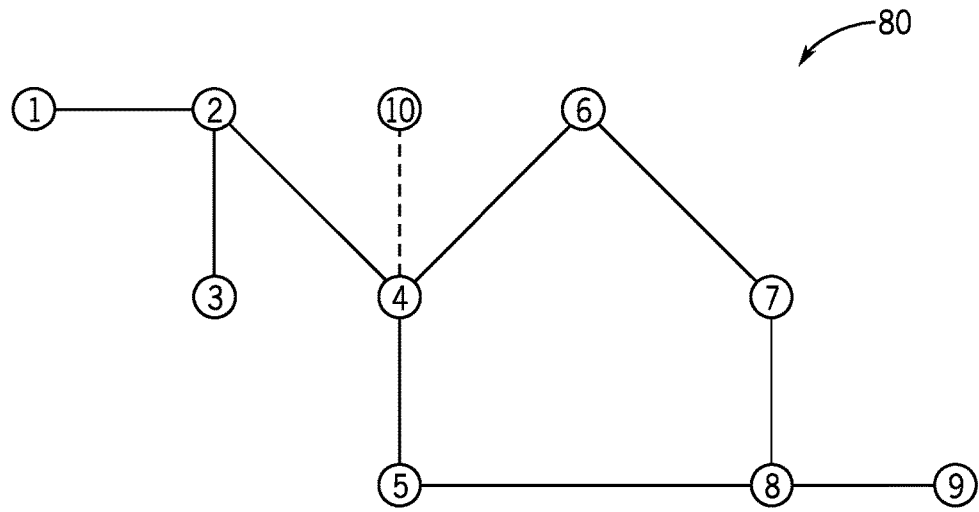

In addition to ensuring that none of the devices 10 routes data a disproportionate amount of times, by using the RIPng routing scheme, new devices 10 may be added to the wireless mesh network with minimum effort by the user. For example, FIG. 7D illustrates a new node 10 being added to the wireless mesh network 80. In certain embodiments, once the node 10 establishes a connection to the wireless mesh network 80 (e.g., via node 4), the device 10 that corresponds to node 10 may perform the method 120 described above to determine how data may be routed to each node in the wireless mesh network 80. If each node in the wireless mesh network 80 has already performed the method 120 multiple times, the device 10 at node 10 may receive the entire routing structure of the wireless mesh network 80 from the device 10 at node 4. In the same manner, devices 10 may be removed from the wireless mesh network 80 and each node may update its routing table with relative ease by performing the method 120 again.

After establishing a routing scheme using the RIPng routing scheme, ELoWPAN 110 may employ a DTLS protocol to secure data communications between each device 10 in the home environment 30. As mentioned above, by using the DTLS protocol instead of a TLS protocol, ELoWPAN 110 may enable the transport layer 98 to send data via TCP and UDP. Although UDP may be generally more unreliable as compared to TCP, UDP data transfers employs a simple communication scheme without having dedicated transmissions channels or data paths set up prior to use. As such, new devices 10 added to the wireless mesh network 80 may use UDP data transfers to effectively communicate to other devices 10 in the wireless mesh network more quickly. Moreover, UDP data transfers generally use less energy by the device 10 that is sending or forwarding the data since there is no guarantee of delivery. As such, the devices 10 may send non-critical data (e.g., presence of a person in a room) using the UDP data transfer, thereby saving energy within the device 10. However, critical data (e.g., smoke alarm) may be sent via TCP data transfer to ensure that the appropriate party receives the data. To reiterate, using a DTLS security scheme with ELoWPAN 110 may help facilitate UDP and TCP data transfers.

Figure 8:
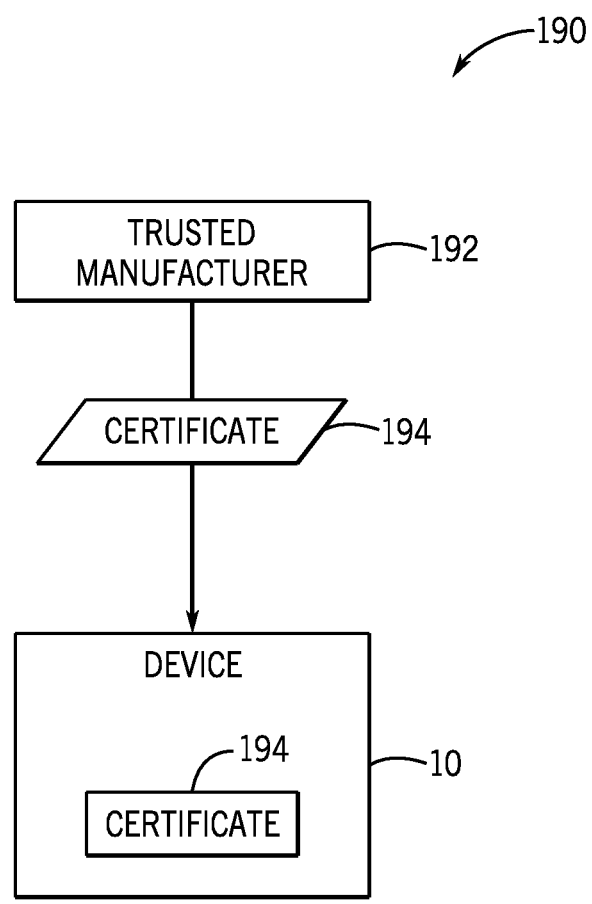
FIG. 8 illustrates a block diagram of a manufacturing process that includes embedding a security certificate into the general device of FIG. 1, in accordance with an embodiment.

Keeping the foregoing in mind, ELoWPAN 110 may employ the DTLS protocol to secure the data communicated between the devices 10. In one embodiment, the DTLS protocol may secure data transfers using a handshake protocol. Generally, the handshake protocol may authenticate each communicating device using a security certificate that may be provided by each device 10. FIG. 8 illustrates an example of a manufacturing process 190 that depicts how the security certificate may be embedded within the device 10.

Referring to FIG. 8, a trusted manufacturer 192 of the device 10 may be provided with a number of security certificates that it may use for each manufactured device. As such, while producing a device 10 that may be used in the home environment 30 and coupled to the wireless mesh network 80, the trusted manufacturer 192 may embed a certificate 194 into the device 10 during the manufacturing process 190. That is, the certificate 194 may be embedded into the hardware of the device 10 during manufacturing of the device 10. The certificate 194 may include a public key, a private key, or other cryptographic data that may be used to authenticate different communicating devices within the wireless mesh network 80. As a result, once a user receives the device 10, the user may integrate the device 10 into the wireless mesh network 80 without initializing or registering the device 10 with a central security node or the like.

In conventional data communication security protocols such as Protocol for Carrying Authentication for Network Access (PANA) used in 6LoWPAN devices, each device 10 may authenticate itself with a specific node (i.e., authentication agent). As such, before data is transferred between any two devices 10, each device 10 may authenticate itself with the authentication agent node. The authentication agent node may then convey the result of the authentication to an enforcement point node, which may be co-located with the authentication agent node. The enforcement point node may then establish a data communication link between the two devices 10 if the authentications are valid. Moreover, in PANA, each device 10 may communicate with each other via an enforcement point node, which may verify that the authentication for each device 10 is valid.

As such, by using the DTLS protocol rather than PANA to secure data transfers between nodes, the efficient network layer may avoid using an authorization agent node, an enforcement point node, or both excessively. That is, no one node using the efficient network layer may be processing authentication data for each data transfer between nodes in the wireless mesh network. As a result, the nodes using the efficient network layer may conserve more energy as compared to the authorization agent node or the enforcement point node in the PANA protocol system.

Figure 9:
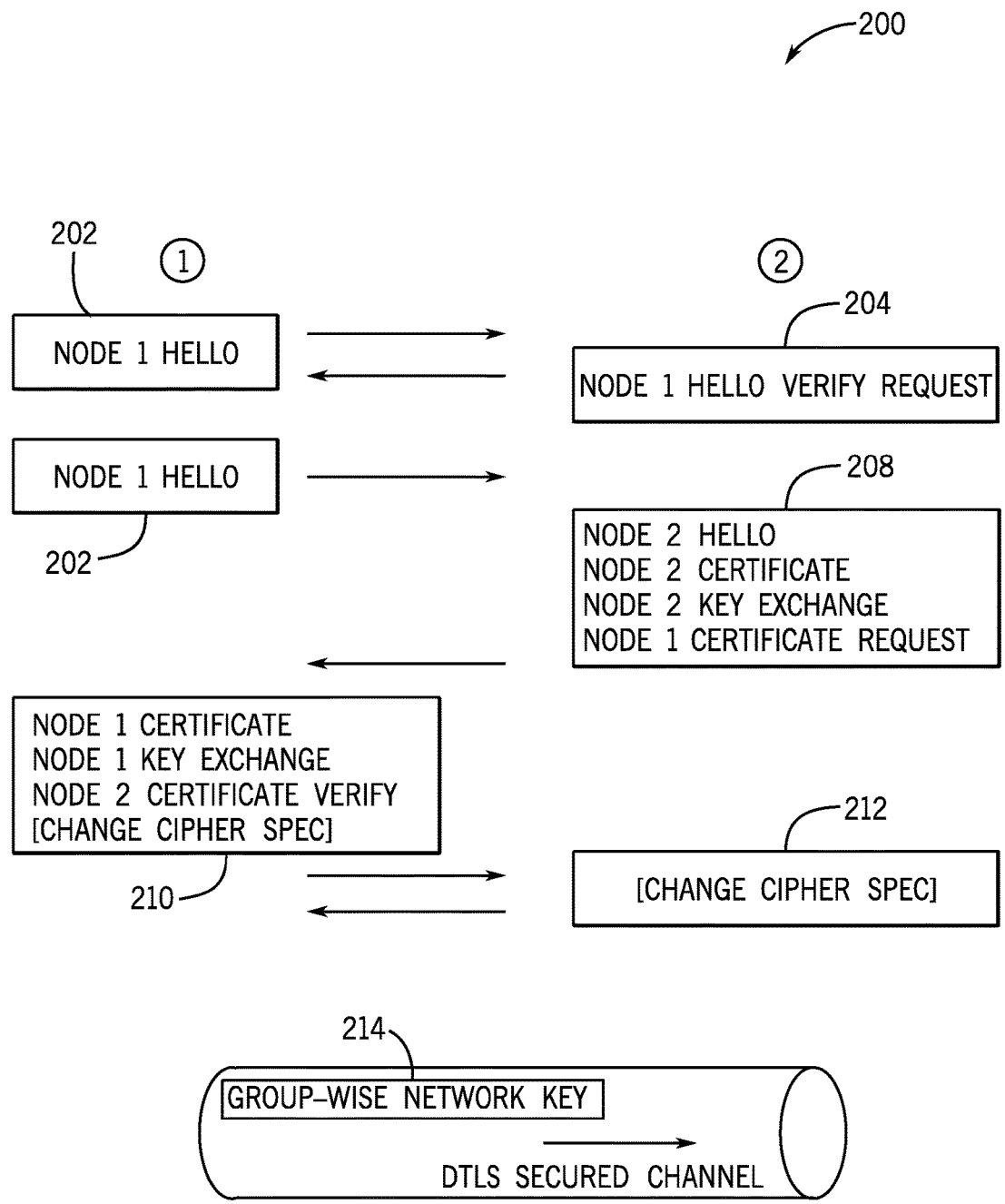
FIG. 9 illustrates an example handshake protocol between devices in the home environment of FIG. 2 using a Datagram Transport Layer Security (DTLS) protocol in the efficient network layer of FIG. 5, in accordance with an embodiment.

Keeping this in mind, FIG. 9 illustrates an example handshake protocol 200 that may be used between devices 10 when transferring data between each other. As shown in FIG. 9, the device 10 at node 1 may send a message 202 to the device 10 at node 2. The message 202 may be a hello message that may include cipher suites, hash and compression algorithms, and a random number. The device 10 at node 2 may then respond with a message 204, which may verify that the device 10 at node 2 received the message 202 from the device 10 at node 1.

After establishing the connection between node 1 and node 2, the device at node 1 may again send the message 202 to the device 10 at node 2. The device 10 at node 2 may then respond with a message 208, which may include a hello message from node 2, a certificate 194 from node 2, a key exchange from node 2, and a certificate request for node 1. The hello message in the message 208 may include cipher suites, hash and compression algorithms, and a random number. The certificate 194 may be the security certificate embedded within the device 10 by the trusted manufacturer 192 as discussed above with reference to FIG. 8. The key exchange may include a public key, a private key, or other cryptographic information that may be used to determine a secret key for establishing a communication channel between the two nodes. In one embodiment, the key exchange may be stored in the certificate 194 of the corresponding device 10 located at the respective node.

In response to the message 208, the device 10 at node 1 may send message 210 that may include a certificate 194 from node 1, a key exchange from node 1, a certificate verification of node 2, and a change cipher spec from node 1. In one embodiment, the device 10 at node 1 may use the certificate 194 of node 2 and the key exchange from node 1 to verify the certificate 194 of node 2. That is, the device 10 at node 1 may verify that the certificate 194 received from node 2 is valid based on the certificate 194 of node 2 and the key exchange from node 1. If the certificate 194 from node 2 is valid, the device 10 at node 1 may send the change cipher spec message to the device 10 at node 2 to announce that the communication channel between the two nodes is secure.

Similarly, upon receiving the message 210, the device 10 at node 2 may use the certificate 194 of node 1 and the key exchange from node 2 to verify the certificate 194 of node 1. That is, the device 10 at node 2 may verify that the certificate 194 received from node 1 is valid based on the certificate 194 of node 1 and the key exchange from node 2. If the certificate 194 from node 1 is valid, the device 10 at node 2 may also send the change cipher spec message to the device 10 at node 1 to announce that the communication channel between the two nodes is secure.

After establishing that the communication channel is secure, the device 10 at node 1 may send a group-wise network key 214 to the device 10 at node 2. The group-wise network key 214 may be associated with the ELoWPAN 110. In this manner, as new devices join the ELoWPAN 110, devices previously authorized to communicate within the ELoWPAN 110 may provide the new devices access to the ELoWPAN 110. That is, the devices previously authorized to communicate within the ELoWPAN 110 may provide the group-wise network key 214 to the new devices, which may enable the new devices to communicate with other devices in the ELoWPAN 110. For example, the group-wise network key 214 may be used to communicate with other devices that have been properly authenticated and that have previously provided with the group-wise network key 214. In one embodiment, once the change cipher spec message has been exchanged between the device 10 at node 1 and the device 10 at node 2, identification information such as model number, device capabilities, and the like may be communicated between the devices. However, after the device 10 at node 2 receives the group-wise network key 214, additional information such as data from sensors disposed on the device 10, data analysis performed by the device 10, and the like may be communicated between devices.

By embedding the security certificate within the device 10 during the manufacturing process, the device 10 may not involve the user with establishing security or authentication processes for the device 10. Moreover, since the device 10 may ensure that data is securely transferred between nodes based on a handshake protocol as opposed to a central authentication agent node, the security of the data transfers in the wireless mesh network 80 may not rely on a single node for security. Instead, the efficient network layer may ensure that data may be securely transferred between nodes even when some node becomes unavailable. As such, the efficient network layer may be much less vulnerable to security issues since it does not rely on a single node for securing data messages.

Efficient Platform and/or Application Layers

Using the above-described ELowPAN 110 and/or any other suitable IPv6 logical networks, efficient platform and/or application layers may be used to generate a fabric of devices in a home environment or similar environments. The fabric of devices may enable many generally local devices to communicate, sharing data and information, invoking methods on one another, parametrically providing software updates through the network, and generally communicating messages in an efficient, power-conscious way.

Fabric-Device Interconnection

Figure 10:
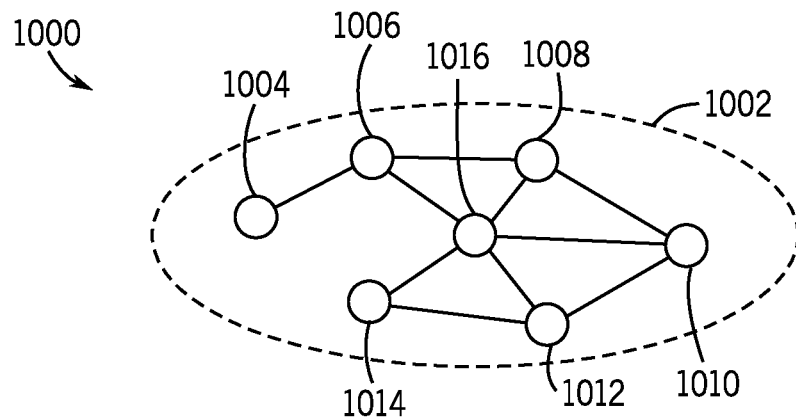
FIG. 10 illustrates the fabric network having a single logical network topology, in accordance with an embodiment.
Figure 11:
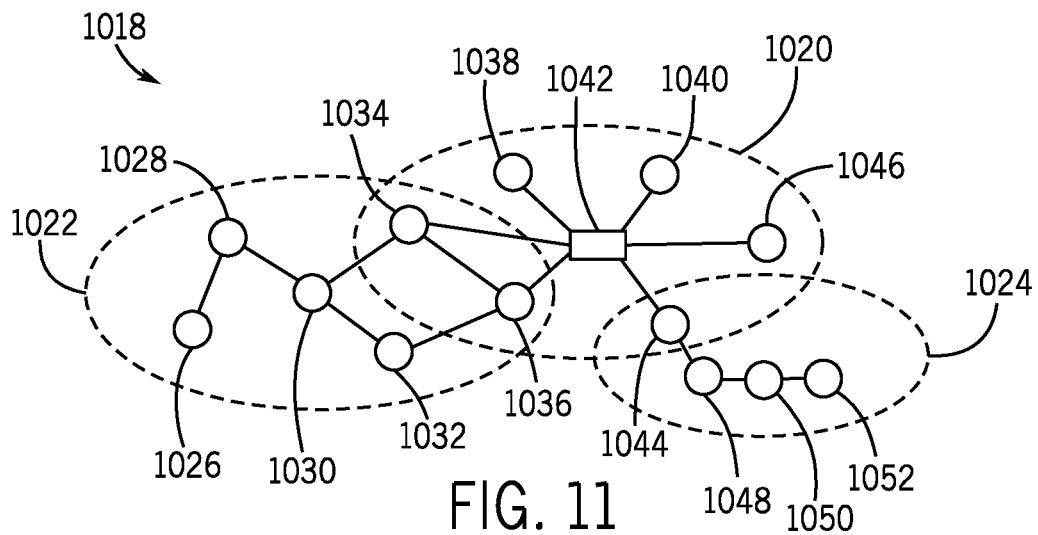
FIG. 11 illustrates the fabric network having a star network topology, in accordance with an embodiment.
Figure 12:
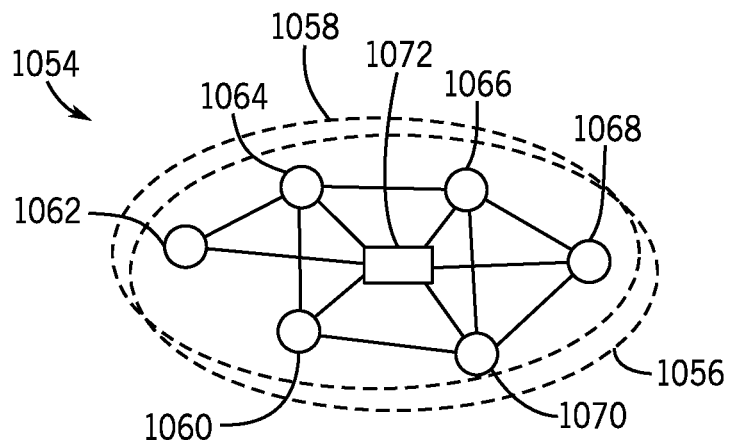
FIG. 12 illustrates the fabric network having a overlapping networks topology, in accordance with an embodiment.

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. 10-12 illustrate three embodiments that may be used to connect electrical devices via one or more sub-networks in the fabric.

A. Single Network Topology

FIG. 10 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

FIG. 11 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, an ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

C. Overlapping Networks Topology

FIG. 12 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 11, the overlapping networks topology may communicate directly between nodes via any network without using inter-network routing.

D. Fabric Network Connection to Services

Figure 13:
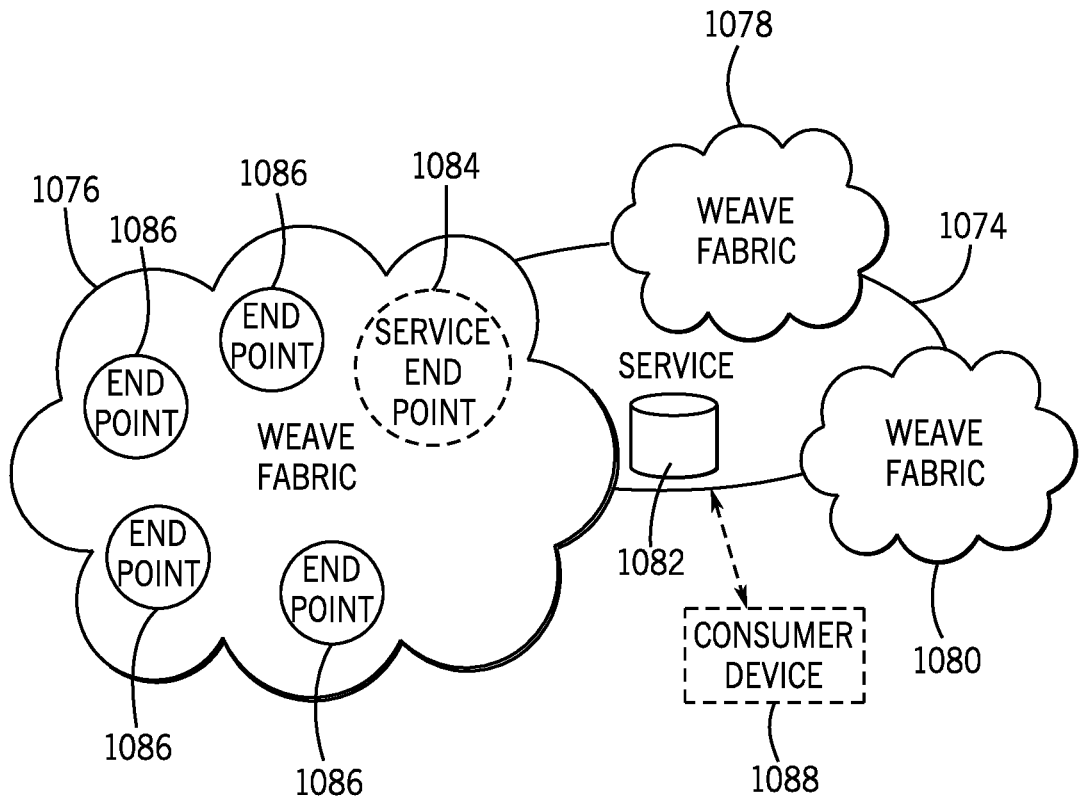
FIG. 13 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 13 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 14:
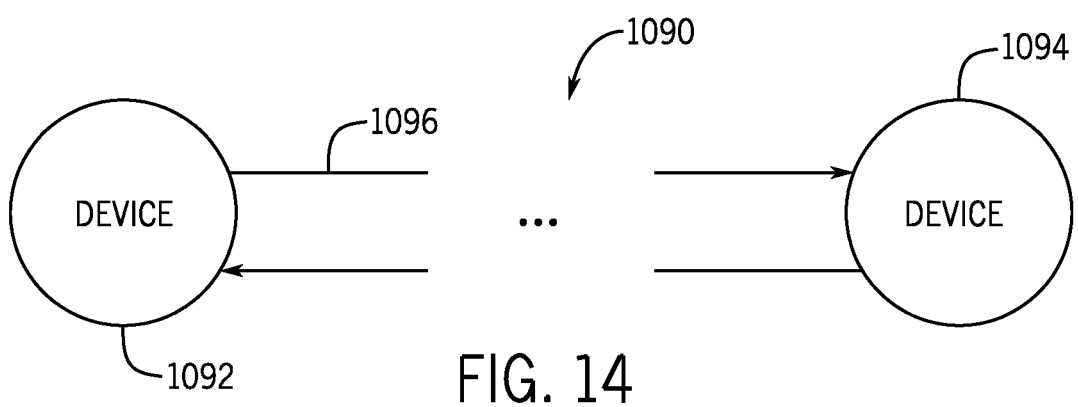
FIG. 14 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 14 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast.

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA), one assigned to each network interface. These LLAs may be used to communicate with other nodes on the same network. Additionally, the LLAs may be used for various communication procedures, such as IPv6 Neighbor Discovery Protocol. In addition to LLAs, each node may be assigned a unique local address (ULA). In some embodiments, this may be referred to as an Extended Unique Local Address (EULA) because it contains information regarding the fabric of devices as well as a preferred network over which to reach a device through the fabric.

Figure 15:
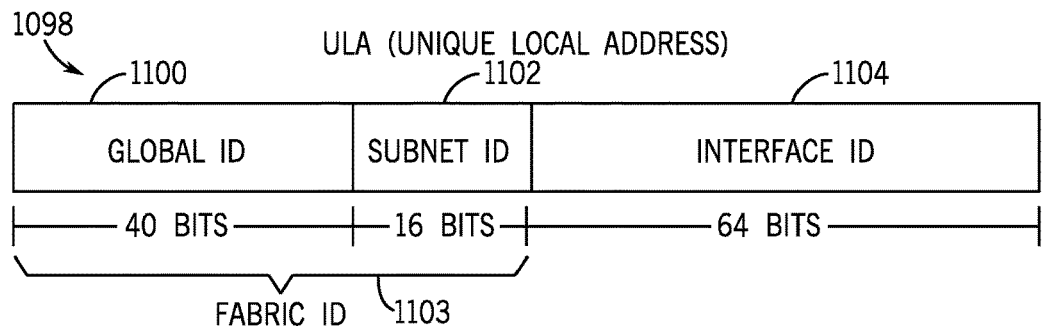
FIG. 15 illustrates a unique local address format (ULA) that may be used to address devices in a fabric network, in accordance with an embodiment.

FIG. 15 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 and subnet ID 1102 together form a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 Bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID F3 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 11) may maintain a list of other routing nodes (e.g., node B 14 of FIG. 11) on the hub network 1020 and their respective attached periphery networks (e.g., periphery network 1024 of FIG. 11). When a packet arrives addressed to a node other than the routing node itself, the destination address (e.g., address for node 1052 of FIG. 11) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 16:
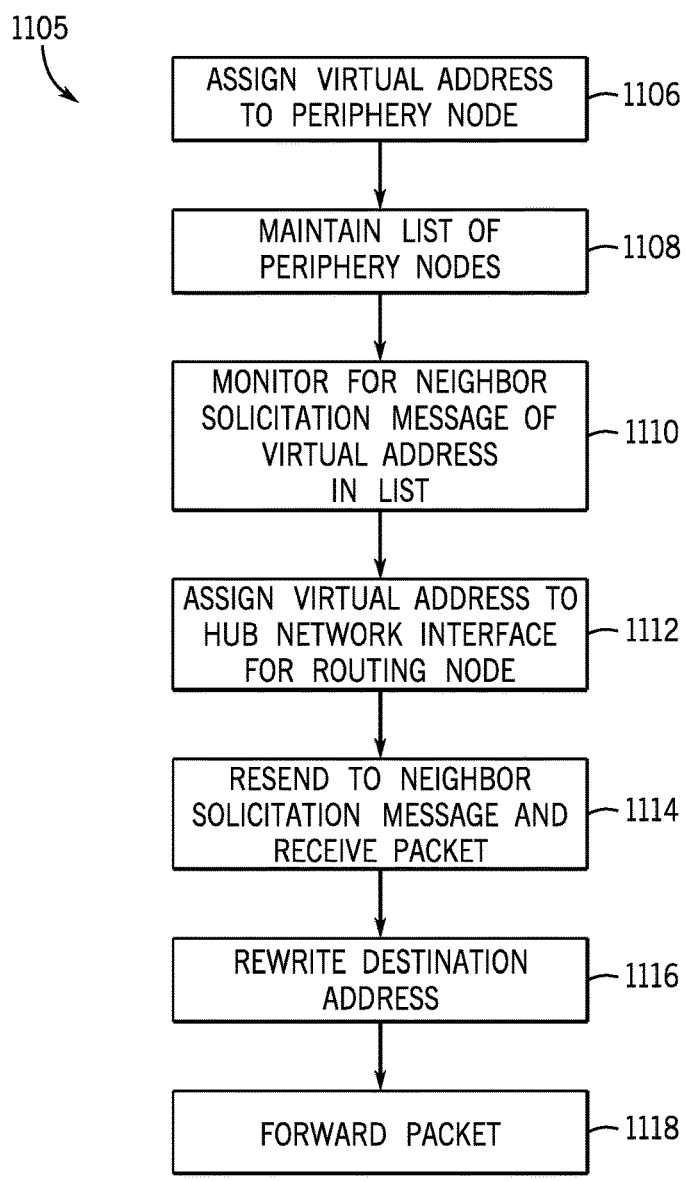
FIG. 16 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 16. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

iii. Consumer Devices Connecting to a Fabric

To join a fabric, a consumer device may discover an address of a node already in the fabric that the consumer device wants to join. Additionally, if the consumer device has been disconnected from a fabric for an extended period of time may need to rediscover nodes on the network if the fabric topology/layout has changed. To aid in discovery/rediscovery, fabric devices on the hub network may publish Domain Name System-Service Discovery (DNS-SD) records via mDNS that advertise the presence of the fabric and provide addresses to the consumer device Data Transmitted in the Fabric After creation of a fabric and address creation for the nodes, data may be transmitted through the fabric. Data passed through the fabric may be arranged in a format common to all messages and/or common to specific types of conversations in the fabric. In some embodiments, the message format may enable one-to-one mapping to JavaScript Object Notation (JSON) using a TLV serialization format discussed below. Additionally, although the following data frames are described as including specific sizes, it should be noted that lengths of the data fields in the data frames may be varied to other suitable bit-lengths.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 17:
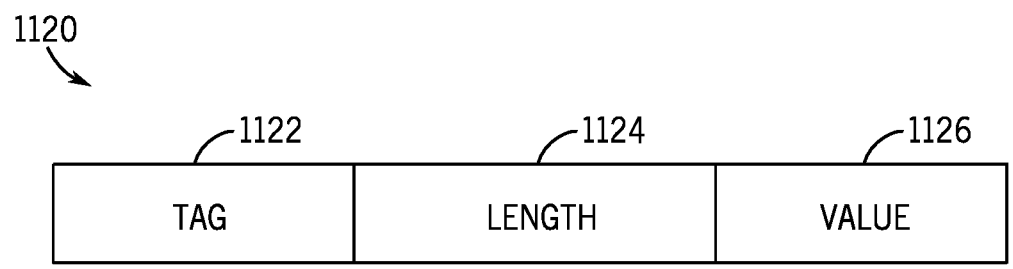
FIG. 17 illustrates a tag-length-value (TLV) packet that may be used to transmit data over the fabric network, in accordance with an embodiment.

As illustrated in FIG. 17, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte value |
| | | | 0 | 1 | 1 | 0 | 0 | UTF8-String, 1 byte length |
| | | | 0 | 1 | 1 | 0 | 1 | UTF8-String, 2 byte length |
| | | | 0 | 1 | 1 | 1 | 0 | UTF8-String, 4 byte length |
| | | | 0 | 1 | 1 | 1 | 1 | UTF8-String, 8 byte length |
| | | | 1 | 0 | 0 | 0 | 0 | Byte String, 1 byte length |
| | | | 1 | 0 | 0 | 0 | 1 | Byte String, 2 byte length |
| | | | 1 | 0 | 0 | 1 | 0 | Byte String, 4 byte length |
| | | | 1 | 0 | 0 | 1 | 1 | Byte String, 8 byte length |
| | | | 1 | 0 | 1 | 0 | 0 | Null |
| | | | 1 | 0 | 1 | 0 | 1 | Dictionary |
| | | | 1 | 0 | 1 | 1 | 0 | Array |
| | | | 1 | 0 | 1 | 1 | 1 | Path |
| | | | 1 | 1 | 0 | 0 | 0 | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 | | | | | | Anonymous, 0 bytes |
| 0 | 0 | 1 | | | | | | Context-specific Tag, 1 byte |
| 0 | 1 | 0 | | | | | | Core Profile Tag, 2 bytes |
| 0 | 1 | 1 | | | | | | Core Profile Tag, 4 bytes |
| 1 | 0 | 0 | | | | | | Implicit Profile Tag, 2 bytes |
| 1 | 0 | 1 | | | | | | Implicit Profile Tag, 4 bytes |
| 1 | 1 | 0 | | | | | | Fully-qualified Tag, 6 bytes |
| 1 | 1 | 1 | | | | | | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | | | 0 | 0 | 0 | 0 | Boolean |
| — | — | | | 0 | 0 | 0 | 1 | Fixed 8-bit Unsigned |
| — | — | | | 0 | 0 | 1 | 0 | Fixed 8-bit Signed |
| — | — | | | 0 | 0 | 1 | 1 | Fixed 16-bit Unsigned |
| — | — | | | 0 | 1 | 0 | 0 | Fixed 16-bit Signed |
| — | — | | | 0 | 1 | 0 | 1 | Fixed 32-bit Unsigned |
| — | — | | | 0 | 1 | 1 | 0 | Fixed 32-bit Signed |
| — | — | | | 0 | 1 | 1 | 1 | Fixed 64-bit Unsigned |
| — | — | | | 1 | 0 | 0 | 0 | Fixed 64-bit Signed |
| — | — | | | 1 | 0 | 0 | 1 | 32-bit Floating Point |
| — | — | | | 1 | 0 | 1 | 0 | 64-bit Floating Point |
| — | — | | | 1 | 0 | 1 | 1 | UTF-8 String |
| — | — | | | 1 | 1 | 0 | 0 | Opaque Data |
| — | — | | | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |

TABLE 4-continued

Example of a TLV packet including an 8-bit tag

| Tag | Length | Value | Description |
|-----|--------|-------|-------------|
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
  <key>OfflineMode</key>
  <false/>
  <key>Network</key>
  <dict>
    <key>IPv4</key>
    <dict>
      <key>Method</key>
      <string>dhcp</string>
    </dict>
    <key>IPv6</key>
    <dict>
      <key>Method</key>
      <string>auto</string>
    </dict>
  </dict>
  <key>Technologies</key>
  <dict>
    <key>wifi</key>
    <dict>
      <key>Enabled</key>
      <true/>
      <key>Devices</key>
      <dict>
        <key>wifi_18b4300008b027</key>
        <dict>
          <key>Enabled</key>
          <true/>
        </dict>
      </dict>
      <key>Services</key>
      <array>
        <string>wifi_18b4300008b027_3939382d33204
16c70696e652054657 272616365</string>
      </array>
    </dict>
    <key>802.15.4</key>
    <dict>
      <key>Enabled</key>
      <true/>
      <key>Devices</key>
      <dict>
<key>802.15.4_18b43000000002fac4</key>
        <dict>
          <key>Enabled</key>
          <true/>
        </dict>
      </dict>
      <key>Services</key>
      <array>
        <string>802.15.4_18b43000000002fac4_3
939382d3320416c70696e6520546572</string>
      </array>
    </dict>
  </dict>
<key>Services</key>
<dict>
<key>wifi_18b4300008b027_3939382d3320416c70696e6520546572
72616365</key>
  <dict>
    <key>Name</key>
    <string>998-3 Alpine Terrace</string>
    <key>SSID</key>
    <data>3939382d3320416c70696e652054657272616365
    </data>
    <key>Frequency</key>
    <integer>2462</integer>
    <key>AutoConnect</key>
    <true/>
    <key>Favorite</key>
    <true/>
    <key>Error</key>
    <string/>
    <key>Network</key>
    <dict>
      <key>IPv4</key>
      <dict>
        <key>DHCP</key>
        <dict>
          <key>LastAddress</key>
          <data>0a02001e</data>
        </dict>
      </dict>
      <key>IPv6</key>
      <dict/>
    </dict>
  </dict>
  <key>802.15.4_18b43000000002fac4_3939382d3320416c70696e
6520546572</key>
  <dict>
  <key>Name</key>
  <string>998-3 Alpine Ter</string>
  <key>EPANID</key>
  <data>3939382d3320416c70696e6520546572</data>
  <key>Frequency</key>
  <integer>2412</integer>
  <key>AutoConnect</key>
```

-continued

```
        <true/>
        <key>Favorite</key>
        <true/>
        <key>Error</key>
        <string/>
        <key>Network</key>
        <dict/>
      </dict>
    </dict>
  </dict>
</plist>
```

As an example, the above property list may be represented in tags of the above described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . ." | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x 3c | "wifi_18b43 . . ." | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . ." | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x 3b | "802.15.4_18 . . ." | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . ." | Services.Service.[0].ID |
| 0x4b 0d | 0x14 | "998-3 Alp . . ." | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x0a02001e | Services.Service.[0].Network.IPv4.LastAddress |
| 0x4d 17 | 0x50 | | Services.Service.[1] |
| 0x4b 0b | 0x1a | "802.15.4_18 . . ." | Services.Service.[1].ID |
| 0x4c 0d | 0x10 | "998-3 Alp . . ." | Services.Service.[1].Name |
| 0x4c 0f | 0x10 | 3939382d . . . | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

C. General Message Protocol

Figure 18:
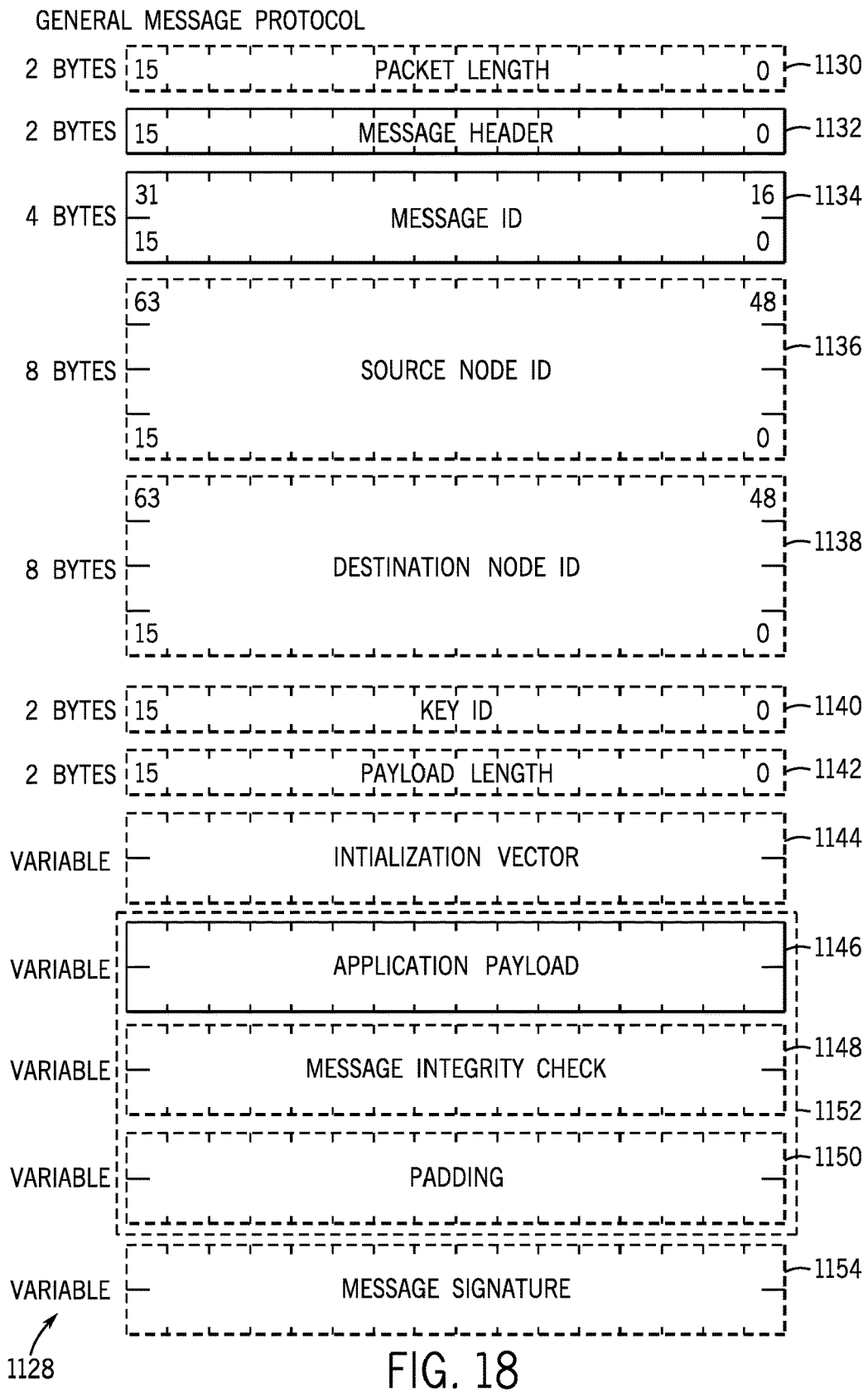
FIG. 18 illustrates a general message protocol (GMP) that may be used to transmit data over the fabric network that may include the TLV packet of FIG. 17, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 18. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Packet Length

In some embodiments, the GMP 1128 may include a Packet Length field 1130. In some embodiments, the Packet Length field 1130 includes 2 bytes. A value in the Packet Length field 1130 corresponds to an unsigned integer indicating an overall length of the message in bytes, excluding the Packet Length field 1130 itself. The Packet Length field 1130 may be present when the GMP 1128 is transmitted over a TCP connection, but when the GMP 1128 is transmitted over a UDP connection, the message length may be equal to the payload length of the underlying UDP packet obviating the Packet Length field 1130.

ii. Message Header

Figure 19:
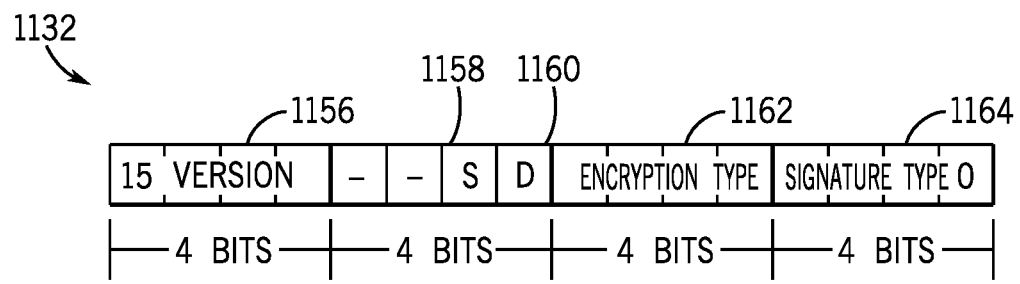
FIG. 19 illustrates a message header field of the GMP of FIG. 18, in accordance with an embodiment.

The GMP 1128 may also includes a Message Header 1132 regardless of whether the GMP 1128 is transmitted using TCP or UDP connections. In some embodiments, the Message Header 1132 includes two bytes of data arranged in the format illustrated in FIG. 19. As illustrated in FIG. 19, the Message Header 1132 includes a Version field 1156. The Version field 1156 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1156, the Message Header 1132 may include an S Flag field 1158 and a D Flag 1160. The S Flag 1158 is a single bit that indicates whether a Source Node Id (discussed below) field is included in the transmitted packet. Similarly, the D Flag 1160 is a single bit that indicates whether a Destination Node Id (discussed below) field is included in the transmitted packet.

The Message Header 1132 also includes an Encryption Type field 1162. The Encryption Type field 1162 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

Finally, the Message Header 1132 further includes a Signature Type field 1164. The Signature Type field 1164 includes four bits that specify which type of digital signature is applied to the message, if any. For example, 0x0 may indicate that no digital signature is included in the message, but 0x1 may indicate that the Elliptical Curve Digital Signature Algorithm (ECDSA) with Prime256v1 elliptical curve parameters is included in the message.

iii. Message Id

Returning to FIG. 18, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1160 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1162 of the Message Header 1132. For example, in some embodiments, when the value for the Encryption Type field 1162 of the Message Header 1132 is 0x0, the Key Id field 1140 may be omitted from the message.

Figure 20:
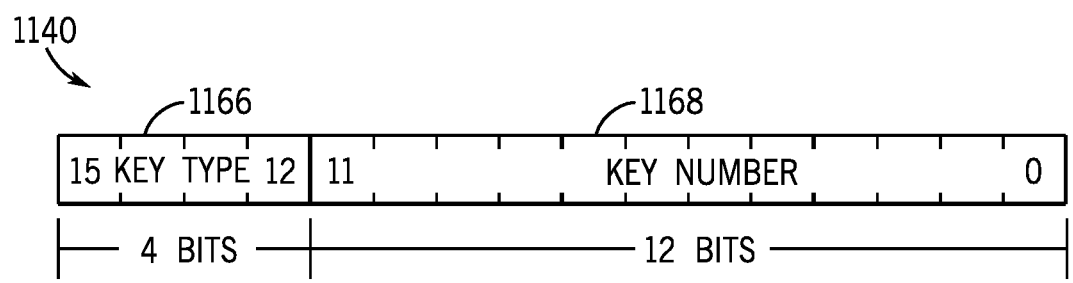
FIG. 20 illustrates a key identifier field of the GMP of FIG. 18, in accordance with an embodiment.

An embodiment of the Key Id field 1140 is presented in FIG. 20. In the illustrated embodiment, the Key Id field 1140 includes a Key Type field 1166 and a Key Number field 1168. In some embodiments, the Key Type field 1166 includes four bits. The Key Type field 1166 corresponds to an unsigned integer value that identifies a type of encryption/message integrity used to encrypt the message. For example, in some embodiments, if the Key Type field 1166 is 0x0, the fabric key is shared by all or most of the nodes in the fabric. However, if the Key Type field 1166 is 0x1, the fabric key is shared by a pair of nodes in the fabric.

The Key Id field 1140 also includes a Key Number field 1168 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1146 (e.g., TLV).

Figure 21:
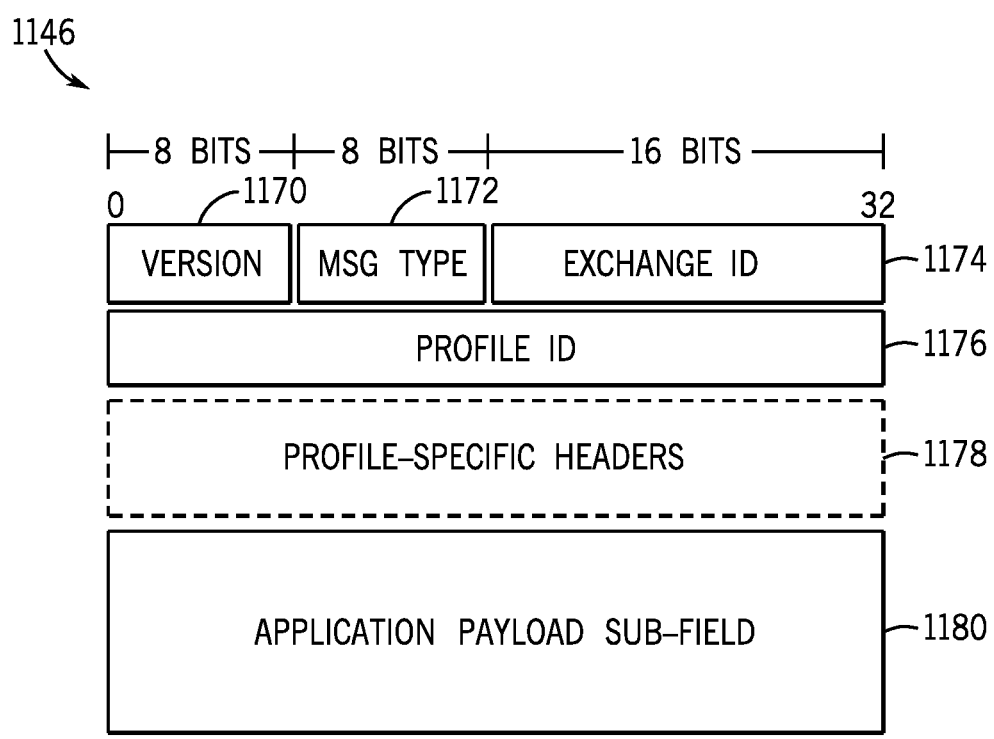
FIG. 21 illustrates an application payload field of the GMP of FIG. 18, in accordance with an embodiment.

An embodiment of the Application Payload field 1146 is illustrated in FIG. 21. The Application Payload field 1146 includes an APVersion field 1170. In some embodiments, the APVersion field 1170 includes eight bits that indicate what version of fabric software is supported by the sending device. The Application Payload field 1146 also includes a Message Type field 1172. The Message Type field 1172 may include eight bits that correspond to a message operation code that indicates the type of message being sent within a profile. For example, in a software update profile, a 0x00 may indicate that the message being sent is an image announce. The Application Payload field 1146 further includes an Exchange Id field 1174 that includes sixteen bits that corresponds to an exchange identifier that is unique to the sending node for the transaction.

In addition, the Application Payload field 1146 includes a Profile Id field 1176. The Profile Id 1176 indicates a "theme of discussion" used to indicate what type of communication occurs in the message. The Profile Id 1176 may correspond to one or more profiles that a device may be capable of communicating. For example, the Profile Id 1176 may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile. The APVersion field 1170, Message Type field 1172, the Exchange Id field, the Profile Id field 1176, and the Profile-Specific Header field 1176, if present, may be referred to in combination as the "Application Header."

In some embodiments, an indication of the Profile Id via the Profile Id field 1176 may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field 1178. Some profiles may not use the Profile-Specific Header field 1178 thereby enabling the Application Payload field 1146 to omit the Profile-Specific Header field 1178. Upon determination of a schema from the Profile Id field 1176 and/or the Profile-Specific Header field 1178, data may be encoded/decoded in the Application Payload sub-field 1180. The Application Payload sub-field 1180 includes the core application data to be transmitted between devices and/or services to be stored, rebroadcast, and/or acted upon by the receiving device/service.

x. Message Integrity Check

Returning to FIG. 18, in some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1162 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1162 in the Message Header 1132 uses cryptographic padding.

xii. Encryption

The Application Payload field 1146, the MIC field 1148, and the Padding field 1150 together form an Encryption block 1152. The Encryption block 1152 includes the portions of the message that are encrypted when the Encryption Type field 1162 in the Message Header 1132 is any value other than 0x0.

xiii. Message Signature

The GMP 1128 may also include a Message Signature field 1154. The Message Signature field 1154, when present, includes a sequence of bytes of variable length that contains a cryptographic signature of the message. The length and the contents of the Message Signature field may be determined according to the type of signature algorithm in use and indicated by the Signature Type field 1164 of the Message Header 1132. For example, if ECDSA using the Prime256v1 elliptical curve parameters is the algorithm in use, the Message Signature field 1154 may include two thirty-two bit integers encoded in little-endian order.

Profiles and Protocols

As discussed above, one or more schemas of information may be selected upon desired general discussion type for the message. A profile may consist of one or more schemas. For example, one set of schemas of information may be used to encode/decode data in the Application Payload sub-field 1180 when one profile is indicated in the Profile Id field 1176 of the Application Payload 1146. However, a different set of schemas may be used to encode/decode data in the Application Payload sub-field 1180 when a different profile is indicated in the Profile Id field 1176 of the Application Payload 1146.

Additionally, in certain embodiments, each device may include a set of methods used to process profiles. For example, a core protocol may include the following profiles: GetProfiles, GetSchema, GetSchemas, GetProperty, GetProperties, SetProperty, SetProperties, RemoveProperty, RemoveProperties, RequestEcho, NotifyPropertyChanged, and/or NotifyPropertiesChanged. The Get Profiles method may return an array of profiles supported by a queried node. The GetSchema and GetSchemas methods may respectively return one or all schemas for a specific profile. GetProperty and GetProperties may respectively return a value or all value pairs for a profile schema. SetProperty and SetProperties may respectively set single or multiple values for a profile schema. RemoveProperty and RemoveProperties may respectively attempt to remove a single or multiple values from a profile schema. RequestEcho may send an arbitrary data payload to a specified node which the node returns unmodified. NotifyPropertyChange and NotifyPropertiesChanged may respectively issue a notification if a single/multiple value pairs have changed for a profile schema.

To aid in understanding profiles and schemas, a non-exclusive list of profiles and schemas are provided below for illustrative purposes.

A. Status Reporting

Figure 22:
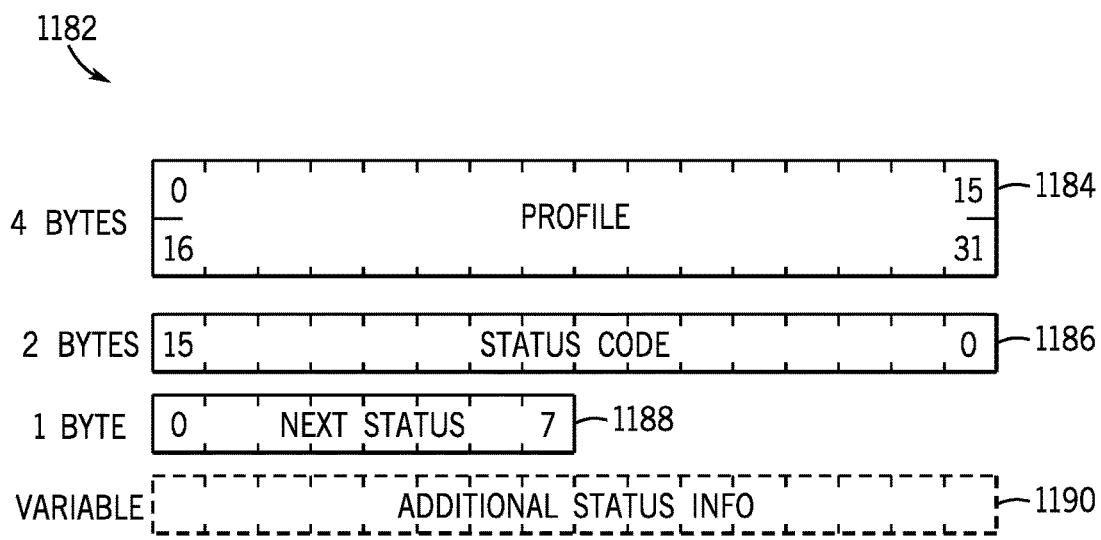
FIG. 22 illustrates a status reporting schema that may be used to update status information in the fabric network, in accordance with an embodiment.

A status reporting schema is presented as the status reporting frame 1182 in FIG. 22. The status reporting schema may be a separate profile or may be included in one or more profiles (e.g., a core profile). In certain embodiments, the status reporting frame 1182 includes a profile field 1184, a status code field 1186, a next status field 1188, and may include an additional status info field 1190.

i. Profile Field

Figure 23:
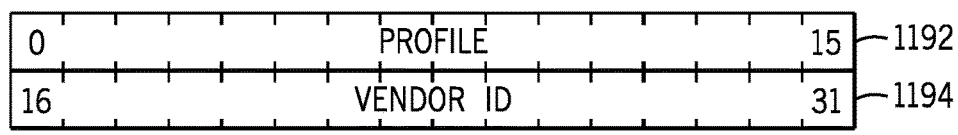
FIG. 23 illustrates a profile field of the status reporting schema of FIG. 22, in accordance with an embodiment.

In some embodiments, the profile field 1184 includes four bytes of data that defines the profile under which the information in the present status report is to be interpreted. An embodiment of the profile field 1184 is illustrated in FIG. 23 with two sub-fields. In the illustrated embodiment, the profile field 1184 includes a profile Id sub-field 1192 that includes sixteen bits that corresponds to a vendor-specific identifier for the profile under which the value of the status code field 1186 is defined. The profile field 1184 may also include a vendor Id sub-field 1194 that includes sixteen bits that identifies a vendor providing the profile identified in the profile Id sub-field 1192.

ii. Status Code

In certain embodiments, the status code field 1186 includes sixteen bits that encode the status that is being reported. The values in the status code field 1186 are interpreted in relation to values encoded in the vendor Id sub-field 1192 and the profile Id sub-field 1194 provided in the profile field 1184. Additionally, in some embodiments, the status code space may be divided into four groups, as indicated in Table 8 below.

TABLE 8

Status Code Range Table

| Range | Name | Description |
| --- | --- | --- |
| 0x0000 . . . 0x0010 | success | A request was successfully processed. |
| 0x0011 . . . 0x0020 | client error | An error has or may have occurred on the client-side of a client/server exchange. For example, the client has made a badly-formed request. |
| 0x0021 . . . 0x0030 | server error | An error has or may have occurred on the server side of a client/server exchange. For example, the server has failed to process a client request to an operating system error. |
| 0x0031 . . . 0x0040 | continue/redirect | Additional processing will be used, such as redirection, to complete a particular exchange, but no errors yet. |

Although Table 8 identifies general status code ranges that may be used separately assigned and used for each specific profile Id, in some embodiments, some status codes may be common to each of the profiles. For example, these profiles may be identified using a common profile (e.g., core profile) identifier, such as 0x00000000.

iii. Next Status

In some embodiments, the next status code field 1188 includes eight bits. The next status code field 1188 indicates whether there is following status information after the currently reported status. If following status information is to be included, the next status code field 1188 indicates what type of status information is to be included. In some embodiments, the next status code field 1188 may always be included, thereby potentially increasing the size of the message. However, by providing an opportunity to chain status information together, the potential for overall reduction of data sent may be reduced. If the next status field 1186 is 0x00, no following status information field 1190 is included. However, non-zero values may indicate that data may be included and indicate the form in which the data is included (e.g., in a TLV packet).

iv. Additional Status Info

When the next status code field 1188 is non-zero, the additional status info field 1190 is included in the message. If present, the status item field may contain status in a form that may be determined by the value of the preceding status type field (e.g., TLV format)

B. Software Update

The software update profile or protocol is a set of schemas and a client/server protocol that enables clients to be made aware of or seek information about the presence of software that they may download and install. Using the software update protocol, a software image may be provided to the profile client in a format known to the client. The subsequent processing of the software image may be generic, device-specific, or vendor-specific and determined by the software update protocol and the devices.

i. General Application Headers for the Application Payload

In order to be recognized and handled properly, software update profile frames may be identified within the Application Payload field 1146 of the GMP 1128. In some embodiments, all software update profile frames may use a common Profile Id 1176, such as 0x0000000C. Additionally, software update profile frames may include a Message Type field 1172 that indicates additional information and may be chosen according to Table 9 below and the type of message being sent.

TABLE 9

Software update profile message types

| Type | Message |
|---|---|
| 0x00 | image announce |
| 0x01 | image query |
| 0x02 | image query response |
| 0x03 | download notify |
| 0x04 | notify response |
| 0x05 | update notify |
| 0x06 . . . 0xff | reserved |

Additionally, as described below, the software update sequence may be initiated by a server sending the update as an image announce or a client receiving the update as an image query. In either embodiment, an Exchange Id 1174 from the initiating event is used for all messages used in relation to the software update.

ii. Protocol Sequence

Figure 24:
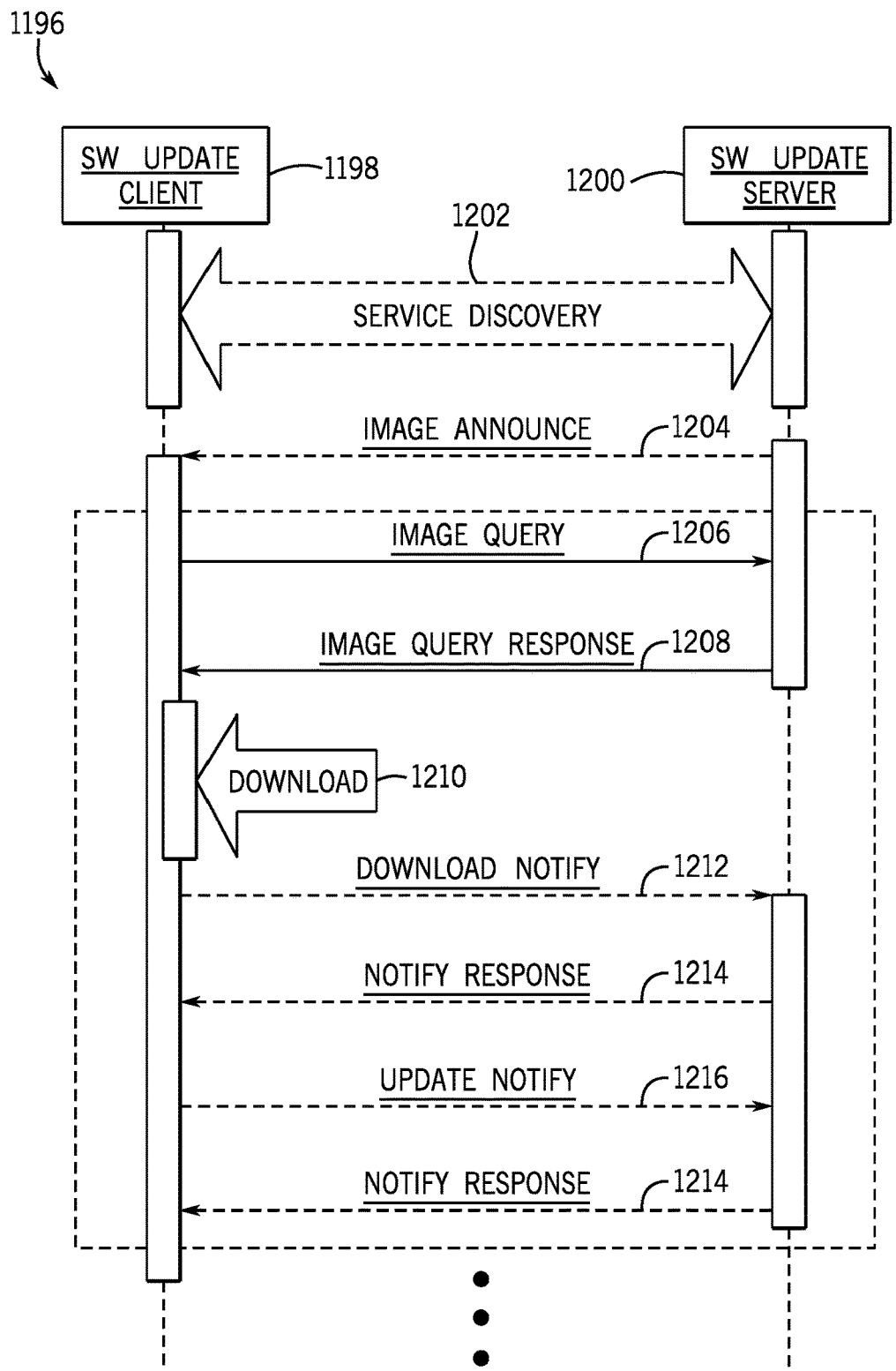
FIG. 24 illustrates a protocol sequence that may be used to perform a software update between a client and a server, in accordance with an embodiment.

FIG. 24 illustrates an embodiment of a protocol sequence 1196 for a software update between a software update client 1198 and a software update server 1200. In certain embodiments, any device in the fabric may be the software update client 1198 or the software update server 1200. Certain embodiments of the protocol sequence 1196 may include additional steps, such as those illustrated as dashed lines, which may be omitted in some software update transmissions.

1. Service Discovery

In some embodiments, the protocol sequence 1196 begins with a software update profile server announcing a presence of the update. However, in other embodiments, such as the illustrated embodiment, the protocol sequence 1196 begins with a service discovery 1202, as discussed above.

2. Image Announce

In some embodiments, an image announce message 1204 may be multicast or unicast by the software update server 1200. The image announce message 1204 informs devices in the fabric that the server 1200 has a software update to offer. If the update is applicable to the client 1198, upon receipt of the image announce message 1204, the software update client 1198 responds with an image query message 1206. In certain embodiments, the image announce message 1204 may not be included in the protocol sequence 1196. Instead, in such embodiments, the software update client 1198 may use a polling schedule to determine when to send the image query message 1206.

3. Image Query

Figure 25:
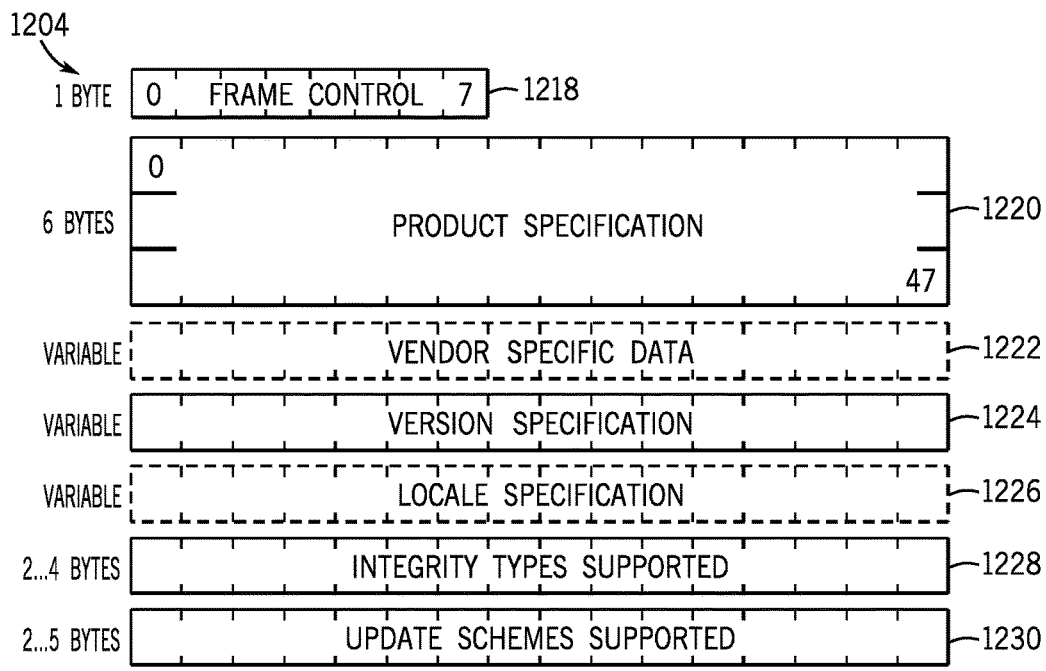
FIG. 25 illustrates an image query frame that may be used in the protocol sequence of FIG. 24, in accordance with an embodiment.

In certain embodiments, the image query message 1206 may be unicast from the software update client 1198 either in response to an image announce message 1204 or according to a polling schedule, as discussed above. The image query message 1206 includes information from the client 1198 about itself. An embodiment of a frame of the image query message 1206 is illustrated in FIG. 25. As illustrated in FIG. 25, certain embodiments of the image query message 1206 may include a frame control field 1218, a product specification field 1220, a vendor specific data field 1222, a version specification field 1224, a locale specification field 1226, an integrity type supported field 1228, and an update schemes supported field 1230.

a. Frame Control

Figure 26:
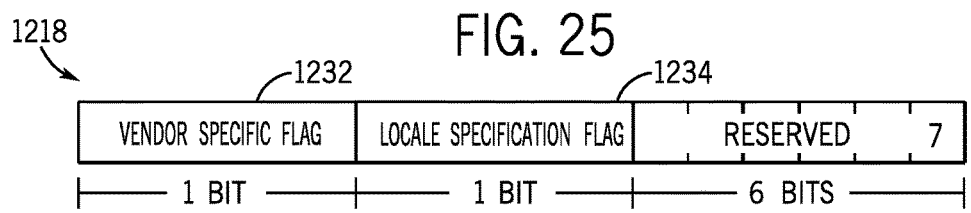
FIG. 26 illustrates a frame control field of the image query frame of FIG. 25, in accordance with an embodiment.

The frame control field 1218 includes 1 byte and indicates various information about the image query message 1204. An example of the frame control field 128 is illustrated in FIG. 26. As illustrated, the frame control field 1218 may include three sub-fields: vendor specific flag 1232, locale specification flag 1234, and a reserved field S3. The vendor specific flag 1232 indicates whether the vendor specific data field 1222 is included in the message image query message. For example, when the vendor specific flag 1232 is 0 no vendor specific data field 1222 may be present in the image query message, but when the vendor specific flag 1232 is 1 the vendor specific data field 1222 may be present in the image query message. Similarly, a 1 value in the locale specification flag 1234 indicates that a locale specification field 1226 is present in the image query message, and a 0 value indicates that the locale specification field 1226 in not present in the image query message.

b. Product Specification

Figure 27:
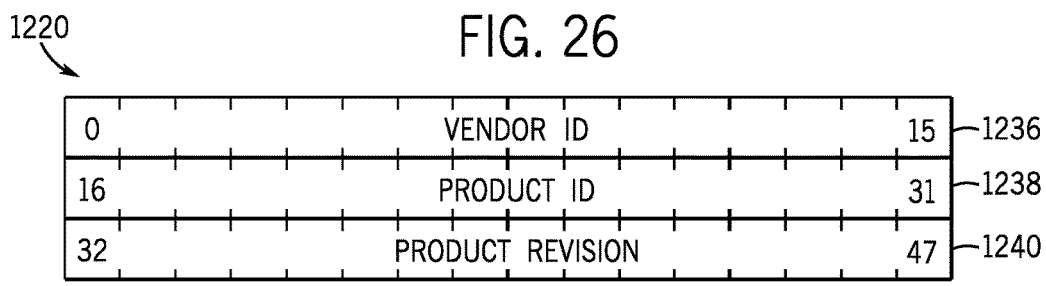
FIG. 27 illustrates a product specification field of the image query frame of FIG. 25, in accordance with an embodiment.

The product specification field 1220 is a six byte field. An embodiment of the product specification field 1220 is illustrated in FIG. 27. As illustrated, the product specification field 1220 may include three sub-fields: a vendor Id field 1236, a product Id field 1238, and a product revision field 1240. The vendor Id field 1236 includes sixteen bits that indicate a vendor for the software update client 1198. The product Id field 1238 includes sixteen bits that indicate the device product that is sending the image query message 1206 as the software update client 1198. The product revision field 1240 includes sixteen bits that indicate a revision attribute of the software update client 1198.

c. Vendor Specific Data

The vendor specific data field 1222, when present in the image query message 1206, has a length of a variable number of bytes. The presence of the vendor specific data field 1222 may be determined from the vendor specific flag 1232 of the frame control field 1218. When present, the vendor specific data field 1222 encodes vendor specific information about the software update client 1198 in a TLV format, as described above.

d. Version Specification

Figure 28:
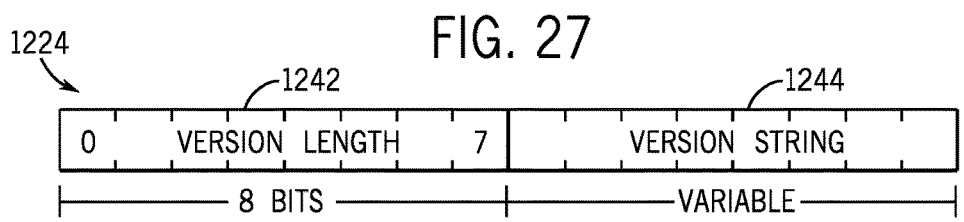
FIG. 28 illustrates a version specification field of the image query frame of FIG. 25, in accordance with an embodiment.

An embodiment of the version specification field 1224 is illustrated in FIG. 28. The version specification field 1224 includes a variable number of bytes sub-divided into two sub-fields: a version length field 1242 and a version string field 1244. The version length field 1242 includes eight bits that indicate a length of the version string field 1244. The version string field 1244 is variable in length and determined by the version length field 1242. In some embodiments, the version string field 1244 may be capped at 255 UTF-8 characters in length. The value encoded in the version string field 1244 indicates a software version attribute for the software update client 1198.

e. Locale Specification

Figure 29:
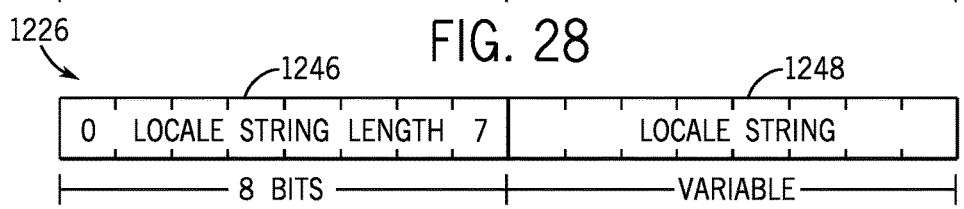
FIG. 29 illustrates a locale specification field of the image query frame of FIG. 25, in accordance with an embodiment.

In certain embodiments, the locale specification field 1226 may be included in the image query message 1206 when the locale specification flag 1234 of the frame control 1218 is 1. An embodiment of the locale specification field 1226 is illustrated in FIG. 29. The illustrated embodiment of the locale specification field 1226 includes a variable number of bytes divided into two sub-fields: a locale string length field 1246 and a locale string field 1248. The locale string length field 1246 includes eight bits that indicate a length of the locale string field 1248. The locale string field 1248 of the locale specification field 1226 may be variable in length and contain a string of UTF-8 characters encoding a local description based on Portable Operating System Interface (POSIX) locale codes. The standard format for POSIX locale codes is [language[_territory][.codeset][@modifier]] For example, the POSIX representation for Australian English is en_AU.UTF8.

f. Integrity Types Supported

Figure 30:
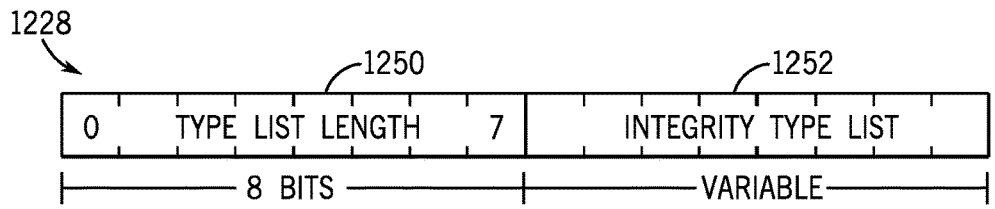
FIG. 30 illustrates an integrity types supported field of the image query frame of FIG. 25, in accordance with an embodiment.

An embodiment of the integrity types field 1228 is illustrated in FIG. 30. The integrity types supported field 1228 includes two to four bytes of data divided into two sub-fields: a type list length field 1250 and an integrity type list field 1252. The type list length field 1250 includes eight bits that indicate the length in bytes of the integrity type list field 1252. The integrity type list field 1252 indicates the value of the software update integrity type attribute of the software update client 1198. In some embodiments, the integrity type may be derived from Table 10 below.

TABLE 10

Example integrity types

| Value | Integrity Type |
|---|---|
| 0x00 | SHA-160 |
| 0x01 | SHA-256 |
| 0x02 | SHA-512 |

The integrity type list field 1252 may contain at least one element from Table 10 or other additional values not included.

g. Update Schemes Supported

Figure 31:
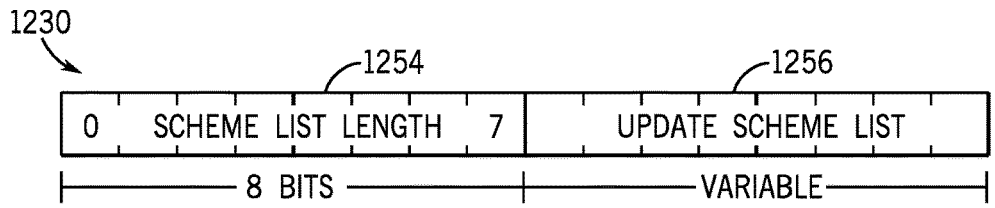
FIG. 31 illustrates an update schemes supported field of the image query frame of FIG. 25, in accordance with an embodiment.

An embodiment of the schemes supported field 1230 is illustrated in FIG. 31. The schemes supported field 1230 includes a variable number of bytes divided into two sub-fields: a scheme list length field 1254 and an update scheme list field 1256. The scheme list length field 1254 includes eight bits that indicate a length of the update scheme list field in bytes. The update scheme list field 1256 of the update schemes supported field 1222 is variable in length determined by the scheme list length field 1254. The update scheme list field 1256 represents an update schemes attributes of the software update profile of the software update client 1198. An embodiment of example values is shown in Table 11 below.

TABLE 11

Example update schemes

| Value | Update Scheme |
|---|---|
| 0x00 | HTTP |
| 0x01 | HTTPS |
| 0x02 | SFTP |
| 0x03 | Fabric-specific File Transfer Protocol (e.g., Bulk Data Transfer discussed below) |

Upon receiving the image query message 1206, the software update server 1200 uses the transmitted information to determine whether the software update server 1200 has an update for the software update client 1198 and how best to deliver the update to the software update client 1198.

4. Image Query Response

Returning to FIG. 24, after the software update server 1200 receives the image query message 1206 from the software update client 1198, the software update server 1200 responds with an image query response 1208. The image query response 1208 includes either information detailing why an update image is not available to the software update client 1198 or information about the available image update to enable to software update client 1198 to download and install the update.

Figure 32:
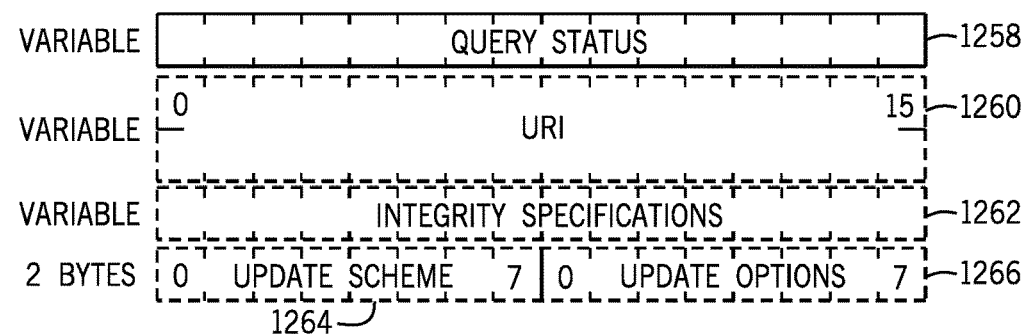
FIG. 32 illustrates an image query response frame that may be used in the protocol sequence of FIG. 24, in accordance with an embodiment.

An embodiment of a frame of the image query response 1208 is illustrated in FIG. 32. As illustrated, the image query response 1208 includes five possible sub-fields: a query status field 1258, a uniform resource identifier (URI) field 1260, an integrity specification field 1262, an update scheme field 1264, and an update options field 1266.

a. Query Status

The query status field 1258 includes a variable number of bytes and contains status reporting formatted data, as discussed above in reference to status reporting. For example, the query status field 1258 may include image query response status codes, such as those illustrated below in Table 12.

TABLE 12

Example image query response status codes

| Profile | Code | Description |
|---|---|---|
| 0x00000000 | 0x0000 | The server has processed the image query message 1206 and has an update for the software update client 1198. |
| 0x0000000C | 0x0001 | The server has processed the image query message 1206, but the server does not have an update for the software update client 1198. |
| 0x00000000 | 0x0010 | The server could not process the request because of improper form for the request. |
| 0x00000000 | 0x0020 | The server could not process the request due to an internal error | b. URI

Figure 33:
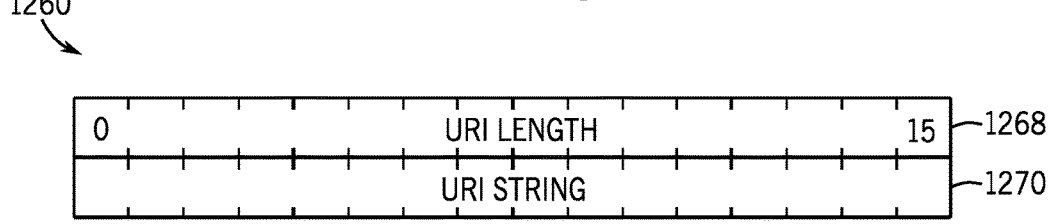
FIG. 33 illustrates a uniform resource identifier (URI) field of the image query response frame of FIG. 32, in accordance with an embodiment.

The URI field 1260 includes a variable number of bytes. The presence of the URI field 1260 may be determined by the query status field 1258. If the query status field 1258 indicates that an update is available, the URI field 1260 may be included. An embodiment of the URI field 1260 is illustrated in FIG. 33. The URI field 1260 includes two sub-fields: a URI length field 1268 and a URI string field 1270. The URI length field 1268 includes sixteen bits that indicates the length of the URI string field 1270 in UTF-8 characters. The URI string field 1270 and indicates the URI attribute of the software image update being presented, such that the software update client 1198 may be able to locate, download, and install a software image update, when present.

c. Integrity Specification

Figure 34:
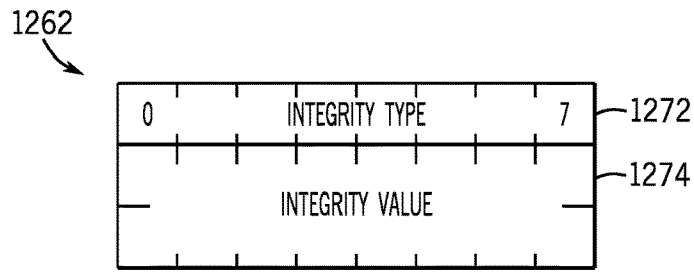
FIG. 34 illustrates a integrity specification field of the image query response frame of FIG. 32, in accordance with an embodiment.

The integrity specification field 1262 may variable in length and present when the query status field 1258 indicates that an update is available from the software update server 1198 to the software update client 1198. An embodiment of the integrity specification field 1262 is illustrated in FIG. 34. As illustrated, the integrity specification field 1262 includes two sub-fields: an integrity type field 1272 and an integrity value field 1274. The integrity type field 1272 includes eight bits that indicates an integrity type attribute for the software image update and may be populated using a list similar to that illustrated in Table 10 above. The integrity value field 1274 includes the integrity value that is used to verify that the image update message has maintained integrity during the transmission.

d. Update Scheme

The update scheme field 1264 includes eight bits and is present when the query status field 1258 indicates that an update is available from the software update server 1198 to the software update client 1198. If present, the update scheme field 1264 indicates a scheme attribute for the software update image being presented to the software update server 1198.

e. Update Options

Figure 35:
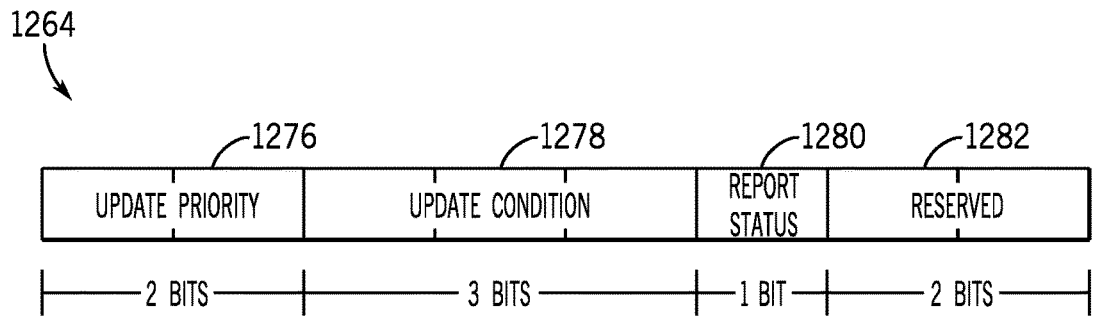
FIG. 35 illustrates an update scheme field of the image query response frame of FIG. 32, in accordance with an embodiment.

The update options field 1266 includes eight bits and is present when the query status field 1258 indicates that an update is available from the software update server 1198 to the software update client 1198. The update options field 1266 may be sub-divided as illustrated in FIG. 35. As illustrated, the update options field 1266 includes four sub-fields: an update priority field 1276, an update condition field 1278, a report status flag 1280, and a reserved field 1282. In some embodiments, the update priority field 1276 includes two bits. The update priority field 1276 indicates a priority attribute of the update and may be determined using values such as those illustrated in Table 13 below.

TABLE 13

Example update priority values

| Value | Description |
|---|---|
| 00 | Normal - update during a period of low network traffic |
| 01 | Critical - update as quickly as possible |

The update condition field 1278 includes three bits that may be used to determine conditional factors to determine when or if to update. For example, values in the update condition field 1278 may be decoded using the Table 14 below.

TABLE 14

Example update conditions

| Value | Description |
|---|---|
| 0 | Update without conditions |
| 1 | Update if the version of the software running on the update client software does not match the update version. |
| 2 | Update if the version of the software running on the update client software is older than the update version. |
| 3 | Update if the user opts into an update with a user interface |

The report status flag 1280 is a single bit that indicates whether the software update client 1198 should respond with a download notify message 1210. If the report status flag 1280 is set to 1 the software update server 1198 is requesting a download notify message 1210 to be sent after the software update is downloaded by the software update client 1200.

If the image query response 1208 indicates that an update is available. The software update client 1198 downloads 1210 the update using the information included in the image query response 1208 at a time indicated in the image query response 1208.

5. Download Notify

After the update download 1210 is successfully completed or failed and the report status flag 1280 value is 1, the software update client 1198 may respond with the download notify message 1212. The download notify message 1210 may be formatted in accordance with the status reporting format discussed above. An example of status codes used in the download notify message 1212 is illustrated in Table 15 below.

TABLE 15

Example download notify status codes

| Profile | Code | Description |
|---|---|---|
| 0x00000000 | 0x0000 | The download has been completed, and integrity verified |
| 0x0000000C | 0x0020 | The download could not be completed due to faulty download instructions. |
| 0x0000000C | 0x0021 | The image query response message 1208 appears proper, but the download or integrity verification failed. |
| 0x0000000C | 0x0022 | The integrity of the download could not be verified. |

In addition to the status reporting described above, the download notify message 1208 may include additional status information that may be relevant to the download and/or failure to download.

6. Notify Response

The software update server 1200 may respond with a notify response message 1214 in response to the download notify message 1212 or an update notify message 1216. The notify response message 1214 may include the status reporting format, as described above. For example, the notify response message 1214 may include status codes as enumerated in Table 16 below.

TABLE 16

Example notify response status codes

| Profile | Code | Description |
|---|---|---|
| 0x00000000 | 0x0030 | Continue - the notification is acknowledged, but the update has not completed, such as download notify message 1214 received but update notify message 1216 has not. |
| 0x00000000 | 0x0000 | Success - the notification is acknowledged, and the update has completed. |
| 0x0000000C | 0x0023 | Abort - the notification is acknowledged, but the server cannot continue the update. |
| 0x0000000C | 0x0031 | Retry query - the notification is acknowledged, and the software update client 1198 is directed to retry the update by submitting another image query message 1206. |

In addition to the status reporting described above, the notify response message 1214 may include additional status information that may be relevant to the download, update, and/or failure to download/update the software update.

7. Update Notify

After the update is successfully completed or failed and the report status flag 1280 value is 1, the software update client 1198 may respond with the update notify message 1216. The update notify message 1216 may use the status reporting format described above. For example, the update notify message 1216 may include status codes as enumerated in Table 17 below.

TABLE 17

Example update notify status codes

| Profile | Code | Description |
|---|---|---|
| 0x00000000 | 0x0000 | Success - the update has been completed. |
| 0x0000000C | 0x0010 | Client error - the update failed due to a problem in the software update client 1198. |

In addition to the status reporting described above, the update notify message 1216 may include additional status information that may be relevant to the update and/or failure to update.

C. Data Management Protocol

Figure 36:
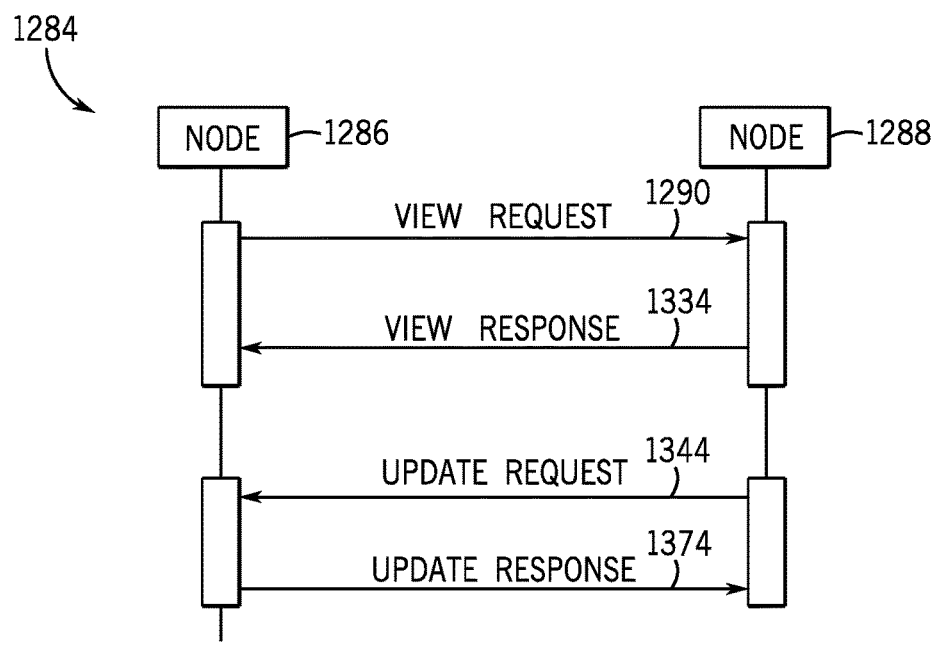
FIG. 36 illustrates a sequence used to employ a data management protocol to manage data between devices in the fabric network, in accordance with an embodiment.

Data management may be included in a common profile (e.g., core profile) used in various electronic devices within the fabric or may be designated as a separate profile. In either situation, the device management protocol (DMP) may be used for nodes to browse, share, and/or update node-resident information. A sequence 1284 used in the DMP is illustrated in FIG. 36. The sequence 1284 illustrates a viewing node 1286 that requests to view and/or change resident data of a viewed node 1288. Additionally, the viewing node 1286 may request to view the resident data using one of several viewing options, such as a snapshot request, a watching request that the viewing persists over a period of time, or other suitable viewing type. Each message follows the format for the Application Payload 1146 described in reference to FIG. 21. For example, each message contains a profile Id 1176 that corresponds to the data management profile and/or the relevant core profile, such as 0x235A0000. Each message also contains a message type 1172. The message type 1172 may be used to determine various factors relating the conversation, such as viewing type for the view. For example, in some embodiments, the message type field 1172 may be encoded/decoded according to Table 18 below.

TABLE 18

Example software update profile message types

| Type | Message |
|---|---|
| 0x00 | snapshot request |
| 0x01 | watch request |
| 0x02 | periodic update request |
| 0x03 | refresh update |
| 0x04 | cancel view update |
| 0x05 | view response |
| 0x06 | explicit update request |
| 0x07 | view update request |
| 0x08 | update response | i. View Request

Although a view request message 1290 requests to view node-resident data, the type of request may be determined by the message type field 1172, as discussed above. Accordingly each request type may include a different view request frame.

1. Snapshot Request

A snapshot request may be sent by the viewing node 1286 when the viewing node 1286 desires an instantaneous view into the node-resident data on the viewed node 1288 without requesting future updates. An embodiment of a snapshot request frame 1292 is illustrated in FIG. 37.

As illustrated in FIG. 37, the snapshot request frame 1292 may be variable in length and include three fields: a view handle field 1294, a path length list field 1296, and a path list field 1298. The view handle field 1294 may include two bits that provide a "handle" to identify the requested view. In some embodiments, the view handle field 1294 is populated using a random 16-bit number or a 16-bit sequence number along with a uniqueness check performed on the viewing node 1286 when the request is formed. The path list length field 1296 includes two bytes that indicate a length of the path list field 1298. The path list field 1298 is variable in length and indicated by the value of the path list length field 1296. The value of the path list field 1298 indicates a schema path for nodes.

A schema path is a compact description for a data item or container that is part of a schema resident on the nodes. For example, FIG. 38 provides an example of a profile schema 1300. In the illustrated profile schema 1300, a path to data item 1302 may be written as "Foo:bicycle:mountain" in a binary format. The binary format of the path may be represented as a profile binary format 1304, as depicted in FIG. 39. The profile binary format 1304 includes two sub-fields: a profile identifier field 1306 and a TLV data field 1308. The profile identifier field 1306 identifies which profile is being referenced (e.g., Foo profile). The TLV data field 1308 path information. As previously discussed TLV data includes a tag field that includes information about the enclosed data. Tag field values used to refer to the Foo profile of FIG. 38 may be similar to those values listed in Table 19.

TABLE 19

Example tag values for the Foo profile

| Name | Tag |
|---|---|
| animal | 0x4301 |
| fish | 0x4302 |
| fowl | 0x4303 |
| medium | 0x4304 |
| size | 0x4305 |
| bicycle | 0x4306 |
| road | 0x4307 |
| mountain | 0x4308 |
| track | 0x4309 |
| # of gears | 0x430A |
| weight | 0x430B |

Using Table 19 and the Foo profile of FIG. 38, a binary string in TLV format representing the path "Foo:bicycle:mountain" may be represented as shown in Table 20 below.

TABLE 20

Example binary tag list for a schema path

| Profile ID | Tag and Length (TL) | "bicycle" | "mountain" |
|---|---|---|---|
| CD:AB:00:00 | 0D:02 | 06:43 | 08:43 |

If the viewing node 1286 desires to receive an entire data set defined in a profile schema (e.g. Foo profile schema of FIG.

39), the view request message 1290 may request a "nil" item (e.g., 0x0D00 TL and an empty length referring to the container.

2. Watch Request

Figure 40:
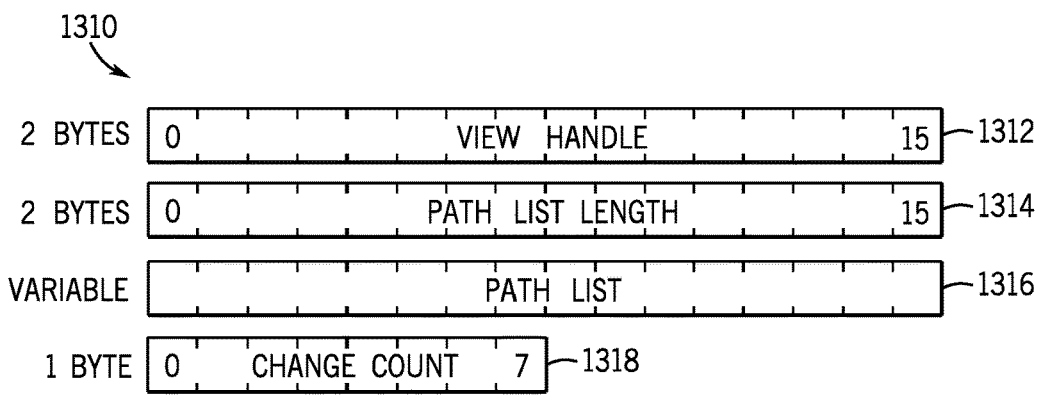
FIG. 40 illustrates a watch request frame that may be used in the sequence of FIG. 36, in accordance with an embodiment.

If the viewing node 1286 desires more than a snapshot, the viewing node 1286 may request a watch request. A watch request asks the viewed node 1288 to send updates when changes are made to the data of interest in viewed node 1288 so that viewing node 1286 can keep a synchronized list of the data. The watch request frame may have a different format than the snapshot request of FIG. 37. An embodiment of a watch request frame 1310 is illustrated in FIG. 40. The watch request frame 1310 includes four fields: a view handle field 1312, a path list length field 1314, a path list field 1316, and a change count field 1318. The view handle field 1312, the path list length field 1314, and the path list field may be respectively formatted similar to the view handle field 1294, the path list length field 1296, and the path list field 1298 of the snapshot request of FIG. 37. The additional field, the change count field 1318, indicates a threshold of a number of changes to the requested data at which an update is sent to the viewing node 1286. In some embodiments, if the value of the change count field 1318 is 0, the viewed node 1288 may determine when to send an update on its own. If the value of the change count field 1318 is nonzero then after a number of changes equal to the value, then an update is sent to the viewing node 1286.

3. Periodic Update Request

Figure 41:
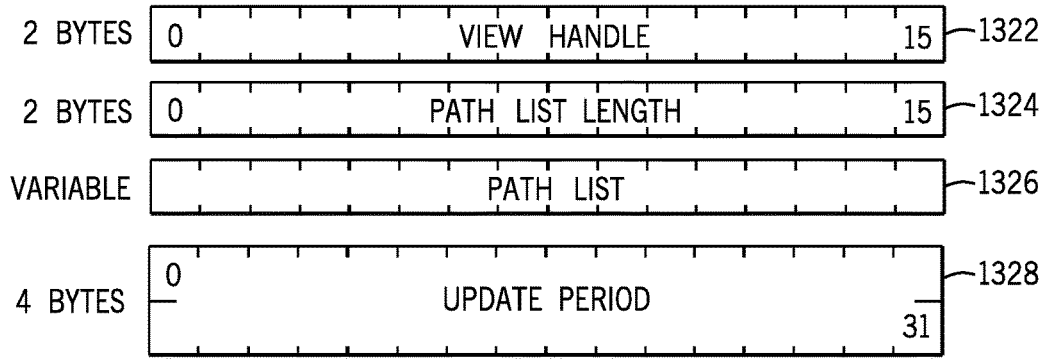
FIG. 41 illustrates a periodic update request frame that may be used in the sequence of FIG. 36, in accordance with an embodiment.

A third type of view may also be requested by the viewing node 1286. This third type of view is referred to as a periodic update. A periodic update includes a snapshot view as well as periodic updates. As can be understood, a periodic update request may be similar to the snapshot request with additional information determining the update period. For example, an embodiment of a periodic update request frame 1320 is depicted in FIG. 41. The periodic update request frame 1320 includes four fields: a view handle field 1322, a path list length field 1324, a path list field 1326, and an update period field 1328. The view handle field 1322, the path list length field 1324, and the path list field 1326 may be formatted similar to their respective fields in the snapshot request frame 1292. The update period field 1328 is four bytes in length and contains a value that corresponds to a period of time to lapse between updates in a relevant unit of time (e.g., seconds).

4. Refresh Request

Figure 42:
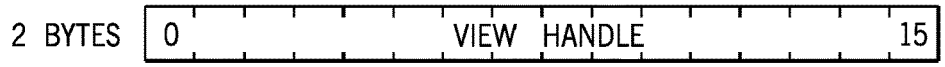
FIG. 42 illustrates a refresh request frame that may be used in the sequence of FIG. 36, in accordance with an embodiment.

When the viewing node 1286 desires to receive an updated snapshot, the viewing node 1286 may send a view request message 1290 in the form of a refresh request frame 1330 as illustrated in FIG. 42. The refresh request frame 1330 essentially resends a snapshot view handle field (e.g., view handle field 1294) from a previous snapshot request that the viewed node 1288 can recognize as a previous request using the view handle value in the refresh request frame 1330.

5. Cancel View Request

Figure 43:
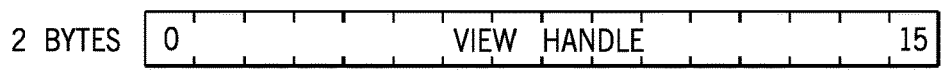
FIG. 43 illustrates a cancel view request that may be used in the sequence of FIG. 36, in accordance with an embodiment.

When the viewing node 1286 desires to cancel an ongoing view (e.g., periodic update or watch view), the viewing node 1286 may send a view request message 1290 in the form of a cancel view request frame 1332 as illustrated in FIG. 43. The cancel view request frame 1332 essentially resends a view handle field from a previous periodic update or watch view (e.g., view handle fields 1310, or 1322) from a previous request that the viewed node 1288 can recognize as a previous request using the view handle value in the refresh request frame 1330 and to cancel a currently periodic update or watch view.

ii. View Response

Figure 44:
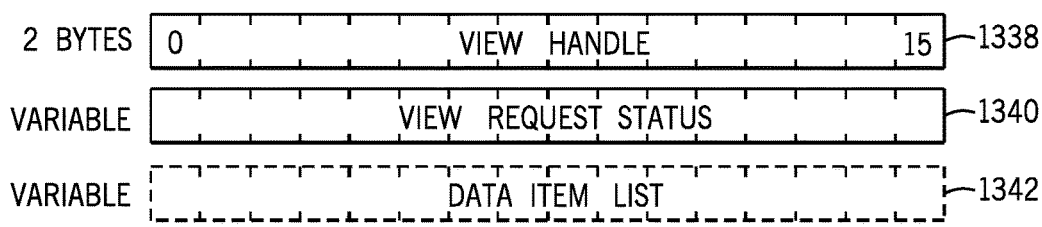
FIG. 44 illustrates a view response frame that may be used in the sequence of FIG. 36, in accordance with an embodiment.

Returning to FIG. 36, after the viewed node 1288 receives a view request message 1290, the viewed node 1288 responds with a view response message 1334. An example of a view response message frame 1336 is illustrated in FIG. 44. The view response message frame 1336 includes three fields: a view handle field 1338, a view request status field 1240, and a data item list 1242. The view handle field 1338 may be formatted similar to any of the above referenced view handle fields 1338. Additionally, the view handle field 1338 contains a value that matches a respective view handle field from the view request message 1290 to which the view response message 1334 is responding. The view request status field 1340 is a variable length field that indicates a status of the view request and may be formatted according to the status updating format discussed above. The data item list field 1342 is a variable length field that is present when the view request status field 1340 indicates that the view request was successful. When present, the data item list field 1342 contains an ordered list of requested data corresponding to the path list of the view request message 1290. Moreover, the data in the data item list field 1342 may be encoded in a TLV format, as discussed above.

iii. Update Request

As discussed above, in some embodiments, the viewed node 1288 may send updates to the viewing node 1286. These updates may be sent as an update request message 1344. The update request message 1344 may include a specified format dependent upon a type of update request. For example, an update request may be an explicit update request or a view update request field that may be identified by the Message Id 1172.

1. Explicit Update Request

Figure 45:
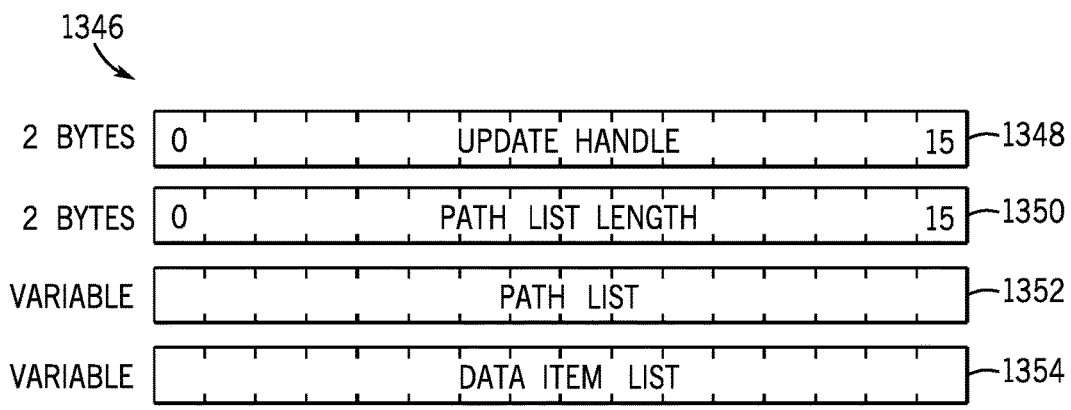
FIG. 45 illustrates an explicit update request frame that may be used in the sequence of FIG. 36, in accordance with an embodiment.

An explicit update request may be transmitted at any time as a result of a desire for information from another node in the fabric 1000. An explicit update request may be formatted in an update request frame 1346 illustrated in FIG. 45. The illustrated update request frame 1346 includes four fields: an update handle field 1348, a path list length field 1350, a path list field 1352, and a data item list field 1354.

The update handle field 1348 includes two bytes that may be populated with random or sequential numbers with uniqueness checks to identify an update request or responses to the request. The path list length field 1350 includes two bytes that indicate a length of the path list field 1352. The path list field 1352 is a variable length field that indicates a sequence of paths, as described above. The data item list field 1354 may be formatted similar to the data item list field 1242.

2. View Update Request

Figure 46:
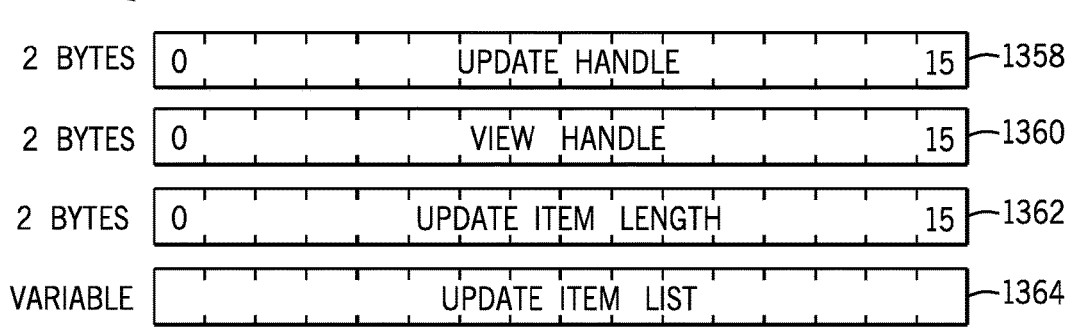
FIG. 46 illustrates a view update request frame that may be used in the sequence of FIG. 36, in accordance with an embodiment.

A view update request message may be transmitted by a node that has previously requested a view into a schema of another node or a node that has established a view into its own data on behalf of another node. An embodiment of a view update request frame 1356 illustrated in FIG. 46. The view update request frame 1356 includes four fields: an update handle field 1358, a view handle field 1360, an update item list length field 1362, and an update item list field 1364. The update handle field 1358 may be composed using the format discussed above in reference to the update handle field 1348. The view handle field 1360 includes two bytes that identify the view created by a relevant view request message 1290 having the same view handle. The update item list length field 1362 includes two bytes and indicates the number of update items that are included in the update item list field 1364.

Figure 47:
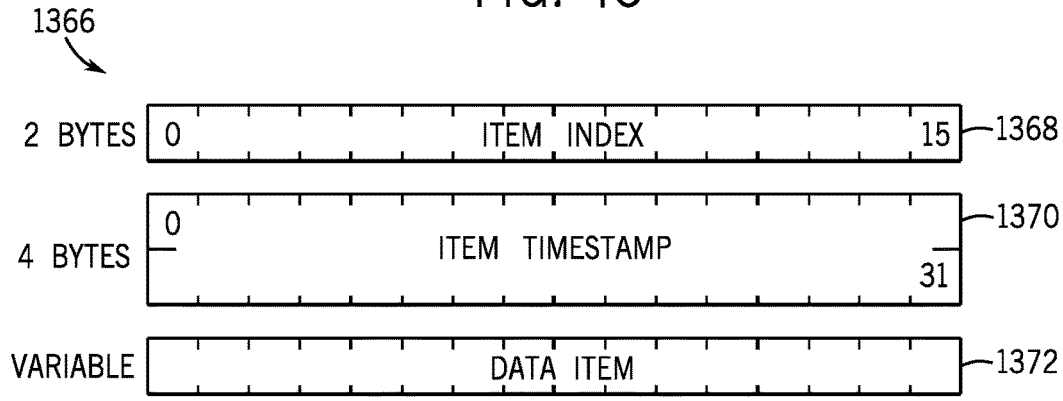
FIG. 47 illustrates an update item frame that may be updated using the sequence of FIG. 36, in accordance with an embodiment.

The update item list field 1364 includes a variable number of bytes and lists the data items constituting the updated values. Each updated item list may include multiple update items. The individual update items are formatted accordingly to the update item frame 1366 illustrated in FIG. 47. Each update item frame 1366 includes three sub-fields: an item index field 1368, an item timestamp field 1370, and a data item field 1372. The item index field 1368 includes two bytes that indicate the view under which the update is being requested and the index in the path list of that view for the data item field 1372.

The item timestamp field 1370 includes four bytes and indicates the elapsed time (e.g., in seconds) from the change until the update being communicated was made. If more than one change has been made to the data item, the item timestamp field 1370 may indicate the most recent or the earliest change. The data item field 1372 is a variable length field encoded in TLV format that is to be received as the updated information.

iv. Update Response

Figure 48:
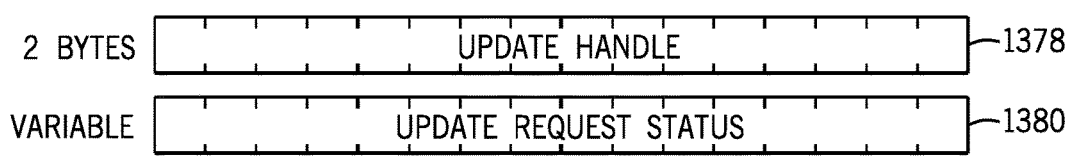
FIG. 48 illustrates an update response frame that may be sent as an update response message in the sequence FIG. 36, in accordance with an embodiment.

After an update is received, a node (e.g., viewing node 1286) may send an update response message 1374. The update response message 1374 may be encoded using an update response frame 1376 illustrated in FIG. 48. The update response frame 1376 includes two fields: an update handle field 1378 and an update request status field 1380. The update handle field 1378 corresponds to an update handle field value of the update request message 1344 to which the update response message 1374 is responding. The update request status field 1380 reports a status of the update in accordance with the status reporting format discussed above. Additionally, a profile using the DMP (e.g., a core profile or a data management profile) may include profile-specific codes, such as those enumerated in Table 21 below.

TABLE 21

Example of status codes for a profile including the DMP

| Name | Value | Description |
|---|---|---|
| success | 0x0000 | Request successfully processed |
| ill-formed request | 0x0010 | Received request was unparseable (e.g., missing fields, extra fields, etc.) |
| invalid path | 0x0011 | A path from the path list of the view or update request did not match a node-resident schema of the responding device. |
| unknown view handle | 0x0012 | The view handle in the update request did not match a view on the receiving node. |
| illegal read request | 0x0013 | The node making a request to read a particular data item does not have permission to do so. |
| illegal write request | 0x0014 | The node making the request to write a particular data item does not have permission to do so. |
| internal server error | 0x0020 | The server could not process the request because of an internal error. |
| out of memory | 0x0021 | The update request could not executed because it would overrun the available memory in the receiving device. |
| continue | 0x0030 | The request was successfully handled but more action by the requesting device may occur. |

D. Bulk Transfer

In some embodiments, it may be desirable to transfer bulk data files (e.g., sensor data, logs, or update images) between nodes/services in the fabric 1000. To enable transfer of bulk data, a separate profile or protocol may be incorporated into one or more profiles and made available to the nodes/services in the nodes. The bulk data transfer protocol may model data files as collections of data with metadata attachments. In certain embodiments, the data may be opaque, but the metadata may be used to determine whether to proceed with a requested file transfer.

Figure 49:
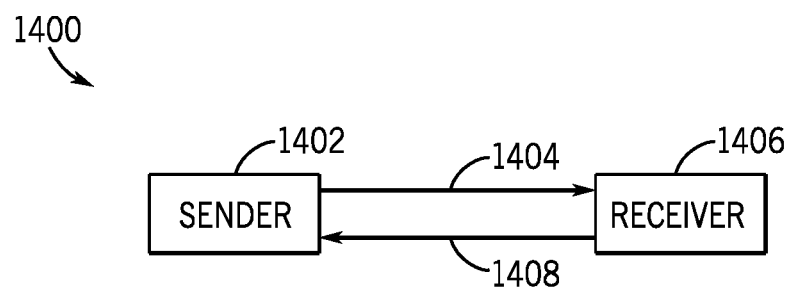
FIG. 49 illustrates a communicative connection between a sender and a receiver in a bulk data transfer, in accordance with an embodiment.

Devices participating in a bulk transfer may be generally divided according to the bulk transfer communication and event creation. As illustrated in FIG. 49, each communication 1400 in a bulk transfer includes a sender 1402 that is a node/service that sends the bulk data 1404 to a receiver 1406 that is a node/service that receives the bulk data 1404. In some embodiments, the receiver may send status information 1408 to the sender 1402 indicating a status of the bulk transfer. Additionally, a bulk transfer event may be initiated by either the sender 1402 (e.g., upload) or the receiver 1406 (e.g., download) as the initiator. A node/service that responds to the initiator may be referred to as the responder in the bulk data transfer.

Bulk data transfer may occur using either synchronous or asynchronous modes. The mode in which the data is transferred may be determined using a variety of factors, such as the underlying protocol (e.g., UDP or TCP) on which the bulk data is sent. In connectionless protocols (e.g., UDP), bulk data may be transferred using a synchronous mode that allows one of the nodes/services ("the driver") to control a rate at which the transfer proceeds. In certain embodiments, after each message in a synchronous mode bulk data transfer, an acknowledgment may be sent before sending the next message in the bulk data transfer. The driver may be the sender 1402 or the receiver 1406. In some embodiments, the driver may toggle between an online state and an offline mode while sending messages to advance the transfer when in the online state. In bulk data transfers using connection-oriented protocols (e.g., TCP), bulk data may be transferred using an asynchronous mode that does not use an acknowledgment before sending successive messages or a single driver.

Regardless of whether the bulk data transfer is performed using a synchronous or asynchronous mode, a type of message may be determined using a Message Type 1172 in the Application Payload 1146 according the Profile Id 1176 in the Application Payload. Table 22 includes an example of message types that may be used in relation to a bulk data transfer profile value in the Profile Id 1176.

TABLE 22

Examples of message types for bulk data transfer profiles

| Message Type | Message |
|---|---|
| 0x01 | SendInit |
| 0x02 | SendAccept |
| 0x03 | SendReject |
| 0x04 | ReceiveInit |
| 0x05 | ReceiveAccept |
| 0x06 | ReceiveReject |
| 0x07 | BlockQuery |
| 0x08 | Block |
| 0x09 | BlockEOF |
| 0x0A | Ack |
| 0x0B | Block EOF |
| 0x0C | Error | i. SendInit

Figure 50:
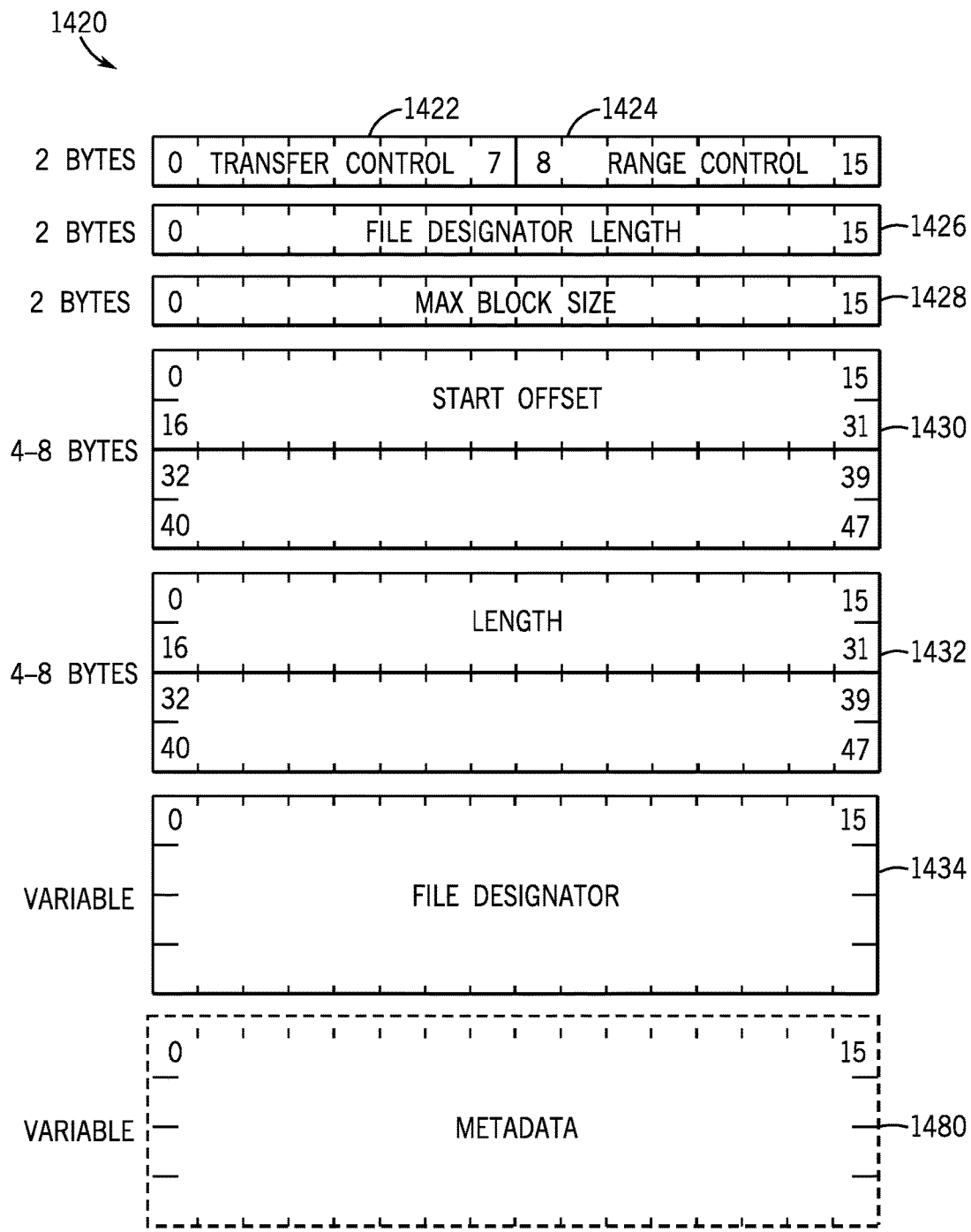
FIG. 50 illustrates a SendInit message that may be used to initiate the communicative connection by the sender of FIG. 49, in accordance with an embodiment.

An embodiment of a SendInit message 1420 is illustrated in FIG. 50. The SendInit message 1420 may include seven fields: a transfer control field 1422, a range control field 1424, a file designator length field 1426, a proposed max block size field 1428, a start offset field 1430, length field 1432, and a file designator field 1434.

Figure 51:
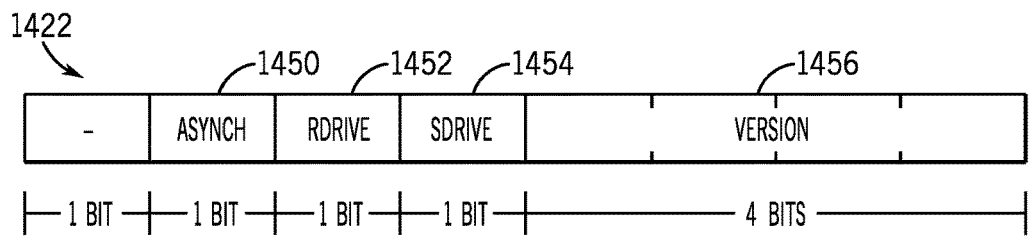
FIG. 51 illustrates a transfer control field of the SendInit message of FIG. 50, in accordance with an embodiment.

The transfer control field 1422 includes a byte of data illustrated in FIG. 51. The transfer control field includes at least four fields: an Asynch flag 1450, an RDrive flag 1452, an SDrive flag 1454, and a version field 1456. The Asynch flag 1450 indicates whether the proposed transfer may be performed using a synchronous or an asynchronous mode. The RDrive flag 1452 and the SDrive flag 1454 each respectively indicates whether the receiver 1406 is capable of transferring data with the receiver 1402 or the sender 1408 driving a synchronous mode transfer.

Figure 52:
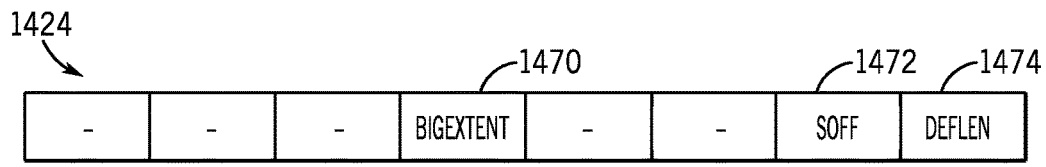
FIG. 52 illustrates a range control field of the SendInit message of FIG. 51, in accordance with an embodiment.

The range control field 1424 includes a byte of data such as the range control field 1424 illustrated in FIG. 52. In the illustrated embodiment, the range control field 1424 includes at least three fields: a BigExtent flag 1470, a start offset flag 1472, and a definite length flag 1474. The definite length flag 1474 indicates whether the transfer has a definite length. The definite length flag 1474 indicates whether the length field 1432 is present in the SendInit message 1420, and the BigExtent flag 1470 indicates a size for the length field 1432. For example, in some embodiments, a value of 1 in the BigExtent flag 1470 indicates that the length field 1432 is eight bytes. Otherwise, the length field 1432 is four bytes, when present. If the transfer has a definite length, the start offset flag 1472 indicates whether a start offset is present. If a start offset is present, the BigExtent flag 1470 indicates a length for the start offset field 1430. For example, in some embodiments, a value of 1 in the BigExtent flag 1470 indicates that the start offset field 1430 is eight bytes. Otherwise, the start offset field 1430 is four bytes, when present.

Returning to FIG. 50, the file designator length field 1426 includes two bytes that indicate a length of the file designator field 1434. The file designator field 1434 which is a variable length field dependent upon the file designator length field 1426. The max block size field 1428 proposes a maximum size of block that may be transferred in a single transfer.

The start offset field 1430, when present, has a length indicated by the BigExtent flag 1470. The value of the start offset field 1430 indicates a location within the file to be transferred from which the sender 1402 may start the transfer, essentially allowing large file transfers to be segmented into multiple bulk transfer sessions.

The length field 1432, when present, indicates a length of the file to be transferred if the definite length field 1474 indicates that the file has a definite length. In some embodiments, if the receiver 1402 receives a final block before the length is achieved, the receiver may consider the transfer failed and report an error as discussed below.

The file designator field 1434 is a variable length identifier chosen by the sender 1402 to identify the file to be sent. In some embodiments, the sender 1402 and the receiver 1406 may negotiate the identifier for the file prior to transmittal. In other embodiments, the receiver 1406 may use metadata along with the file designator field 1434 to determine whether to accept the transfer and how to handle the data. The length of the file designator field 1434 may be determined from the file designator length field 1426. In some embodiments, the SendInit message 1420 may also include a metadata field 1480 of a variable length encoded in a TLV format. The metadata field 1480 enables the initiator to send additional information, such as application-specific information about the file to be transferred. In some embodiments, the metadata field 1480 may be used to avoid negotiating the file designator field 1434 prior to the bulk data transfer.

ii. SendAccept

Figure 53:
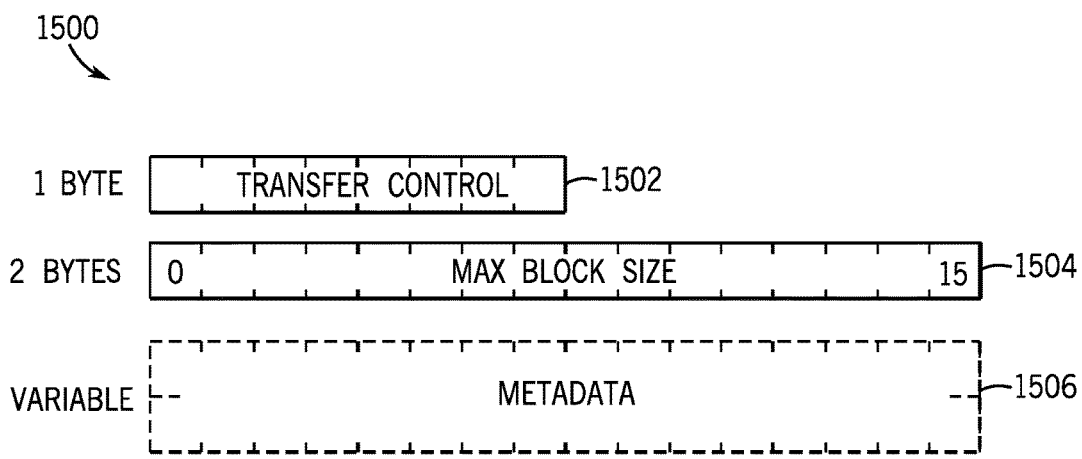
FIG. 53 illustrates a SendAccept message that may be used to accept a communicative connection proposed by the SendInit message of FIG. 50 sent by the sender of FIG. 50, in accordance with an embodiment.

A send accept message is transmitted from the responder to indicate the transfer mode chosen for the transfer. An embodiment of a SendAccept message 1500 is presented in FIG. 53. The SendAccept message 1500 includes a transfer control field 1502 similar to the transfer control field 1422 of the SendInit message 1420. However, in some embodiments, only the RDrive flag 1452 or the SDrive 1454 may have a nonzero value in the transfer control field 1502 to identify the sender 1402 or the receiver 1406 as the driver of a synchronous mode transfer. The SendAccept message 1500 also includes a max block size field 1504 that indicates a maximum block size for the transfer. The block size field 1504 may be equal to the value of the max block field 1428 of the SendInit message 1420, but the value of the max block size field 1504 may be smaller than the value proposed in the max block field 1428. Finally, the SendAccept message 1500 may include a metadata field 1506 that indicates information that the receiver 1506 may pass to the sender 1402 about the transfer.

iii. SendReject

Figure 54:
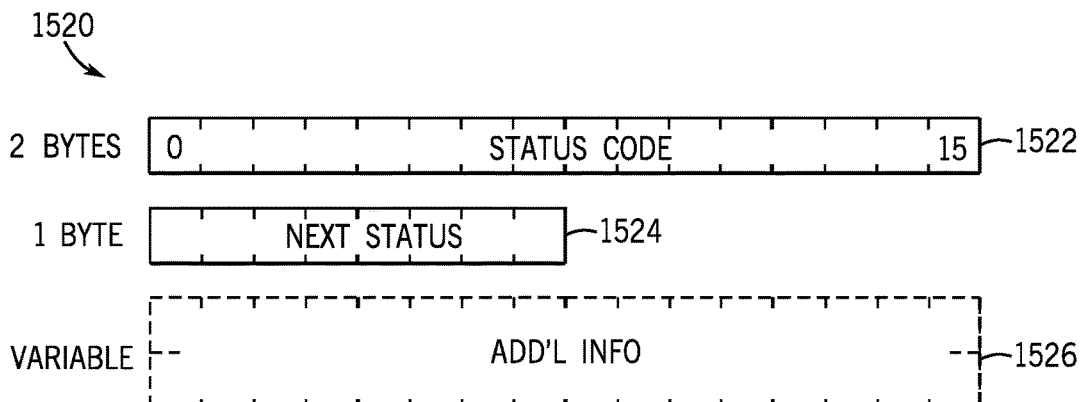
FIG. 54 illustrates a SendReject message that may be used to reject a communicative connection proposed by the SendInit message of FIG. 50 sent by the sender of FIG. 50, in accordance with an embodiment.

When the receiver 1206 rejects a transfer after a SendInit message, the receiver 1206 may send a SendReject message that indicates that one or more issues exist regarding the bulk data transfer between the sender 1202 and the receiver 1206. The send reject message may be formatted according to the status reporting format described above and illustrated in FIG. 54. A send reject frame 1520 may include a status code field 1522 that includes two bytes that indicate a reason for rejecting the transfer. The status code field 1522 may be decoded using values similar to those enumerated as indicated in the Table 23 below.

TABLE 23

Example status codes for send reject message

| Status Code | Description |
| --- | --- |
| 0x0020 | Transfer method not supported |
| 0x0021 | File designator unknown |
| 0x0022 | Start offset not supported |
| 0x0011 | Length required |
| 0x0012 | Length too large |
| 0x002F | Unknown error |

In some embodiments, the send reject message 1520 may include a next status field 1524. The next status field 1524, when present, may be formatted and encoded as discussed above in regard to the next status field 1188 of a status report frame. In certain embodiments, the send reject message 1520 may include an additional information field 1526. The additional information field 1526, when present, may store information about an additional status and may be encoded using the TLV format discussed above.

iv. ReceiveInit

A ReceiveInit message may be transmitted by the receiver 1206 as the initiator. The ReceiveInit message may be formatted and encoded similar to the SendInit message 1480 illustrated in FIG. 50, but the BigExtent field 1470 may be referred to as a maximum length field that specifies the maximum file size that the receiver 1206 can handle.

v. ReceiveAccept

Figure 55:
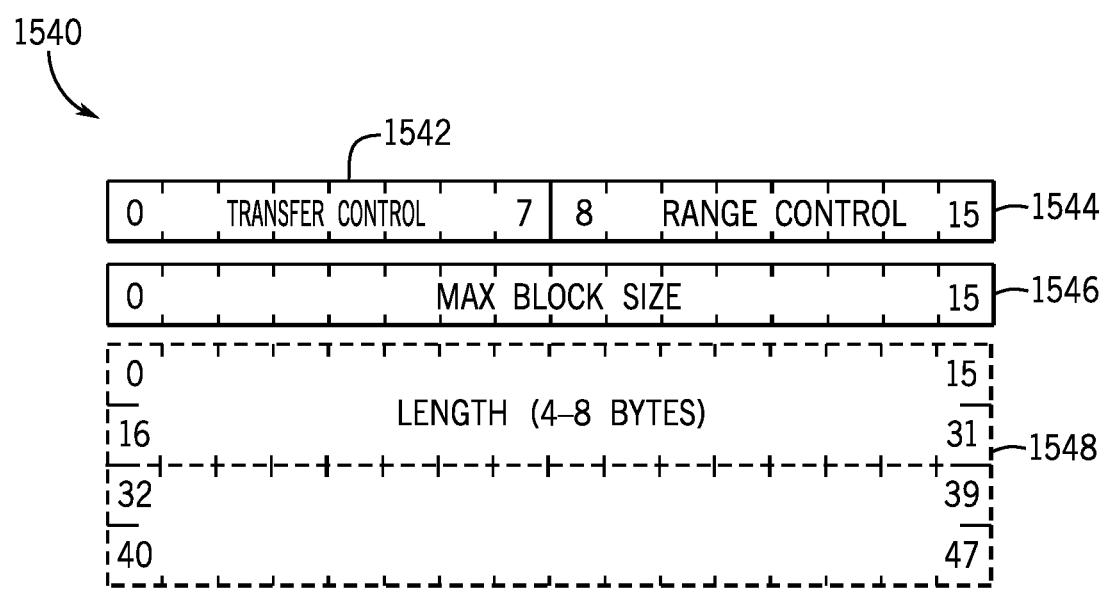
FIG. 55 illustrates a ReceiveAccept message that may be used to accept a communicative connection proposed by the receiver of FIG. 50, in accordance with an embodiment.

When the sender 1202 receives a ReceiveInit message, the sender 1202 may respond with a ReceiveAccept message. The ReceiveAccept message may be formatted and encoded as the ReceiveAccept message 1540 illustrated in FIG. 55. The ReceiveAccept message 1540 may include four fields:

a transfer control field 1542, a range control field 1544, a max block size field 1546, and sometimes a length field 1548. The ReceiveAccept message 1540 may be formatted similar to the SendAccept message 1502 of FIG. 53 with the second byte indicating the range control field 1544. Furthermore, the range control field 1544 may be formatted and encoded using the same methods discussed above regarding the range control field 1424 of FIG. 52.

vi. ReceiveReject

If the sender 1202 encounters an issue with transferring the file to the receiver 1206, the sender 1202 may send a ReceiveReject message formatted and encoded similar to a SendReject message 48 using the status reporting format, both discussed above. However, the status code field 1522 may be encoded/decoded using values similar to those enumerated as indicated in the Table 24 below.

TABLE 24

Example status codes for receive reject message

| Status Code | Description |
| --- | --- |
| 0x0020 | Transfer method not supported |
| 0x0021 | File designator unknown |
| 0x0022 | Start offset not supported |
| 0x0013 | Length too short |
| 0x002F | Unknown error | vii. BlockQuery

A BlockQuery message may be sent by a driving receiver 1202 in a synchronous mode bulk data transfer to request the next block of data. A BlockQuery impliedly acknowledges receipt of a previous block of data if not explicit Acknowledgement has been sent. In embodiments using asynchronous transfers, a BlockQuery message may be omitted from the transmission process.

viii. Block

Blocks of data transmitted in a bulk data transfer may include any length greater than 0 and less than a max block size agreed upon by the sender 1202 and the receiver 1206.

ix. BlockEOF

A final block in a data transfer may be presented as a Block end of file (BlockEOF). The BlockEOF may have a length between 0 and the max block size. If the receiver 1206 finds a discrepancy between a pre-negotiated file size (e.g., length field 1432) and the amount of data actually transferred, the receiver 1206 may send an Error message indicating the failure, as discussed below.

x. Ack

If the sender 1202 is driving a synchronous mode transfer, the sender 1202 may wait until receiving an acknowledgment (Ack) after sending a Block before sending the next Block. If the receiver is driving a synchronous mode transfer, the receiver 1206 may send either an explicit Ack or a BlockQuery to acknowledge receipt of the previous block. Furthermore, in asynchronous mode bulk transfers, the Ack message may be omitted from the transmission process altogether.

xi. AckEOF

An acknowledgement of an end of file (AckEOF) may be sent in bulk transfers sent in synchronous mode or asynchronous mode. Using the AckEOF the receiver 1206 indicates that all data in the transfer has been received and signals the end of the bulk data transfer session.

xii. Error

In the occurrence of certain issues in the communication, the sender 1202 or the receiver 1206 may send an error message to prematurely end the bulk data transfer session. Error messages may be formatted and encoded according to the status reporting format discussed above. For example, an error message may be formatted similar to the SendReject frame 1520 of FIG. 54. However, the status codes may be encoded/decoded with values including and/or similar to those enumerated in Table 25 below.

TABLE 25

Example status codes for an error message in a bulk data transfer profile

| Status code | Description |
| --- | --- |
| 0x001F | Transfer failed unknown error |
| 0x0011 | Overflow error |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Efficient Communication Use Cases and Power Awareness

The efficient IPv6 802.15.4 network protocol and/or the efficient platform protocol discussed above may enable power-efficient operation in a home environment. As will be discussed below, in one example, such communication may include communicating an IPv6 packet to traverse a particular preferred network. Additionally or alternatively, properties of the manner of communication, such as the type of transport protocol—TCP or UDP—used to transport the message, may also be selectable. For example, to provide for greater reliability but less power savings, TCP may be selected, while to provide greater power savings but less reliability, UDP may be selected.

Smart Communication Using IPv6 Packet Header Fields

Figure 56:
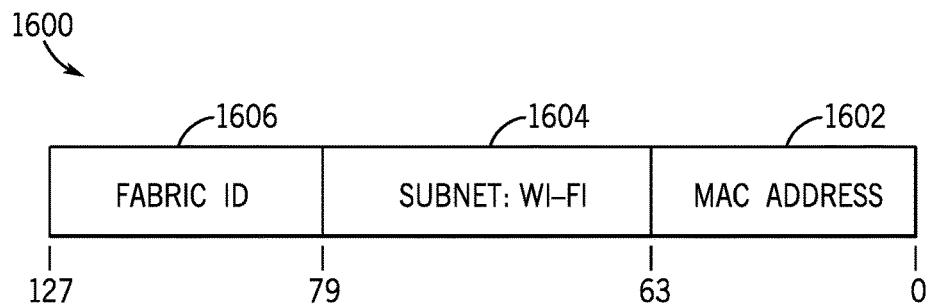
FIG. 56 is a block diagram of an example of an IPv6 packet header using an Extended Unique Local Address (EULA), in accordance with an embodiment.

As indicated above, the fields available in an IPv6 packet header may be used in the system of this disclosure to convey information regarding a target node of a fabric 1000 that is targeted to receive a message. For instance, as seen in FIG. 56, a packet header 1600 of an IPv6 packet targeted to a particular node may include a MAC field 1602, a subnet field 1604, and a fabric ID field 1606. The MAC field 1602 may fill a 64-bit area usually understood to represent an Extended Unique Identifier (EUI-64). The MAC field 1602 may include an indication of the MAC address of the target node. The subnet field 1604 and the fabric ID field 1606 may collectively represent an Extended Unique Local Address (EULA). In the EULA of these fields, the fabric ID field 1606 may indicate the particular fabric 1000 through which the IPv6 packet is to be sent, while the subnet field 1604 may identify a preferred network within the fabric 1000 over which the target node may preferably receive messages. In the example of FIG. 56, the subnet field 1604 indicates that the target node may preferably receive messages via a particular WiFi network. It should be appreciated that the EULA formed by the fabric ID field 1606 and subnet field 1604 may be used when IPv6 packets are being sent entirely within one or more connected fabrics and/or services that serve those fabrics. When the IPv6 packets are to be sent from a node of a fabric 1000 to an external IPv6 Internet address, a different (e.g., more conventional) IPv6 packet header structure may be employed.

Figure 57:
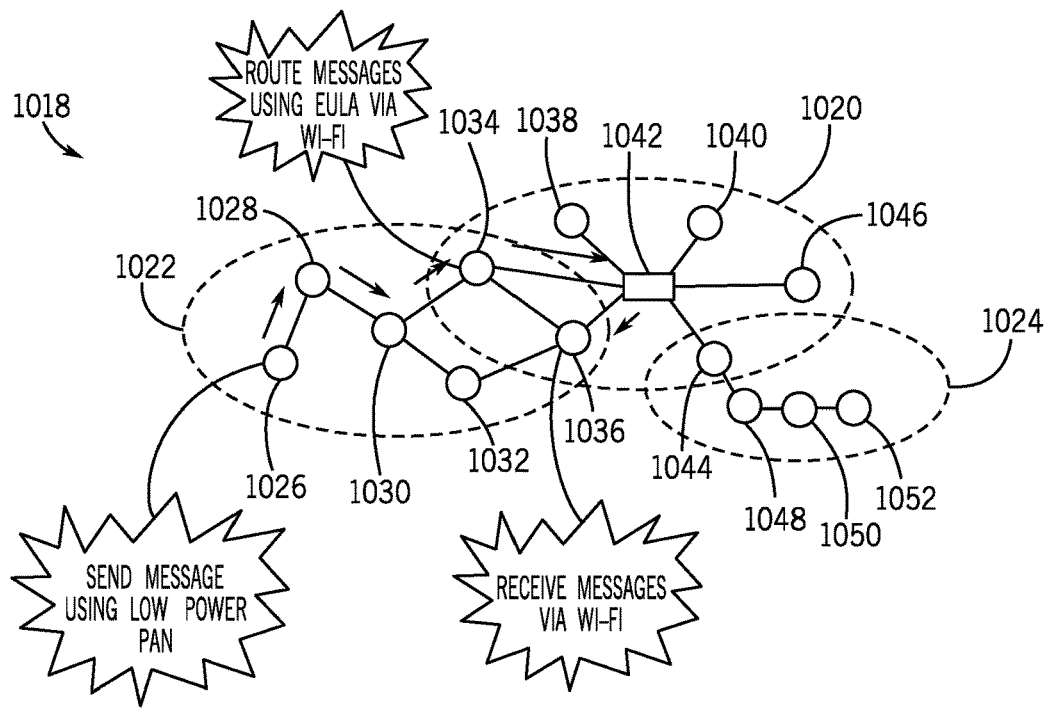
FIG. 57 is a block diagram of an example of communicating an IPv6 packet having the IPv6 packet of FIG. 56 through a fabric topology having two networks, in accordance with an embodiment.

The EULA information of the subnet field 1604 and the fabric ID field 1606 can be used to efficiently communicate IPv6 packets through the fabric 1000 toward a target node. In an example shown in FIG. 57, a message is sent through the network topology discussed above with reference to FIG. 11. Here, the node 1026 is the sending node and the node 1036 is the target node. The node 1026 is operating on the 802.15.4 network 1022, while the target node 1036 operates on both the 802.15.4 network 1022 and the WiFi network 1020. The preferred network of the target node 1036 is represented in the example of FIG. 57 to be the WiFi network 1020. As such, the IPv6 packets used to send the message from the sending node 1026 to the target node 1036 may generally have the characteristics shown in the IPv6 packet 1600 of FIG. 56.

The various nodes 1026, 1028, 1030, 1034, and 1042 are shown in FIG. 57 to communicate the message from the sending node 1026 to the target node 1036. When there is only one network over which to send the message, the message may be communicated through that network. This is the case with the nodes 1026, 1028, and 1030 in the example of FIG. 57. When the message reaches a node that operates on more than one network, such as the node 1034, however, that node may use the subnet field 1604 to determine which network to use to communicate the message further toward the target node 1036.

Figure 58:
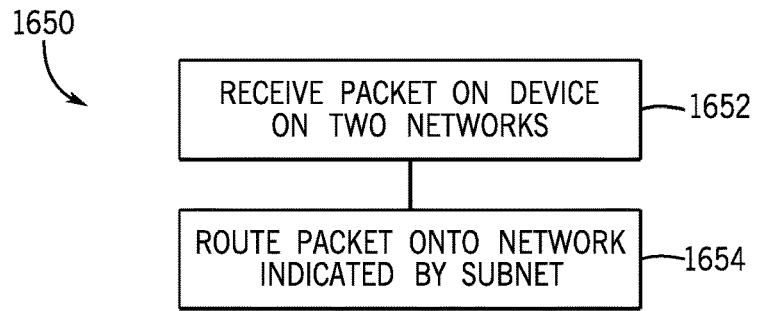
FIG. 58 is a flowchart of a method for efficiently communicating the IPv6 packet through the fabric of FIG. 57 using the IPv6 packet header of FIG. 56, in accordance with an embodiment.

A flowchart 1650 of FIG. 58 illustrates an example of a method for using the subnet field 1604 of a packet header 1600 to communicate the IPv6 packet toward a target node. In the method, a node that operates on two networks (e.g., node 1034, which operates on both the WiFi network 1020 and the 802.15.4 network 1022) may receive an IPv6 packet (block 1652). The node may analyze the subnet field 1604 of the IPv6 packet header 1600 to determine which network is the most proper network to use to forward the IPv6 packet toward the target node. The subnet field 1604 may indicate, for example, that the message is to be received by the target node (e.g., the node 1036) on the WiFi network 1020. The receiving node (e.g., node 1034) then may communicate the IPv6 packet toward the target node (e.g., node 1036) over the network indicated by the subnet field 1604 (e.g., the WiFi network 1020) (block 1654).

In some examples, the network over which the IPv6 packet has been received may be different from the network indicated by the subnet field 1604. In FIG. 57, for example, the node 1034 receives the message over the 802.15.4 network 1022. When the subnet field 1604 indicates that the WiFi network 1020 is the preferred network to be used to send the IPv6 packet, however, the node 1034 may communicate the IPv6 packet over the WiFi network 1020 instead. In this way, the subnet field 1604 may enable a target node to have a preferred network over which to receive messages. In the example of FIG. 57, the target node 1036 may be an always-on electronic device that may communicate more rapidly or more reliably over the WiFi network 1020 than the 802.15.4 network 1022. In other examples, the target node 1036 may be a battery-powered sleepy device that would be better served to receive messages over the 802.15.4 network 1022. Under such an example, even though the target node 1036 could receive messages via the WiFi network 1020, by receiving the messages via the 802.15.4 network 1022 as may be indicated by a subnet field 1604, the target node 1036 may conserve power. Thus, the EULA of the IPv6 packet header 1600 (e.g., the fabric ID field 1606 and the subnet field 1604) may be used to promote efficient message transfer through a fabric. Selection of the Transport Protocol or Preferred Target Network Based on the Desired Reliability of the Message Judicious selection of the transport protocol (e.g., TCP or UDP) and/or a preferred target node network used to send the IPv6 packets may also lead to efficient network usage. Indeed, while TCP is more reliable than UDP, the reliability of TCP stems from its use of handshaking and acknowledgments when transmitting messages, many of which are absent in UDP. The additional reliability of TCP, however, may increase the cost of sending a message in terms of power consumed. Indeed, there is an additional cost in power due to the handshaking and acknowledgments of TCP. In addition, using TCP will cause dropped packets to be resent until they have been confirmedly received, consuming additional power at all devices that suffer dropped packets.

Figure 59:
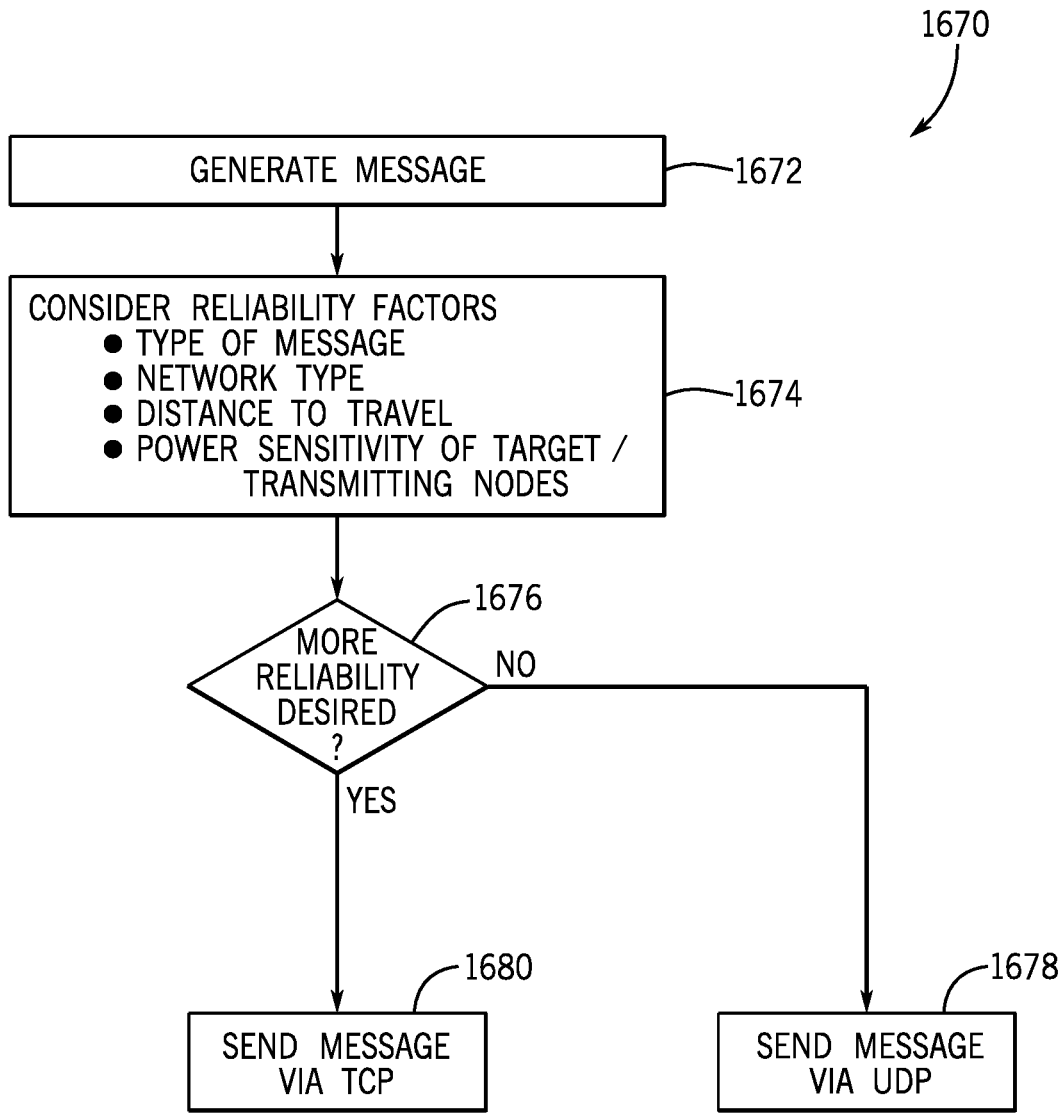
FIG. 59 is a flowchart of a method for selecting an efficient transport protocol over which to send a message based at least in part on one or more reliability factors, in accordance with an embodiment.

As such, it may be desirable to send messages by UDP unless there are reasons that reliability is preferred over power efficiency. For instance, as shown in a flowchart 1670 of FIG. 59, one of the devices on a fabric 1000 may generate a message (block 1672). The device may consider one or more reliability factors relating to a desired reliability of the message (block 1674). This consideration of the one or more reliability factors may take place in the application layer 102 or the platform layer 100 of the OSI stack 90 running on the device. In either case, the reliability factor(s) that the device may consider may include (1) a type of the message generated at block 1672, (2) a type of the network over which the message is going to be sent, (3) a distance over which the message may travel through the fabric, (4) a power sensitivity of the target node and/or the transmitting nodes that are going to be used to communicate the message to the target node, and/or (5) a target end node type (e.g., whether a device or a service). In some embodiments, only one factor may be considered. Moreover, the list of reliability factors discussed here is not intended to be exhaustive, but rather to provide examples for deciding whether reliability or power savings may be more desirable when sending a message.

A first factor that may affect the desired reliability of the transport protocol is the type of the message that is going to be sent. A very high reliability may be desired when the message is an alarm message, such as a message indicating that a hazard has been detected. A high reliability may be less valuable than power savings, however, when the message represents sensor data or certain device status data.

A second factor that may affect the desired reliability of the transport protocol is the type of network over which the message is to be sent. When the message will primarily traverse an 802.15.4 network, for example, this may imply that power savings may be more beneficial than reliability. When the message will primarily or entirely traverse a WiFi network, however, this may imply that the power savings may be less valuable and reliability may be more valuable.

A third factor that may affect the desired reliability of the transport protocol is the distance over which the message may travel through the fabric 1000 to reach the target node. The distance may represent, for instance, the number of "hops" to reach the target node, the number of different types of networks that may be traversed to reach the target node, and/or an actual distance through the network.

A fourth factor that may affect the desired reliability of the transport protocol is the power sensitivity of the devices that may be used to communicate the message to the target node. When all or substantially all of such devices are always-on or are supplied by an external power source, higher reliability may be preferable to power savings. When one or many of the devices are low-power, sleepy, and/or battery powered devices, power savings may be preferable when the message is not especially urgent.

A fifth factor that may affect the desired reliability of the transport protocol is the type of the target end node of the message. In one example, when the target end node is a service, whether local or remote, a higher reliability may be desired. Thus, in this case, TCP may be preferred over UDP. In another example, a higher reliability may be preferred when the target end node is a remote service, but less reliability and greater power savings may be called for when the target end node is a local service. In other examples, the type of service may be considered. That is, for some services, reliability may be preferred over power savings, while for other services, power savings may be preferred over reliability. To provide just one example, to communicate with a service used to provide weather information, a relatively lower reliability may be desired as compared to power savings. On the other hand, to communicate with a service used to provide a software update, higher reliability may be preferred over power savings.

The device may consider one or more of these factors in any suitable way. In one example, the factors may be assigned a weight and reliability determination may be based on the total weighting of the factors. In other examples, certain factors may have a higher priority than other factors. In such an example, an urgent message may always be considered to have more desired reliability over power savings, while the desirability of reliability for non-urgent messages may depend on other factors. As such, when power savings is desired over reliability (decision block 1676), the device may send the message via UDP (block 1678) to save power despite lower reliability. When more reliability is desired over power savings (decision block 1676), the device may send the message via TCP (block 1680) to have increased reliability despite higher power consumption.

Although the above method has been discussed with reference to a selection of sending the message using TCP or UDP, it should be appreciated that the present communication system may efficiently adjust any number of properties of the manner of communication to balance desired reliability with power consumption. For example, in some embodiments, when a higher reliability is desired, a higher-power network (e.g., WiFi) may be preferred, while when a lower reliability and higher power savings is desired, a lower-power network (e.g., 802.15.4) may be preferred. The sending node may, for example, select a different preferred network to note in the subnet field 1604 of the IPv6 packet header 1600, thereby causing the message to be communicated, when possible, through that selected network.

Additional Use Cases

The fabric 1000 of connected devices discussed above may be used in a variety of manners. One example may involve using one device to invoke a method on another device. Another example may involve propagating a message, such as a hazard alarm, over various devices of the fabric. It should be understood that these use cases are intended to provide examples and are not intended to be exhaustive.

Invoking a Method from One Device on Another

Figure 60:
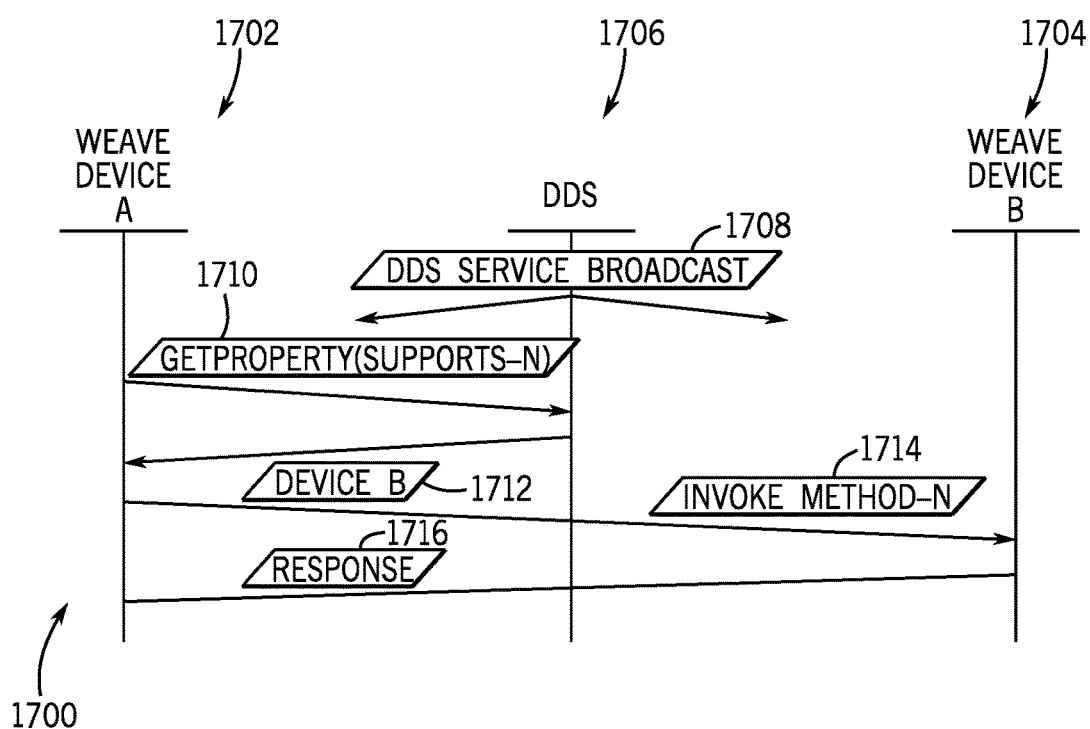
FIG. 60 is a diagram illustrating a use case of a fabric of devices in which one device invokes a method on another device, in accordance with an embodiment.

In one case, a device in one area of the fabric 1000 may invoke a particular method on another compatible device. One example appears in a diagram 1700 of FIG. 60. The diagram 1700 illustrates interactions between a first device 1702 and a second device 1704, as mediated by a directory device (DDS) 1706. The directory device (DDS) 1706 may issue a DDS service broadcast 1708 to the various devices on the fabric, including the first device 1702 and the second device 1704. In response, the directory device (DDS) 1706 may receive a list of all methods and/or profiles the various devices of the fabric 1000 support.

When one of the devices of the fabric, such as the first device 1702 desires to perform a method (shown in FIG. 60 as a method n), the first device 1702 may query the directory device (DDS) 1706 with a corresponding query message 1710 (e.g., GetProperty(supports-n)). The directory device (DDS) 1706 may reply with the devices that support such a property—here, replying with a message 1712 indicating that the second device 1704 supports the desired method. Now in possession of this information, the first device 1702 may invoke the method in a message 1714 to the second device 1704. The second device 1704 then may issue a reply 1716 with an appropriate response.

The method invoked by the first device 1702 on the second device 1704 may be any of a number of methods that may be useful to a home network. In one example, the first device 1702 may request environmental sensor data from the second device 1704. The environmental sensor data may indicate motion, temperature, humidity, and so forth. The environmental sensor data may be used by the first device 1702 to determine occupancy for security, for example, or to determine various temperatures currently located around a house. In another example, the first device 1702 may request user interface input information from the second device 1704. For instance, the first device 1702 may request an indication of recent thermostat temperature setpoints to ascertain information regarding the recent desired comfort settings of the occupants.

Propagating a Message to Various Devices of the Fabric

Figure 61:
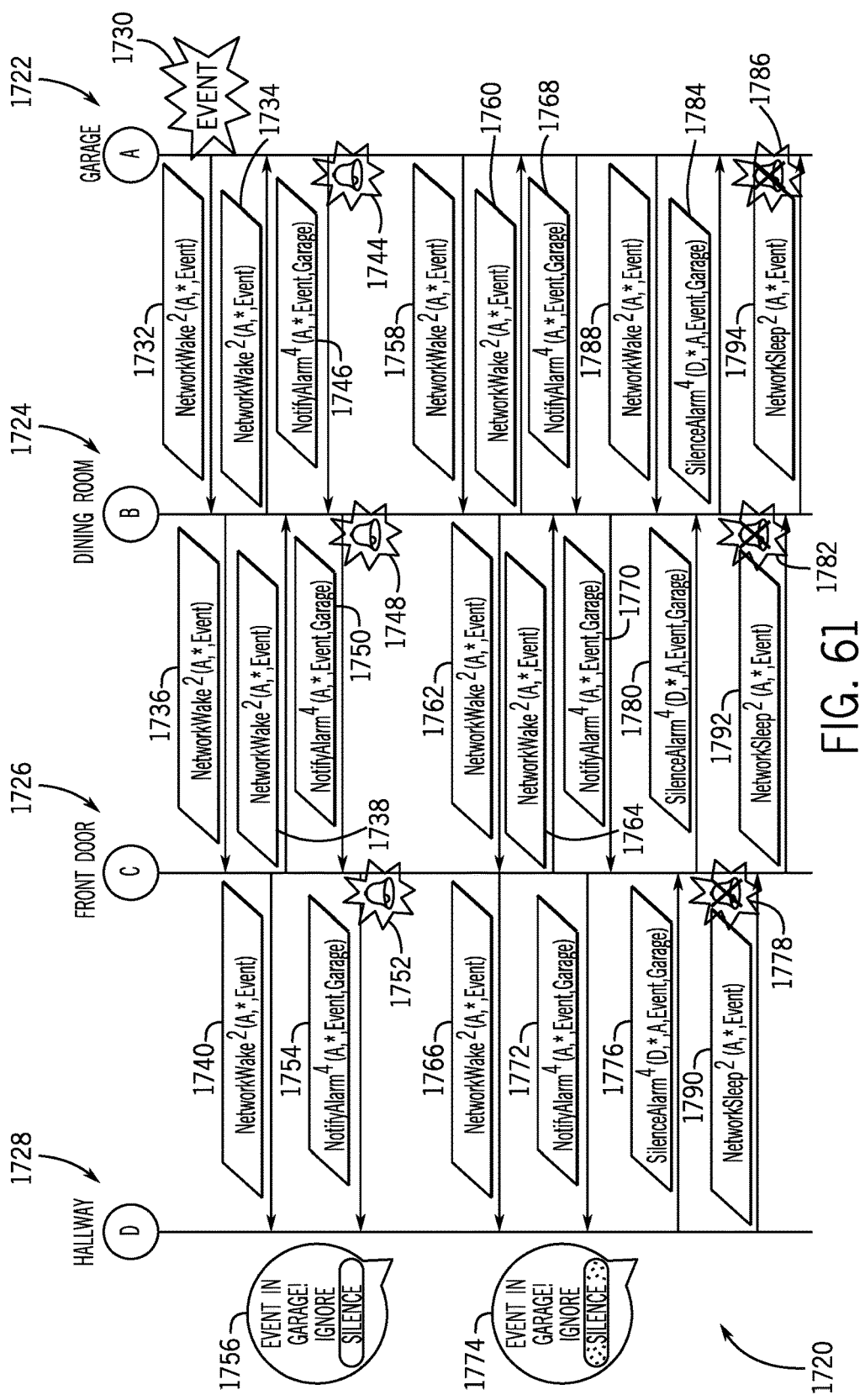
FIG. 61 is a diagram illustrating a use case of a fabric of devices in which an alarm message is propagated through a number of low-power, sleepy devices, in accordance with an embodiment.

In some situations, it may be desirable to propagate a message to multiple devices of the fabric. For example, as shown in a diagram 1720 of FIG. 61, several devices 1722, 1724, 1726, and 1728 may be used to propagate a hazard alarm message. Indeed, the hazard alarm message may be propagated even though one or more of the various devices 1722, 1724, 1726, and 1728 may be low-power, "sleepy" devices. In the example of FIG. 61, the device 1722 is a hazard detector (e.g., a smoke detector) in the garage, the device 1724 is a hazard detector (e.g., a smoke detector) in the dining room, the device 1726 is a smart doorbell at the front door, and the device 1728 is a thermostat in the hallway.

The action of the diagram 1720 begins when an event 1730 (e.g., fire) is detected by the garage device 1722. The garage device 1722 may propagate a network wake message 1732 to the dining room device 1724, which may issue a reply 1734 accordingly. The dining room device 1724 may temporarily wake up from its sleepy state to an awake, always-on state. The dining room device 1724 may also propagate a network wake message 1736 to the front door device 1726, which may reply 1738 likewise while propagating another network wake message 1740 to the hallway device 1728.

Having woken the devices of the fabric, the garage device 1722 may output an alarm 1744 associated with the event 1730 and may issue an alarm notification message 1746 to the dining room device 1724. The alarm notification message 1746 may indicate the type of event and the originating device (e.g., event occurring in the garage), among other things. The dining room device 1724 may output a corresponding alarm 1748 and forward an alarm notification message to the front door device 1726, which may itself begin to output an alarm 1752. The front door device 1726 may also forward an alarm notification message to the hallway device 1728.

The hallway device 1728 may display an interface message 1756 to enable a user to respond to the alarm. In the meantime, messages may continue to be propagated across the fabric. These include additional network wake and reply messages 1758, 1760, 1762, 1764, and 1766, and additional alarm notification messages 1768, 1770, and 1772. When a user provides user feedback 1774 on the hallway device 1728 requesting that the alarm be silenced (in the understanding, for example, that the alarm is false or due to non-hazardous conditions), the hallway device 1728 may respond by sending an alarm silence message 1776 that may be propagated over the fabric 1000 to all of the devices. The alarm silence message 1776 may reach the front door device 1726, which may silence its alarm 1778 and issue a further alarm silence message 1780 to the dining room device 1724. In response, the dining room device 1724 may silence its alarm 1782 and issue a further alarm silence message to the garage device 1722, which may in turn silence its alarm 1786.

After causing the devices 1726, 1724, and 1722 to silence their alarms, the hallway device 1728 may cause the devices 1726, 1724, and 1722 to reenter a sleepy, low-power state. Specifically, the hallway device 1728 may issue network sleep message 1790 to the front door device 1726, which may enter a sleepy state after issuing a network sleep message 1792 to the dining room device 1724. The dining room device 1724 may correspondingly enter a sleepy state after issuing a network sleep message 1794 to the garage device 1722. Upon receipt of the network sleep message 1794, the garage device 1722 may enter the low-power, sleepy state.

Joining or Creating a Fabric

Figure 65:
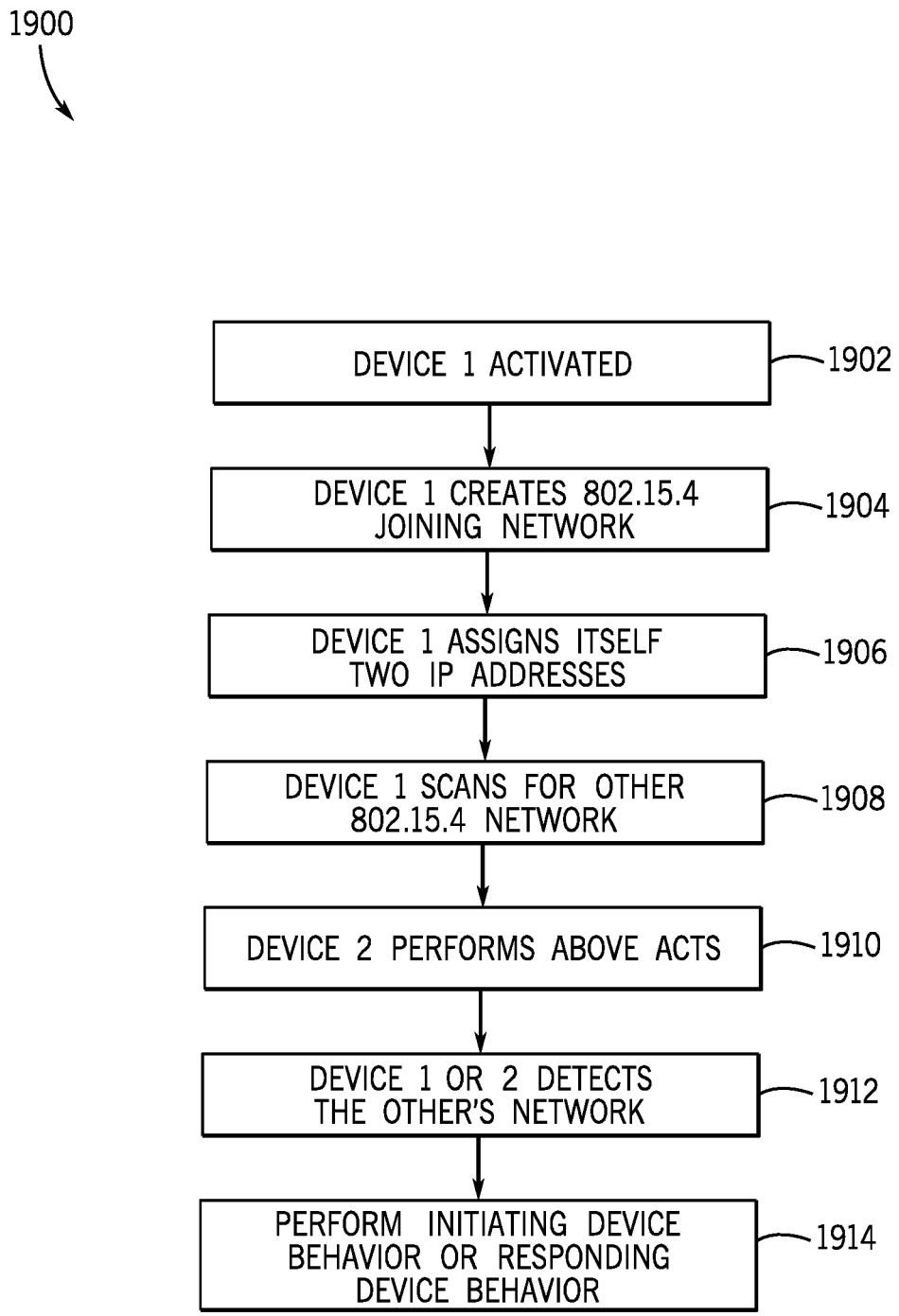
FIGS. 65-67 are flowcharts of another method for introducing a new device into a fabric of devices, in accordance with an embodiment.
Figure 66:
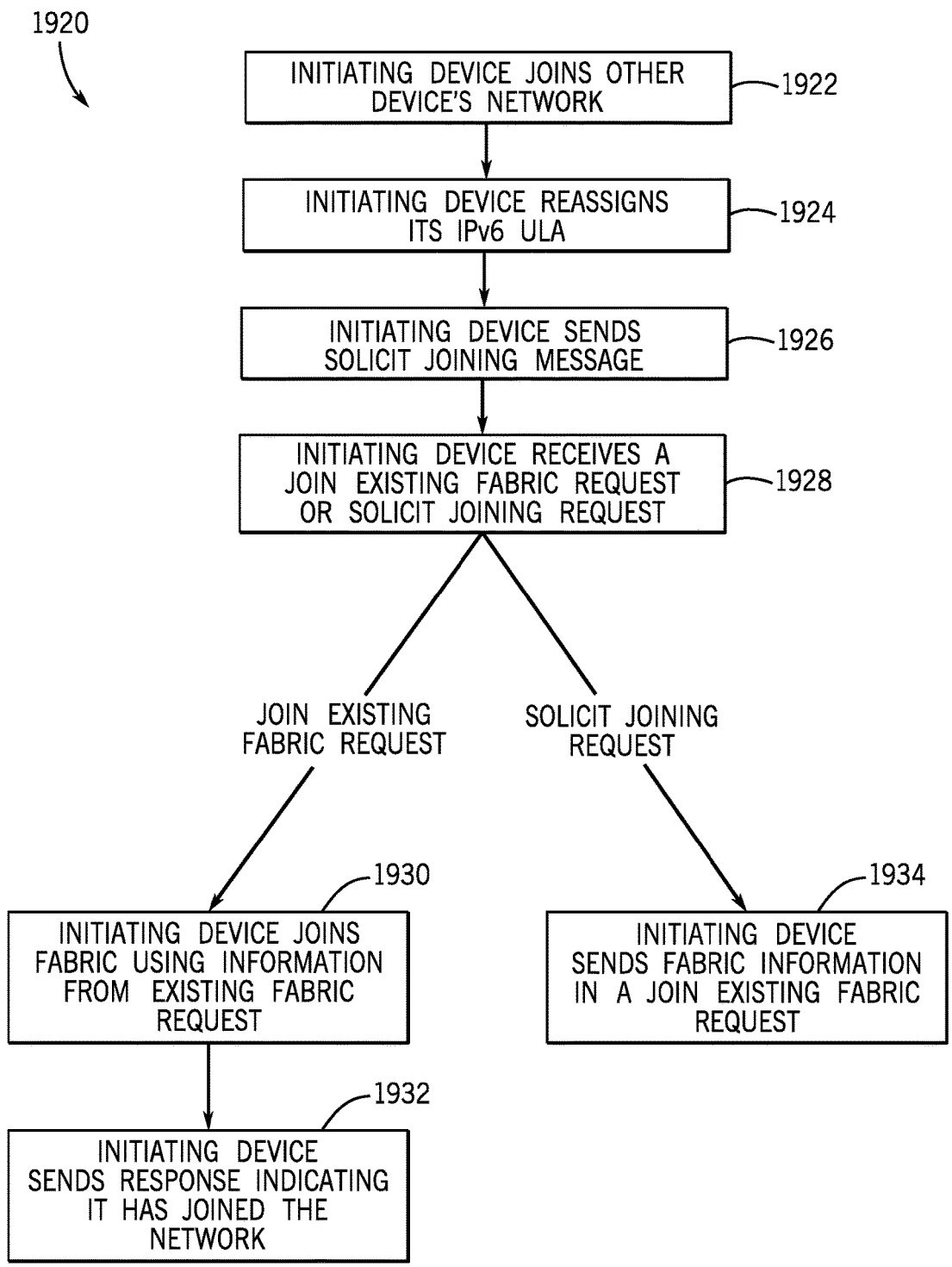
Figure 67:
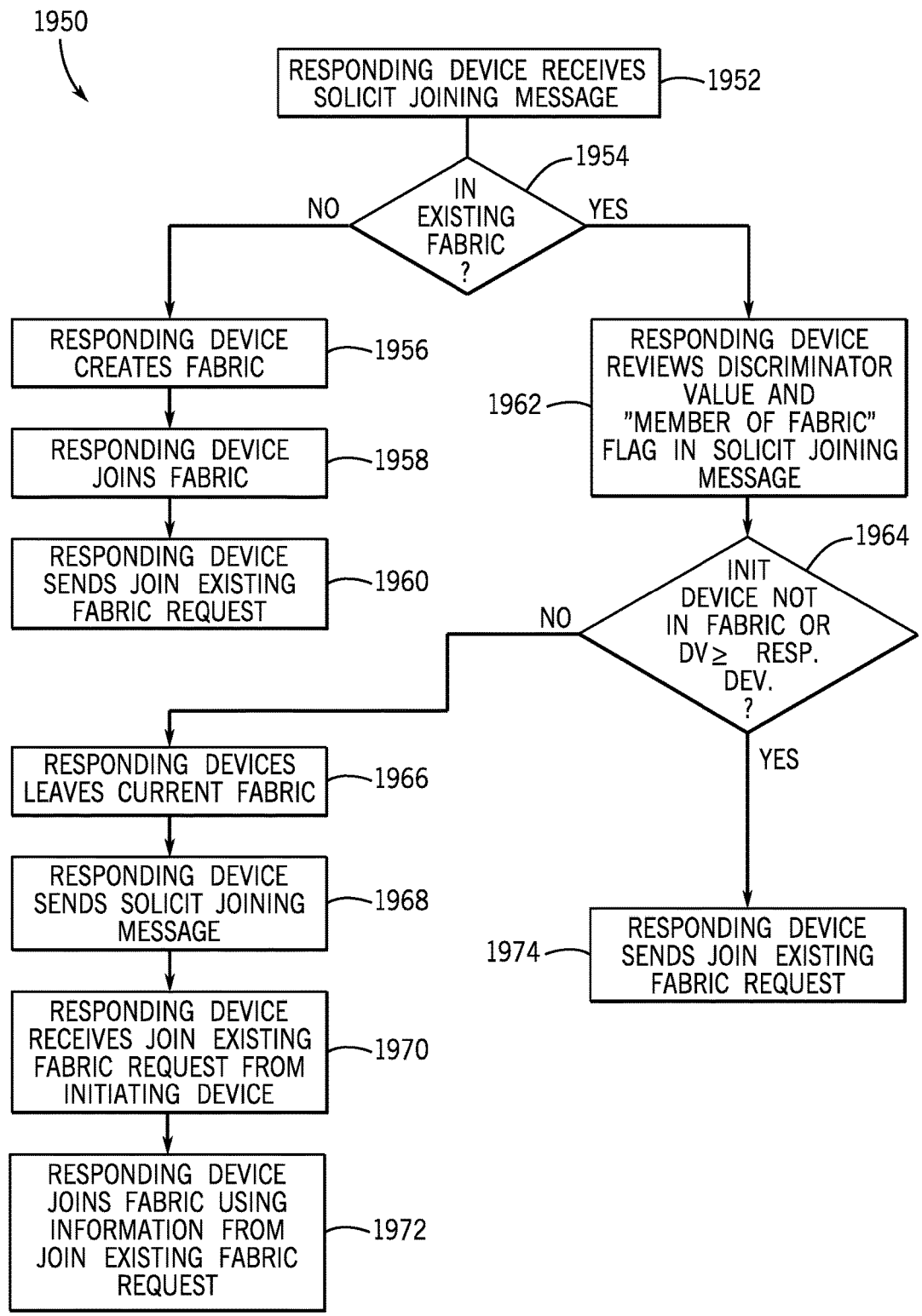

The protocols discussed above can be used to join or create a fabric 1000 of devices in a home network or similar environment. For example, FIGS. 62-64 relate to a first method in which a new device joins an existing fabric 1000 through another device of the fabric 1000 that is connected to a service (e.g., via the Internet). FIGS. 65-67 relate to a second method in which a new device joins an existing fabric 1000 or creates a new fabric 1000 through a peer-to-peer connection with another device regardless of whether either device is connected to another service. The following examples relate to joining a fabric 1000 with a new device that may not have a user interface with a native display, and as such may involve assistance from a third-party client device (e.g., a mobile phone or tablet computer). In other embodiments, such as those in which the new device includes a user interface with a native display, the activities described below as being carried out on a third-party client device may instead take place on the new device.

Joining or Creating a Fabric Using an Internet Connection to a Service

Figure 62:
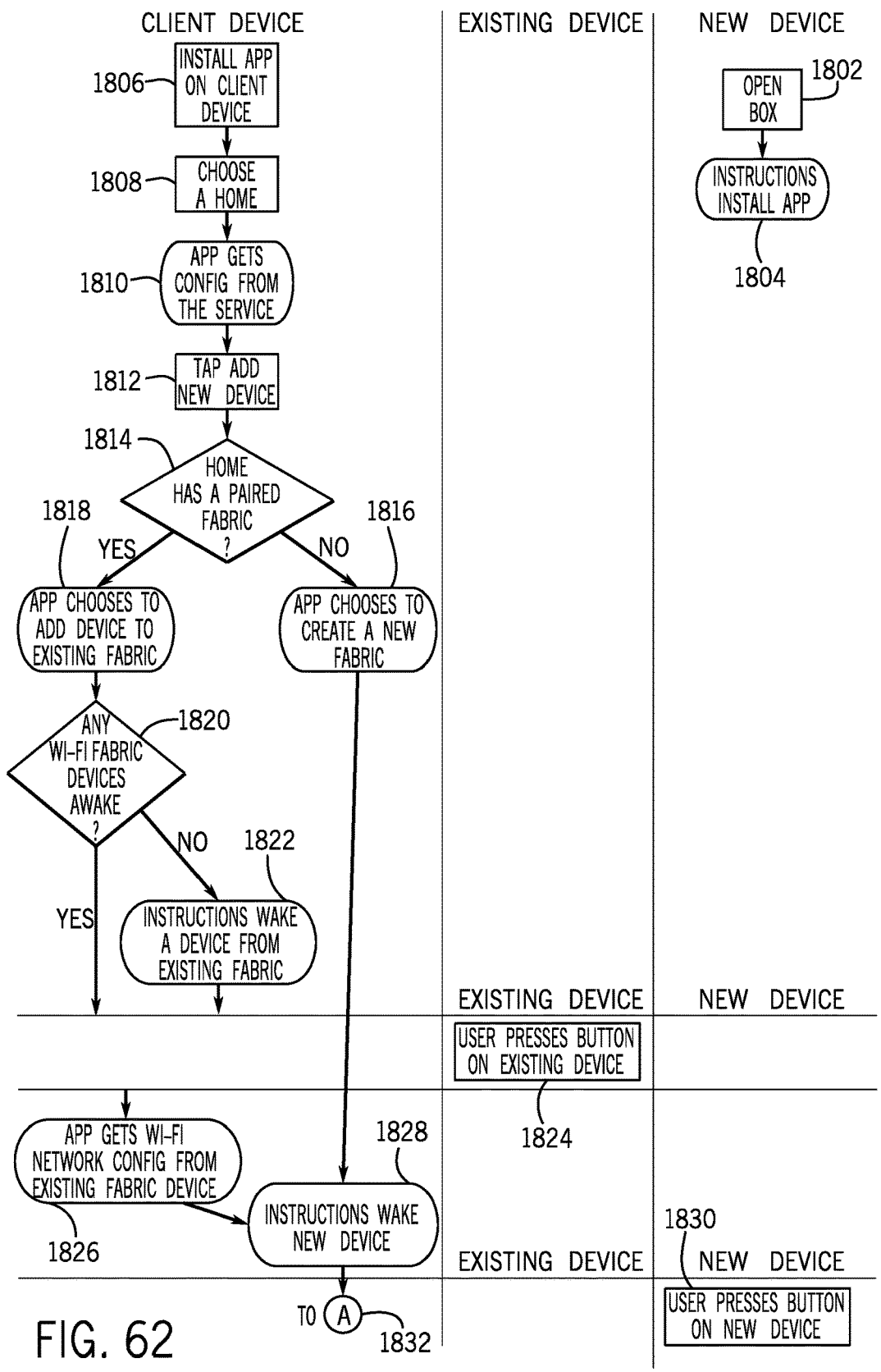
FIGS. 62-64 are flowcharts of a method for introducing a new device into a fabric of devices, in accordance with an embodiment.
Figure 63:
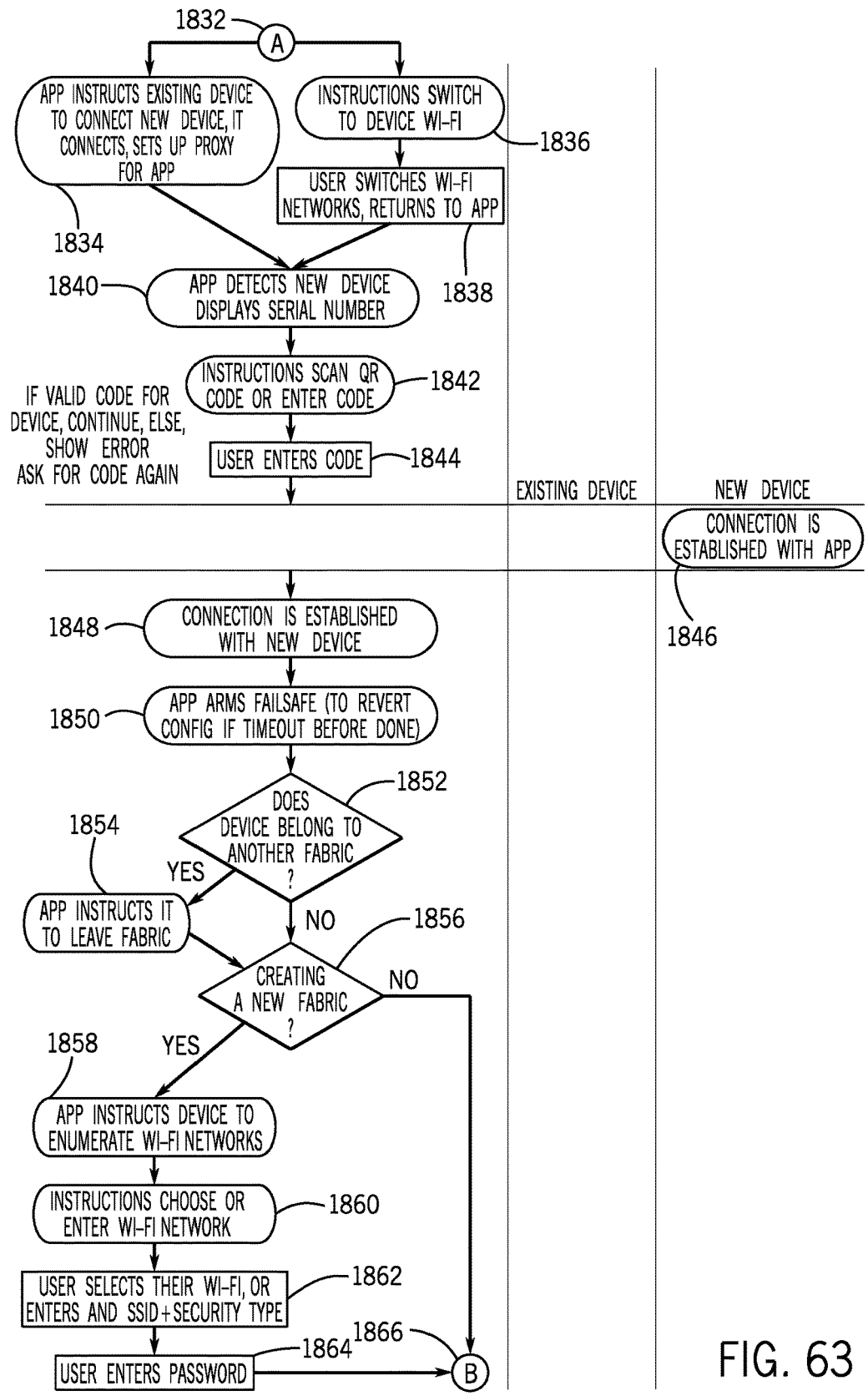
Figure 64:
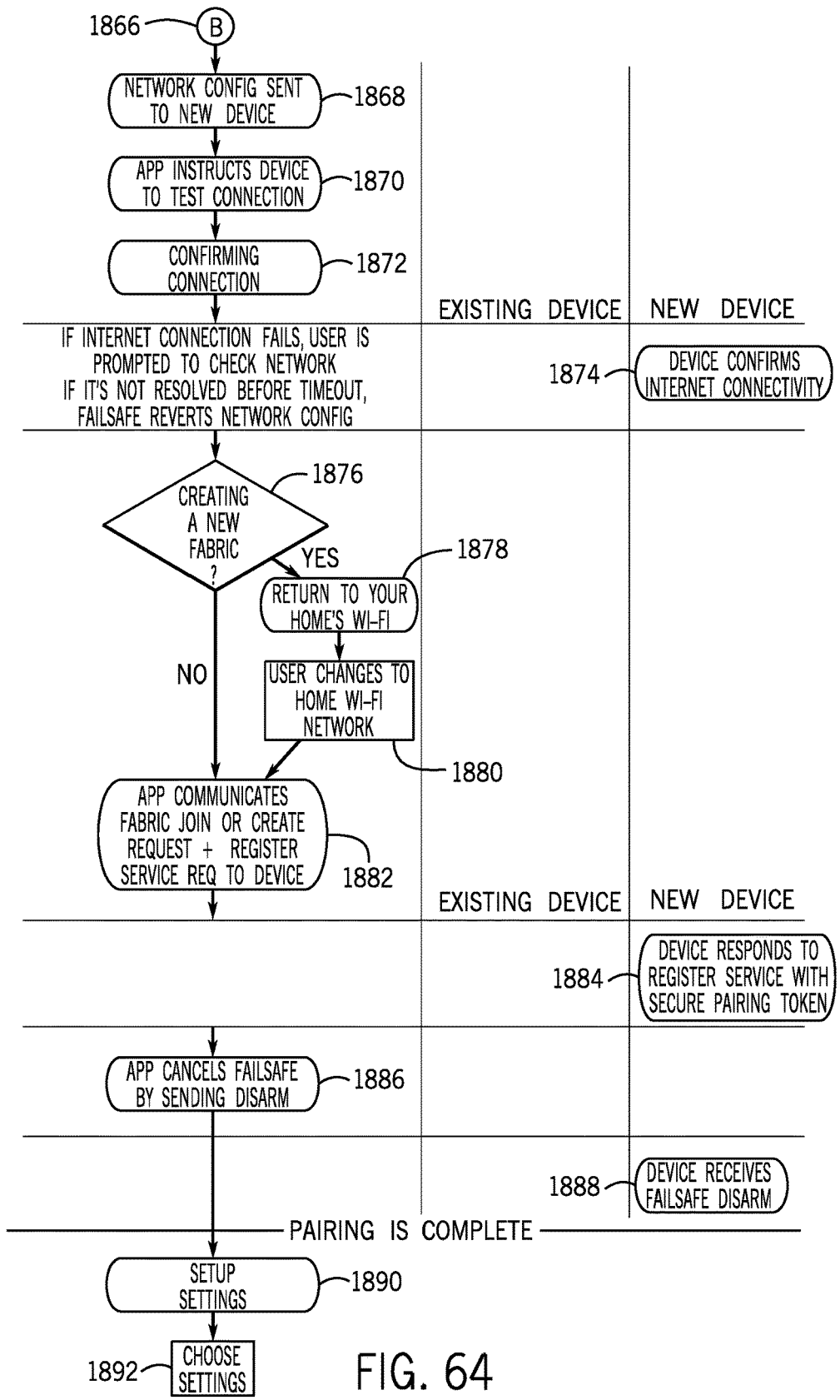

Turning first to a flowchart 1800 shown in FIGS. 62-64, a user may join a new device to a fabric 1000 by opening the box in which the device has been sold (block 1802) and obtaining instructions to install an application (block 1804) on a third-party client device (e.g., a mobile phone or tablet computer). The application may be installed on the client device (block 1806) and the user may log into a service account related to the fabric 1000 where the user may select the particular fabric 1000 the new device is to join (block 1808). For instance, the user may install a Nest® application and may log into a Nest® service account associated with a Nest® Weave™ fabric. The application on the client device may obtain information associated with a service configuration of the fabric 1000 (block 1810). The information associated with the service configuration of the fabric 1000 may include, for example:

- a service node identification (e.g., an EUI-64 or EULA);
- a set of certificates that may serve as trust anchors for the service (e.g., a fabric authentication token);
- a globally unique account identification associated with the user's account;
- a Domain Name Service (DNS) host name identifying the entry point for the service; and/or
- an opaque account pairing token that may be used by the new device to pair with the user's account.

The user may also elect, via the application on the client device, to add a new device to the fabric 1000 (block 1812). Based on whether there is currently an existing fabric 1000 associated with the user or based on any other suitable criteria (decision block 1814), the application may choose to create a new fabric 1000 (block 1816) or to add the new device to an existing fabric 1000 (block 1818).

When the application chooses to add the new device to an existing fabric 1000 (block 1818), the application may determine whether the devices of the network are in an awake rather than sleepy state (decision block 1820), waking the devices (block 1822) if not awake. The user may select a particular existing device of the network to use in a joining process by, for example, pressing a button (block 1824). The existing device may provide fabric-joining information to the application on the client device (block 1826). For instance, the application on the client device may establish a secure session with the existing device using a fabric 1000 authentication token. The application may use requests (e.g., GetNetworkConfiguration and/or aGetFabricConfiguration) to obtain from the existing device network configuration information and/or fabric 1000 configuration information. The application may save this information for later use.

The application may further instruct the user to wake the new device (block 1828) by, for example, pressing a button on the new device (block 1830). The method then may progress to block (A) 1832, which continues on FIG. 63. Here, the application on the client device may instruct the existing device to connect to the new device (block 1834). For example, the application may establish a new secure session to the existing device using a fabric authentication token, and over this new session may send a request (e.g., ConnectOtherDevice) to the existing device. Meanwhile, the new device may have set up an 802.15.4 "joining network" specific to the purpose of joining with the existing device. Thus, the request of block 1834 may specify that the application wishes the existing device to connect to the new device via an 802.15.4 network connection (e.g., the 802.15.4 joining network created by the new device). The existing device then may perform a scan of nearby 802.15.4 networks looking for the network created by the new device. Once found, the existing device may leave the existing fabric, join the new 802.15.4 joining network, and probe the 802.15.4 joining network by attempting to connect to a rendezvous address (which may be previously specified by the software or firmware of the existing device or by the application on the client device). Once a connection to the new device is established, the existing device may respond to the request to connect to the new device (e.g., ConnectOtherDevice) from the application on the client device with a reply of success. From this point forward, messages provided to the new device from the application may be carried by proxy through the existing device via the 802.15.4 joining network. That is, the new device may be connected to the existing device via the 802.15.4 joining network, the existing device may be connected to the service node via WiFi (and/or an Internet connection), and the application on the client device may be connected to the service. In this way, the application may connect to the new device through the existing fabric, and the existing device may only use single WiFi connection and a single 802.15.4 connection (thereby reducing avoiding using in the existing device multiple receivers and transmitters per network type, which may reduce device cost and power consumption).

Alternatively, when a new fabric 1000 is to be created, the application on the client device may connect directly to the new device using a WiFi connection. Thus, the application on the client device may instruct the user to switch to a WiFi connection (block 1836). The user may switch WiFi networks on their client device to establish a peer-to-peer WiFi connection with the new device (block 1838). For example, the new device may have associated with it a unique WiFi SSID name on the back of the new device. The application on the client device may probe for the new device by repeatedly attempting to connect to a previously determined rendezvous address (e.g., as provided to the application by the configuration information from the service or as encoded in the application).

With either of these connections established, the application on the client device may detect the new device and display a serial number provided by the new device (block 1840). At this time, the application may also validate that the new device has installed on it certain security features identifying the device as authentically validated and having proper permissions to join the fabric. These security features may be the same as or in addition to the DTLS security certificates discussed above.

Using either connection, the user may facilitate an authentication procedure when the application on the client device instructs the user to scan a QR code or other code associated with the new device (e.g., printed on the new device or on a card provided with the new device) (block 1842). The user may enter the code by scanning or typing the code into the application (block 1844). This code information may be provided to the new device, which may use the code to confirm that the application is being used authentically by a user in possession of the new device. The new device may, for example, validate the code using a built-in check digit. The new device may indicate when the code has been entered incorrectly with a corresponding reply. The application may establish a secure session with the new device using any suitable protocol, including the Weave PASE protocol, using the supplied pairing code as a password (block 1848). Having established the secure connection to the new device, the application on the client device may issue a request to arm a failsafe regimen on the new device (e.g., ArmConfigurationFailsafe) (block 1850). By arming the failsafe regimen, the new device may revert to certain original configurations if the joining process does not complete by some timeout value. The application may also determine whether the new device belongs to another existing fabric 1000 by issuing a suitable request (e.g., GetFabricState) (decision block 1852). If so, the application may instruct the new device to leave the other existing fabric 1000 by issuing another request (e.g., LeaveFabric) (block 1854).

In a case in which the new device is to form a new fabric 1000 with the existing device (decision block 1856), the application may instruct the new device to enumerate a list of WiFi networks visible to the new device (e.g., via an EnumerateVisibleNetworks request) (block 1858). Upon instruction from the application (block 1860), the user then may select from among these networks or may enter the WiFi network that the new device is to join (block 1862). The user may also enter an appropriate password to join the WiFi network (block 1864). The method may further progress to block (B) 1866, which continues on FIG. 64. The application may send the WiFi network configuration information to the new device (e.g., via an AddNetwork request) (block 1868), and the application may instruct the new device to test the connection (e.g., via a TestNetwork request) by attempting to reach the service on the Internet (block 1870). The application may indicate to the user that the network connection is being confirmed (block 1872) and the new device may subsequently confirm its connection to the application (block 1874).

With the new device now connected to the Internet via the WiFi connection, if a new fabric 1000 is being created (block 1876), the application may instruct the user to return to the fabric 1000 (e.g., the user's home) WiFi connection (block 1878). The user may change the WiFi network being used by the client device to the WiFi connection used by the fabric 1000 (block 1880).

Whether creating a new fabric 1000 or joining an existing one, the application may instruct the new device to do so at this point (block 1882). That is, the application may instruct the new device to create a new fabric 1000 (e.g., via a CreateFabric request) or may instruct the new device to join the existing fabric 1000 (e.g., via a JoinExistingFabric request). In the case of joining an existing fabric, the application may inform the new device of the existing device (e.g., via a RegisterNewFabricMember request to the new device). In either case, the application may configure the new device to communicate with the service (e.g., the Nest® service) by sending a request (e.g., a RegisterService request) that contains service configuration information (e.g., Weave™ Service Configuration information).

Using the service configuration information, the new device may register with the service (block 1884). For example, the new device may connect to the service using a service node ID and DNS name from the service configuration information. The new device may register with the service using a certificate installed on the new device and a private key. The new device may send a message (e.g., a PairDeviceToAccount message) to the service containing the service account identification associated with the fabric 1000 and an account pairing token obtained from the service configuration information. Using this information, the service may validate the account pairing token and may associate the new device with the user's service account associated with the fabric. At this point, the new device may be understood by the service to form a part of the fabric 1000 and may appear as an associated device when the user logs into the service. The service may respond to the message from the new device (e.g., the PairDeviceToAccount message), may destroy its copy of the account pairing token, and may respond to the message previously sent to the application (e.g., the RegisterService request).

In response, to finalize the joining of the new device to the existing fabric 1000 or the new fabric, the application may cancel the joining failsafe mechanism by sending a corresponding message to the new device (e.g., a DisarmConfigurationFailsafe request) (block 1886). The new device thereafter may receive this request to disarm the configuration failsafe (block 1888). Pairing of the new device to the existing device in either a new fabric 1000 or an existing fabric 1000 may now be considered complete. The application on the client device thus may offer the user instructions for additional setup settings (block 1890) that the user may select from (block 1892). These may include, for example, continuing to pair additional devices or exiting setup.

Joining or Creating a Fabric without a WiFi Connection to the Internet

A new device may join or create a fabric 1000 without necessarily having access to a WiFi connection to a service or the Internet. For example, as shown in FIGS. 65-67, such a connection may be formed using other network connection without facilitation by a service (e.g., over just an 802.15.4 network connection). This section describes the actions and events that may happen during the process of joining a new device in a device-to-device fabric. As used herein, a "device-to-device fabric" is a network of two or more fabric 1000 devices connected via a single network interface (e.g., via 802.15.4 interfaces only). Devices in a device-to-device fabric 1000 are not necessarily connected to a WiFi network and thus may not talk to an application (e.g., web or mobile) running on a client device (as in FIGS. 62-64) or to a service on the Internet (e.g., the Nest® service).

In some cases, device-to-device fabrics may be easier to form than WiFi fabrics, involving user participation only in that the may user press buttons on two devices within a short period of time. The device-to-device joining process described by FIGS. 65-67 may support both the creation of a new device-to-device fabric 1000 using two independent devices, as well as the joining of a new independent device to an existing device-to-device fabric. Device-to-device joining can also be used to remove a device from an existing device-to-device fabric 1000 and join it to another device-to-device fabric. This latter scenario may become particularly useful when a user acquires a used device that wasn't properly severed from its old device-to-device fabric.

Note that the device-to-device joining process may not be used to join a new device into an existing WiFi fabric 1000 in some embodiments. For this, the user may follow the WiFi joining process discussed above with reference to FIGS. 62-64. Also, the device-to-device joining process may not be used to join a device that is already a member of a WiFi fabric 1000 into a device-to-device fabric. Thus, in the case where a user acquires a used device that wasn't properly severed from its original WiFi fabric, the user may perform a factory reset on the device before proceeding with the device-to-device fabric 1000 joining process.

The device-to-device joining process may begin when, as shown by a flowchart 1900 of FIG. 65, a first device (e.g., Device 1) of two devices that are to be joined is activated (block 1902). For example, based on instructions in the sales box of the first device, a user may press a button on the first device. Here, if the user is adding a device to an existing fabric, the user may be instructed to press the button on the device to be added. If the user is creating a new fabric 1000 out of two independent devices, the user may select either device as the first device. Also, if the first device is a member of a WiFi fabric, the first device may take no further action and the joining procedure stops. When the first device is a member of a WiFi fabric, the first device may be disassociated with the WiFi fabric 1000 before joining the device-to-device network (e.g., via a factory reset).

When not a member of an existing WiFi fabric, the first device (e.g., Device 1) may begin certain initialization procedures when activated as in block 1902. For example, Device 1 may start a counter that increments with time (e.g., multiple times a second). This counter will later be used to determine which device is of two device has priority in establishing a fabric, if appropriate. Device 1 also may create an 802.15.4 wireless network, which may be called the 802.15.4 joining network (block 1904). This 802.15.4 joining network may be a generally unique, unsecured network. For example, the 802.15.4 joining network may use a generally unique ELoWPAN 110 network name containing the following information: (a) a string identifying the network as a joining network, (b) the first device's node id, and (c) a flag indicating whether the device is part of a fabric. When the joining network is established, Device 1 may also assign itself two IPv6 addresses in the joining network (block 1906). These may include, for example: (a) an IPv6 ULA or EULA with a distinct prefix, which may be called the rendezvous prefix, and an interface identifier derived from the device's MAC address, and (b) an IPv6 ULA or EULA with the rendezvous prefix and an interface identifier of 1, which may be called the rendezvous address.

Device 1 then may continuously scan for an 802.15.4 network created by another device (block 1908). Indeed, in parallel to or after the acts of blocks 1902-1908, a second device (Device 2) may perform the above acts itself (block 1910). Either Device 1 or Device 2 may detect the other's joining network (block 1912). Depending on certain characteristics of the device—Device 1 or Device 2—that is first to detect the other, the devices may perform an initiating device process (e.g., as shown in FIG. 66) or a responding device process (e.g., as shown in FIG. 67). That is, when one of the devices discovers the other's joining network, the device compares the information contained in the joining network name with its own information and may takes action as follows: (a) if the device is an independent device and the other device is a member of a fabric, the device may performs the acts shown in the initiating device process of FIG. 66; or (b) if the device is a member of a fabric 1000 and the other device is an independent device, the device may perform the acts shown by the responding device process of FIG. 67. If neither device is a member of a fabric, or if both devices are members of a fabric, the device that detects the other device's joining network may (a) compare its node id to the node id of the other device and (b) if the device's node id is less than the node id of the other device, the device may perform the acts of the acts shown in the initiating device process of FIG. 66. If neither device is a member of a fabric, or if both devices are members of a fabric, the device that detects the other device's joining network may (a) compare its node id to the node id of the other device and (b) if the device's node id is greater than the node id of the other device, may perform the acts shown by the responding device process of FIG. 67.

The device that performs the initiating device process of FIG. 66 may be either Device 1 or Device 2, as mentioned above. As such, the device that performs the initiating device process of FIG. 66 will now be referred to as the "initiating device." Likewise, the device that performs the responding device process of FIG. 67 may be the device not operating as the initiating device, and may be either Device 1 or Device 2, as mentioned above. As such, the device that performs the responding device process of FIG. 67 will now be referred to as the "responding device."

As seen in a flowchart 1920, the initiating device process of FIG. 66 may begin when the initiating device terminates its joining network and connects to the joining network created by the responding device (block 1922). The initiating device may assign itself an IPv6 ULA or EULA with the rendezvous prefix and an interface identifier derived from its MAC address (block 1924). The initiating device may send a Solicit Joining message to the responding device at its rendezvous address. The Solicit Joining message from the initiating device may include the following information: (a) a numeric discriminator value set to the value of the counter that was started when the device and woke up, and (b) a flag indicating whether the device is already a member of a fabric. The initiating device then may wait for a response message from the responding device, receiving either a Join Existing Fabric request or a Solicit Joining request (block 1928).

When the initiating device receives a Join Existing Fabric request, the initiating device may leave its current fabric, if appropriate, and may reinitialize itself as an independent device, and may make itself part of the existing fabric 1000 with the responding device, using the information in the Join Existing Fabric request (block 1930). The initiating device may send a Join Existing Fabric response to the responding device indicating it is now a member of the existing fabric 1000 (block 1932).

When the initiating device receives a Solicit Joining request, the initiating device may respond in different manners depending on whether it is an independent device or a member of an existing fabric, but in either case may send fabric 1000 information in a Join Existing Fabric request (block 1934). For example, when the initiating device is an independent device, the initiating device may create a new fabric 1000 by generating a new fabric id and corresponding fabric security information, may make itself part of the new fabric, and may send a Join Existing Fabric request to the responding device. The Join Existing Fabric request may contain the information for the new fabric. Otherwise, if the device is a member of a fabric, the device may send a Join Existing Fabric request to the responding device that contains the information for the existing fabric 1000 that the initiating device is a member of. The initiating device then may wait for, and receive, a Join Existing Fabric response from the responding device when the responding device joins the fabric 1000 of the initiating device.

The responding device process of FIG. 67 describes a manner in which the responding device may behave in relation to the initiating device. The responding device process of FIG. 67 is described by a flowchart 1950. The flowchart 1950 begins when the responding device receives a Solicit Joining message from the initiating device (block 1952).

If the responding device is an independent device and is not in an existing fabric 1000 (decision block 1954), the responding device may create a new fabric 1000 by generating a new fabric id and corresponding fabric security information (block 1956). The responding device may make itself part of the new fabric 1000 (block 1958). The responding device then may send a Join Existing Fabric request to the initiating device that contains the information for the new fabric 1000 of the responding device (block 1960). The responding device may wait for the Join Existing Fabric response from the initiating device.

Otherwise, upon receipt of the Solicit Joining message (block 1952), if the responding device is in an existing fabric 1000 (decision block 1954), the responding device may adopt a different behavior. Specifically, if the responding device is in a fabric, the responding device may inspect the Solicit Joining message (block 1962). The responding device may inspect the discriminator value (the counter value of the initiating device) and the 'is member of fabric' flag in the Solicit Joining.

Otherwise, if the Solicit Joining message indicates that the initiating device is not a member of a fabric 1000 or if the discriminator value is greater than or equal to the counter started by the responding device when it woke up (decision block 1964), the responding device may send a Join Existing Fabric request to the initiating device that contains the information for the fabric 1000 of the responding device (block 1974). The responding device may wait for the Join Existing Fabric response from the initiating device.

If the Solicit Joining message indicates that the initiating device is a member of a fabric 1000 or if the discriminator value is less than the counter started by the responding device when it woke up (decision block 1964), the responding device may leave its current fabric 1000 and reinitializes itself as an independent device (block 1966). The responding device may further send a Solicit Joining message to the initiating device (block 1968) and may wait for a Join Existing Fabric request from the initiating device. Upon receiving the Join Existing Fabric request from the initiating device (block 1970), the responding device may make itself part of the new fabric 1000 using the information in the Join Existing Fabric request (block 1972). The responding device may also send a Join Existing Fabric response indicating it is now a member of the existing fabric 1000 of the initiating device.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method of joining a first device and a second device in a fabric network, the method comprising:
  creating, by the first device, a first joining network, the first joining network having a network name comprising an identifier of the first device that includes a string identifying the first joining network as a joining network and a flag indicating whether the first device is part of the fabric network;
  scanning for a second joining network;
  in response to the scanning, detecting the second joining network, the second joining network having been created by the second device, the second joining network having a network name comprising an identifier of the second device; and
  determining, by the first device, whether to join the second joining network, or to join the second device to the first joining network.

2. The method of claim 1, wherein the determining whether to join the second joining network, or to join the second device to the first joining network comprises:
  comparing, by the first device, the identifiers of the first device and the second device;
  joining the second joining network if a value of the identifier of the first device is less than a value of the identifier of the second device; or
  joining the second device to the first joining network if the value of the identifier of the first device is greater than the value of the identifier of the second device.

3. The method of claim 2, wherein the first device is joining the second joining network, the method further comprising:
  terminating the first joining network;
  sending a solicit joining message to the second device;

receiving a solicit joining request from the second device; and sending fabric network information to the second device in a join existing fabric network request.

4. The method of claim 2, wherein the second device is joining the first joining network, the method further comprising:

receiving a solicit joining message from the second device;

creating the fabric network;

joining the first device to the fabric network; and sending a join existing fabric network request that is effective to join the second device to the fabric network.

5. The method of claim 1, wherein the first joining network and the second joining network are IEEE 802.15.4 networks.

6. The method of claim 1, the method further comprising activating the first device to begin the joining the first device and the second device in the fabric network.

7. The method of claim 6, wherein activating the first device to begin the joining comprises receiving a user input, by the first device, to activate the first device.

8. An electronic device configured to join an additional device in a fabric network, the electronic device comprising:
a processor; and
a memory comprising instructions executable by the processor that configure the electronic device to:
create a joining network, the joining network having a network name comprising an identifier of the electronic device that includes a string identifying the joining network as a joining network and a flag indicating whether the electronic device is part of the fabric network;
scan for another joining network;
in response to the scan, detect the other joining network, the other joining network having been created by the additional device, the other joining network having a network name comprising an identifier of the additional device; and
determine whether to join the other joining network, or to join the additional device to the joining network.

9. The electronic device of claim 8, wherein, to determine whether to join the other joining network or to join the additional device to the joining network comprises the electronic device configured to:
compare the identifiers of the electronic device and the additional device;
join the electronic device to the other joining network if a value of the identifier of the electronic device is less than a value of the identifier of the additional device; or
join the additional device to the joining network if the value of the identifier of the electronic device is greater than the value of the identifier of the additional device.

10. The electronic device of claim 9, wherein, for the electronic device to join the second joining network, the electronic device is configured to:
terminate the joining network;
send a solicit joining message to the additional device;
receive a solicit joining request from the additional device; and
send fabric network information to the additional device in a join existing fabric network request.

11. The electronic device of claim 9, wherein, for the additional device to join the joining network, the electronic device is configured to:

receive a solicit joining message from the additional device;
create the fabric network;
join the electronic device to the fabric network; and
send a join existing fabric network request that is effective to join the additional device to the fabric network.

12. The electronic device of claim 8, wherein the joining network and the other joining network are IEEE 802.15.4 networks.

13. The electronic device of claim 8, wherein the electronic device is configured to receive an input to activate the electronic device to begin joining the electronic device and the additional device in the fabric network.

14. The electronic device of claim 13, wherein the input to activate the electronic device to begin joining the electronic device is a push, by a user, of a button on the electronic device.

15. A system for creating a fabric network, the system comprising:
an electronic device configured to:
create a joining network, the joining network having a network name comprising an identifier of the electronic device that includes a string identifying the joining network as a joining network and a flag indicating whether the electronic device is part of the fabric network;
scan for another joining network;
in response to the scan, detect the other joining network; and
determine whether to join the other joining network, or to join an additional device to the joining network; and
the additional device configured to:
create the other joining network, the other joining network having a network name comprising an identifier of the additional device.

16. The system of claim 15, wherein, to determine whether to join the other joining network or to join the additional device to the joining network comprises the electronic device configured to:
compare the identifiers of the electronic device and the additional device;
join the other joining network if a value of the identifier of the electronic device is less than a value of the identifier of the additional device; or
join the additional device to the joining network if the value of the identifier of the electronic device is greater than the value of the identifier of the additional device.

17. The system of claim 16, wherein, for the electronic device to join the other joining network, the electronic device is configured to:
terminate the joining network;
send a solicit joining message to the additional device;
receive a solicit joining request from the additional device; and
send fabric network information to the additional device in a join existing fabric network request.

18. The system of claim 16, wherein, for the additional device to join the joining network, the electronic device is configured to:
receive a solicit joining message from the additional device;
create the fabric network;
join the electronic device to the fabric network; and
send a join existing fabric network request that is effective to join the additional device to the fabric network.

19. The system of claim 15, wherein the joining network and the other joining network are IEEE 802.15.4 networks.

20. The system of claim 15, wherein the electronic device is configured to receive an input to activate the electronic device to begin joining the electronic device and the additional device in the fabric network.

* * * * *